(12) United States Patent
Lai et al.

(10) Patent No.: US 9,958,643 B2
(45) Date of Patent: May 1, 2018

(54) OPTICAL IMAGE CAPTURING SYSTEM

(71) Applicant: ABILITY OPTO-ELECTRONICS TECHNOLOGY CO. LTD., Taichung (TW)

(72) Inventors: Chien-Hsun Lai, Taichung (TW); Kuo-Yu Liao, Taichung (TW); Yao-Wei Liu, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days. days.

(21) Appl. No.: 15/375,829

(22) Filed: Dec. 12, 2016

(65) Prior Publication Data

US 2018/0024319 A1  Jan. 25, 2018

(30) Foreign Application Priority Data

Jul. 21, 2016 (TW) .............................. 105123104 A

(51) Int. Cl.
| | |
|---|---|
| *G02B 9/34* | (2006.01) |
| *G02B 13/00* | (2006.01) |
| *G02B 5/00* | (2006.01) |
| *G02B 5/20* | (2006.01) |
| *G02B 27/00* | (2006.01) |

(52) U.S. Cl.
CPC .......... *G02B 13/004* (2013.01); *G02B 5/005* (2013.01); *G02B 5/208* (2013.01); *G02B 9/34* (2013.01); *G02B 27/0025* (2013.01)

(58) Field of Classification Search
CPC ......... G02B 9/34; G02B 13/04; G02B 13/004
USPC ................................ 359/715, 753, 771, 772
See application file for complete search history.

(56) References Cited

U.S. PATENT DOCUMENTS 9,465,988 B1 * 10/2016 Marason ............ G06K 9/00604

* cited by examiner

*Primary Examiner* — William Choi
(74) *Attorney, Agent, or Firm* — Muncy, Geissler, Olds & Lowe, P.C.

(57) ABSTRACT

A four-piece optical lens for capturing image and a five-piece optical module for capturing image are provided. In the order from an object side to an image side, the optical lens along the optical axis includes a first lens with positive refractive power; a second lens with refractive power; a third lens with refractive power; and a fourth lens with refractive power; and at least one of the image-side surface and object-side surface of each of the four lens elements are aspheric. The optical lens can increase aperture value and improve the imagining quality for use in compact cameras.

25 Claims, 31 Drawing Sheets

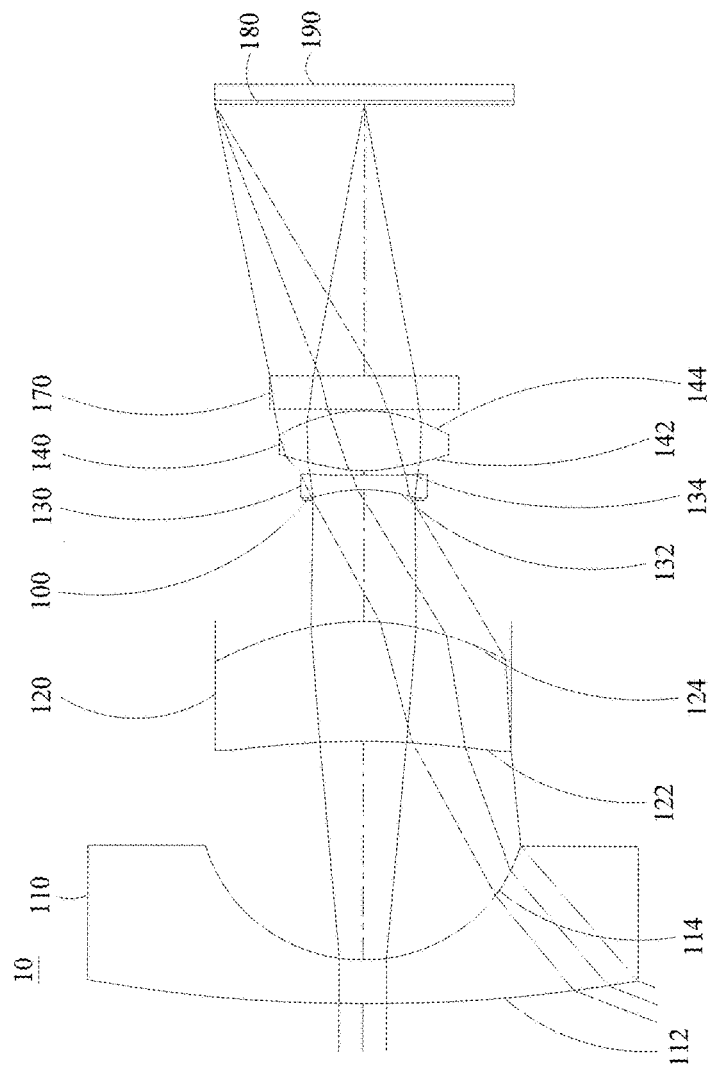

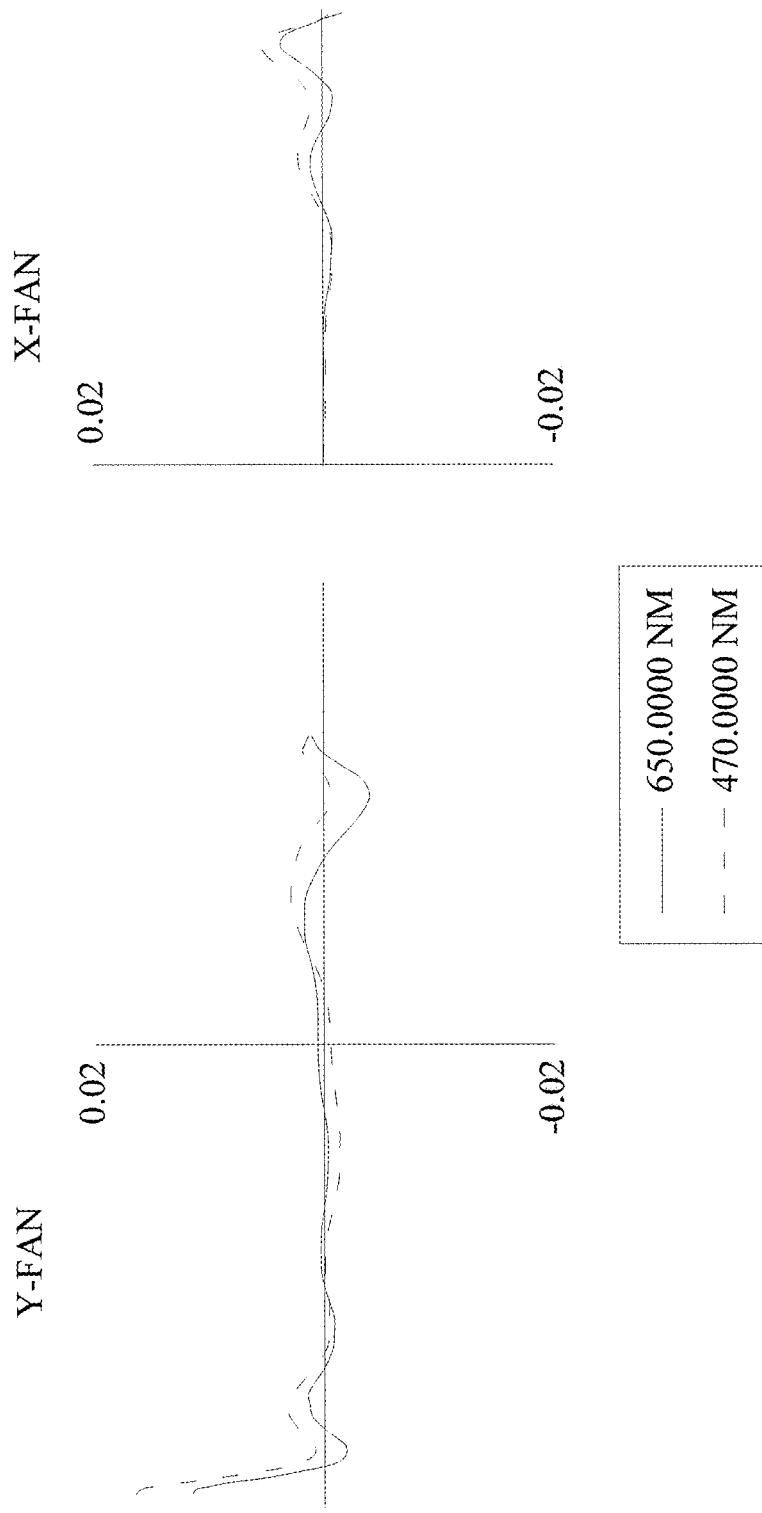

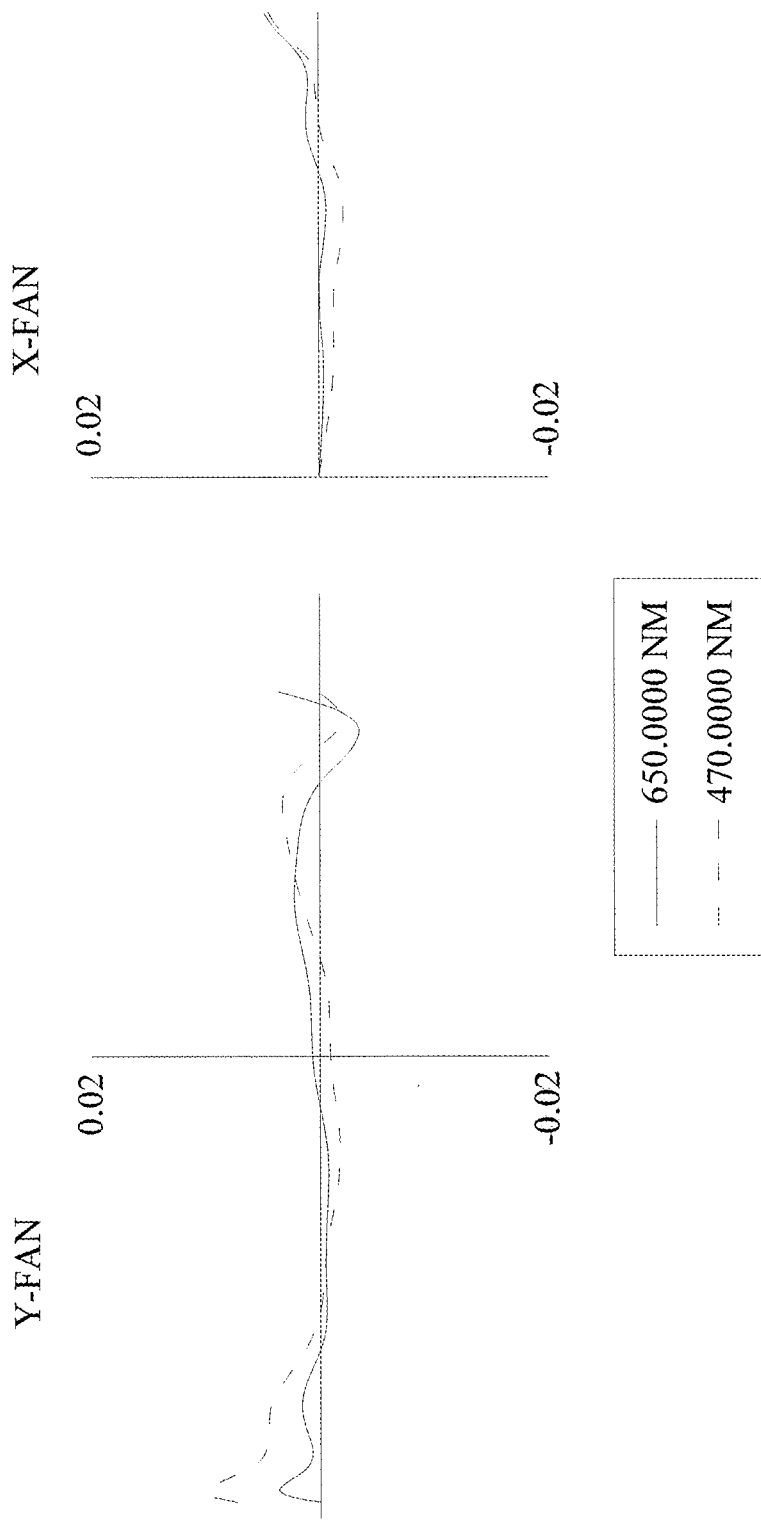

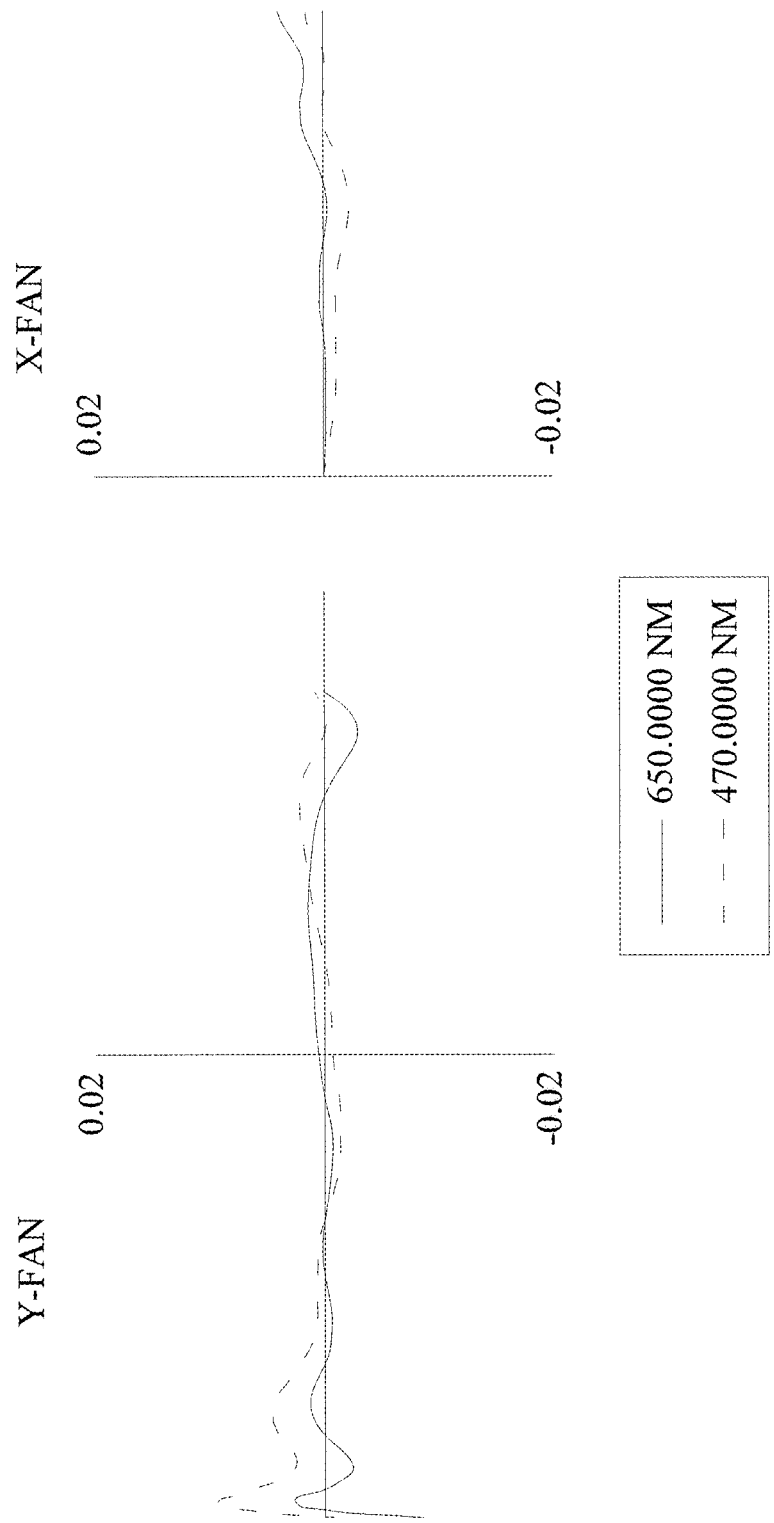

OPTICAL IMAGE CAPTURING SYSTEM

CROSS-REFERENCE TO RELATED APPLICATION

This application claims priority from Taiwan Patent Application No. 105123104, filed on Jul. 21, 2016, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a second-lens or a third-lens design. However, the requirement for the higher pixels and the requirement for a large aperture of an end user, like functionalities of micro filming and night view, or the requirement of wide view angle of the portable electronic device have been raised. But the optical image capturing system with the large aperture design often produces more aberration, resulting in the deterioration of quality in peripheral image formation and difficulties of manufacturing, and the optical image capturing system with wide view angle design increases distortion rate in image formation, thus the optical image capturing system in prior arts cannot meet the requirement of the higher order camera lens module.

Therefore, it is a pressing issue to come up a way to effectively increase the amount of admitted light into and the angle of view of the optical image capturing system, so as to achieve a balanced design, which can minimize the size of the camera module, while meeting the users' requirement for higher total pixel count and better image quality.

SUMMARY OF THE INVENTION

The aspect of embodiment of the present disclosure directs to an optical image capturing system and an optical image capturing lens, which use a combination of refractive powers, convex and concave surfaces of four-piece optical lenses (the convex or concave surface in the present disclosure denotes the geometrical shape of an image-side surface or an object-side surface of each lens on an optical axis) to increase the amount of light admitted into the optical image capturing system and the angle of view of the optical lenses.

Furthermore, the lens elements of the optical image capturing system of the present invention are positioned using components with small wall thickness. As the result, the optical image capturing system of the present invention possesses a certain amount of relative illumination, the total pixel count and the image quality thereof are improved, and the present invention can be disposed in minimized or narrow bezel electronic products.

Various terminologies and the reference numerals thereof of the parameters of component related to the embodiments of the present invention are given below, which serve as the references for the description that follows:

Please refer to FIG. 7. The optical image capturing system may include an image sensing device (not illustrated). The image sensor may include a substrate and an image sensor. The optical image capturing system may further include a first lens positioning element 710, which is denoted by PE1. The first lens positioning element may include a base and a lens base. The lens base may be disposed with an open accommodation space and may be disposed on the substrate, such that the image sensor may be accommodated in the accommodation space. The lens base, which may be integrally formed, may be hollow and opaque. The lens base may be disposed with a barrel portion 7141 and a base portion 7142 that are interconnected. The barrel portion 7141 may have a predetermined wall thickness, which is denoted by TPE1 (thickness of the first lens positioning element 710), and a first hole 7143 and a second hole 7144 are respectively disposed at two opposite ends of the lens base. The first hole 7143 may be connected to the barrel portion 7141 and the second hole 7144 may be connected to the base portion 7142. The shortest side length of the base portion 7142, which is measured on a plane perpendicular to the optical axis, has a maximum value denoted by PhiD. The maximum inner diameter of the second hole 7144 is denoted by Phi2.

The optical image capturing system may further include a second lens positioning element 720, which is denoted by PE2. The second lens positioning element 720, which may include a positioning portion 722 and a connecting portion 724, may be accommodated in the lens base of the first lens positioning element 710. The positioning portion 722 may be hollow, and a third hole 7241 and a fourth hole 7242 may be respectively disposed at two ends of the positioning portion 722 that are opposite to each other in the direction of the optical axis. The third hole 7241 may be connected to the positioning portion 722, and the fourth hole 7242 may be connected to the base portion 7142. The third hole 7241 and the fourth hole 7242 may have a predetermined wall thickness TPE2 (thickness of the second lens positioning element 720). The positioning portion 722 may come into direct contact with any lens element of the embodiments of the present disclosure, and the positioning portion 722 is capable of accommodating the lens element and aligning the lens element on the optical axis. The connecting portion 724 may be disposed on the outer side of the positioning portion 722. The connecting portion 724 may directly couple with the barrel portion 7141 such that the second lens positioning element 720 can be accommodated in the lens base of the first lens positioning element, the optical image capturing system is capable of adjusting the focal length thereof along the optical axis, and the lens element can be positioned. The maximum outer diameter of the connecting portion 724 measured on a plane perpendicular to the optical axis is denoted by PhiC. The maximum inner diameter of the fourth hole 7242 is denoted by Phi4. The aforementioned connecting portion 724 may be disposed with screw thread, such that the second lens positioning element 720 and the lens base of the first lens positioning element 710 may be screwed together.

Any lens element in the embodiments of the present disclosure may be selectively disposed at the barrel portion 7141 of the first lens positioning element 710. Furthermore, the lens element may be nearer to the first hole 7143 than the image sensor, and the optical axis of the lens element may be perpendicular to the image sensor. Any lens element in the embodiments of the present disclosure may also be indirectly disposed in the first lens positioning element 710 through the second lens positioning element 720. Furthermore, the lens element may be nearer to the third hole 7241 than the image sensor, and the optical axis of the lens element may be perpendicular to the image sensor.

In addition, when it comes to certain application of optical imaging, there will be a need to capture image via light sources with wavelengths in both visible and infrared ranges, an example of this kind of application is IP video surveillance camera, which is equipped with the Day & Night function. The visible spectrum for human vision has wavelengths ranging from 400 to 700 nm, but the image formed on the camera sensor includes infrared light, which is invisible to human eyes. Therefore, under certain circumstances, an IR cut filter removable (ICR) is placed before the sensor of the IP video surveillance camera, in order to ensure that only the light that is visible to human eyes is picked up by the sensor eventually, so as to enhance the "fidelity" of the image. The ICR of the IP video surveillance camera can completely filter out the infrared light under daytime mode to avoid color cast; whereas under night mode, it allows infrared light to pass through the lens to enhance the image brightness. Nevertheless, the elements of the ICR occupy a significant amount of space and are expensive, which impede to the design and manufacture of miniaturized surveillance cameras in the future.

The aspect of embodiment of the present disclosure directs to an optical image capturing system and an optical image capturing lens which utilize the combination of refractive powers, convex surfaces and concave surfaces of four lens elements, as well as the selection of materials thereof, to reduce the difference between the imaging focal length of visible light and imaging focal length of infrared light, in order to achieve the near "confocal" effect without the use of ICR elements.

The terms and their definition for the lens element parameters in the embodiment of the present invention are shown as below for further reference.

The Lens Element Parameters Related to the Magnification of the Optical Image Capturing System The optical image capturing system can be designed and applied to biometrics, for example, facial recognition. When the embodiment of the present disclosure is configured to capture image for facial recognition, the infrared light can be adopted as the operation wavelength. For a face of about 15 centimeters (cm) wide at a distance of 25-30 cm, at least 30 horizontal pixels can be formed in the horizontal direction of an image sensor (pixel size of 1.4 micrometers ($\mu m$)). The linear magnification of the infrared light on the image plane is LM, and it meets the following conditions: $LM \geq 0.0003$, where LM=(30 horizontal pixels)*(1.4 $\mu m$ pixel size)/(15 cm, width of the photographed object). Alternatively, the visible light can also be adopted as the operation wavelength for image recognition. When the visible light is adopted, for a face of about 15 cm wide at a distance of 25-30 cm, at least 50 horizontal pixels can be formed in the horizontal direction of an image sensor (pixel size of 1.4 micrometers ($\mu m$)).

The Lens Element Parameter Related to a Length or a Height in the Lens Element

For visible spectrum, the present invention may adopt the wavelength of 555 nm as the primary reference wavelength and the basis for the measurement of focus shift; for infrared spectrum (700-1300 nm), the present invention may adopt the wavelength of 850 nm as the primary reference wavelength and the basis for the measurement of focus shift.

The optical image capturing system includes a first image plane and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value in the central of field of view of the second image plane. The optical image capturing system also includes a first average image plane and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency.

The aforementioned first spatial frequency is set to be half of the spatial frequency (half frequency) of the image sensor (sensor) used in the present invention. For example, for an image sensor having the pixel size of 1.12 $\mu m$ or less, the quarter spatial frequency, half spatial frequency (half frequency) and full spatial frequency (full frequency) in the characteristic diagram of modulation transfer function are at least 110 cycles/mm, 220 cycles/mm and 440 cycles/mm, respectively. Lights of any field of view can be further divided into sagittal ray and tangential ray.

The focus shifts where the through-focus MTF values of the visible sagittal ray at the central field of view, 0.3 field of view, and 0.7 field of view of the optical image capturing system are at their respective maxima, are denoted by VSFS0, VSFS3, and VSFS7 (unit of measurement: mm), respectively. The maximum values of the through-focus MTF of the visible sagittal ray at the central field of view, 0.3 field of view, and 0.7 field of view are denoted by VSMTF0, VSMTF3, and VSMTF7, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The maximum values of the through-focus MTF of the visible tangential ray at the central field of view, 0.3 field of view, and 0.7 field of view are denoted by VTMTF0, VTMTF3, and VTMTF7, respectively. The average focus shift (position) of both the aforementioned focus shifts of the visible sagittal ray at three fields of view and focus shifts of the visible tangential ray at three fields of view is denoted by AVFS (unit of measurement: mm), which equals to the absolute value |(VSFS0+VSFS3+VSFS7+VTFS0+VTFS3+VTFS7)/6|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS, which satisfies the absolute value |(VSFS0+VTFS0)/2−(ISFS0+ITFS0)/2|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), which equals to the absolute value of |AIFS−AVFS|.

The maximum height of an image formed by the optical image capturing system is denoted by HOI. The height of the optical image capturing system is denoted by HOS. A distance from the object-side surface of the first lens element to the image-side surface of the fourth lens element is denoted by InTL. A distance from the image-side surface of the fourth lens element to an image plane is denoted by InB, where InTL+InB=HOS. A distance from an aperture stop (aperture) to an image plane is denoted by InS. A distance from the first lens element to the second lens element is denoted by In12 (example). A central thickness of the first lens element of the optical image capturing system on the optical axis is denoted by TP1 (example).

The Lens Element Parameter Related to the Material in the Lens Element

An Abbe number of the first lens element in the optical image capturing system is denoted by NA1 (example). A refractive index of the first lens element is denoted by Nd1 (example).

The Lens Element Parameter Related to View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. The exit pupil diameter of the optical image capturing system is the image formed with respect to the image space after the light passing through lens elements assembly behind the aperture stop. The exit pupil diameter is denoted by HXP. The maximum effective half diameter (EHD) of any surface of a single lens element refers to a perpendicular height between the optical axis and an intersection point; the intersection point is where the incident ray with the maximum view angle passes through the outermost edge of the entrance pupil, and intersects with the surface of the lens element. For example, the maximum effective half diameter of the object-side surface of the first lens element is denoted by EHD 11. The maximum effective half diameter of the image-side surface of the first lens element is denoted by EHD 12. The maximum effective half diameter of the object-side surface of the second lens element is denoted by EHD 21. The maximum effective half diameter of the image-side surface of the second lens element is denoted by EHD 22. The maximum effective half diameters of any surfaces of other lens elements in the optical image capturing system are denoted in the similar way. In the optical image capturing system of the present disclosure, the maximum effective diameter of the image-side surface of the lens element that is closest to the image plane is denoted by PhiA. The following condition is satisfied: PhiA=2 EHD. When the surface is aspheric, the terminal point of the curve defining the maximum effective diameter is the terminal point of the aspheric surface. The ineffective half diameter (IHD) of any surface of a single lens element is defined the section of the image-side surface of that lens element, in which the section extends, in a direction away from the optical axis, from the terminal point of the curve defining the maximum effective half diameter on the same surface (when the surface is aspheric, the terminal point is the point where the aspheric surface ends). In the optical image capturing system of the present disclosure, the maximum diameter of the image-side surface of the lens element that is closest to the image plane is denoted by PhiB. The following condition is satisfied: PhiB=2 (EHD+IHD)=PhiA+2 IHD.

In the optical image capturing system of the present disclosure, the maximum effective diameter of the image-side surface on the lens element that is closest to the image plane (i.e. image space) is the optical exit pupil thereof, and the maximum effective diameter is denoted by PhiA. For instance, when the optical exit pupil is at the image-side surface of the third lens element, the maximum effective diameter is denoted by PhiA3. When the optical exit pupil is at the image-side surface of the fourth lens element, the maximum effective diameter is denoted by PhiA4. When the optical exit pupil is at the image-side surface of the fifth lens element, the maximum effective diameter is denoted by PhiA5. When the optical exit pupil is at the image-side surface of the sixth lens element, the maximum effective diameter is denoted by PhiA6. For the optical image capturing system having different number of lens elements, the maximum effective diameter (optical exit pupil) may be denoted in similar fashion. The pupil magnification ratio of the optical image capturing system is denoted by PMR, and the following condition is satisfied: PMR=PhiA/HEP.

The Lens Element Parameter Related to the Arc Length of the Lens Element Shape and the Outline of Surface A length of the maximum effective half diameter outline curve at any surface of a single lens element refers to an arc length of a curve, wherein the curve starts from an axial point on the surface of the lens element, travels along the surface outline of the lens element, and ends at the point which defines the maximum effective half diameter; and this arc length is denoted as ARS. For example, the length of the maximum effective half diameter outline curve of the object-side surface of the first lens element is denoted as ARS11. The length of the maximum effective half diameter outline curve of the image-side surface of the first lens element is denoted as ARS12. The length of the maximum effective half diameter outline curve of the object-side surface of the second lens element is denoted as ARS21. The length of the maximum effective half diameter outline curve of the image-side surface of the second lens element is denoted as ARS22. The lengths of the maximum effective half diameter outline curve of any surface of other lens elements in the optical image capturing system are denoted in the similar way.

A length of ½ entrance pupil diameter (HEP) outline curve of any surface of a single lens element refers to an arc length of curve, wherein the curve starts from an axial point on the surface of the lens element, travels along the surface outline of the lens element, and ends at a coordinate point on the surface where the vertical height from the optical axis to the coordinate point is equivalent to ½ entrance pupil diameter; and the arc length is denoted as ARE. For example, the length of the ½ entrance pupil diameter (HEP) outline curve of the object-side surface of the first lens element is denoted as ARE11. The length of the ½ entrance pupil diameter (HEP) outline curve of the image-side surface of the first lens element is denoted as ARE12. The length of the ½ entrance pupil diameter (HEP) outline curve of the object-side surface of the second lens element is denoted as ARE21. The length of the ½ entrance pupil diameter (HEP) outline curve of the image-side surface of the second lens element is denoted as ARE22. The lengths of the ½ entrance pupil diameter (HEP) outline curve of any surface of the other lens elements in the optical image capturing system are denoted in the similar way.

The Lens Element Parameter Related to the Depth of the Lens Element Shape

A distance paralleling an optical axis from a maximum effective half diameter position to an axial point on the object-side surface of the fourth lens element is denoted by InRS41 (example). A distance paralleling an optical axis from a maximum effective half diameter position to an axial point on the image-side surface of the fourth lens element is denoted by InRS42 (example).

The Lens Element Parameter Related to the Lens Element Shape

The critical point C is a point on a surface of a specific lens element, and the tangent plane to the surface at that point is perpendicular to the optical axis, wherein the point cannot be the axial point on that specific surface of the lens element. Therefore, a perpendicular distance between a critical point C31 on the object-side surface of the third lens element and the optical axis is HVT31 (example). A perpendicular distance between a critical point C32 on the image-side surface of the third lens element and the optical axis is HVT32 (example). A perpendicular distance between a critical point C41 on the object-side surface of the fourth lens element and the optical axis is HVT41 (example). A perpendicular distance between a critical point C42 on the image-side surface of the fourth lens, element and the optical axis is HVT42 (example). The perpendicular distances between the critical point on the image-side surface or object-side surface of other lens elements are denoted in similar fashion.

The inflection point on object-side surface of the fourth lens element that is nearest to the optical axis is denoted by IF411, and the sinkage value of that inflection point IF411 is denoted by SGI411 (example). The sinkage value SGI411 is a horizontal distance paralleling the optical axis, which is from an axial point on the object-side surface of the fourth lens element to the inflection point nearest to the optical axis on the object-side surface of the fourth lens element. The distance perpendicular to the optical axis between the inflection point IF411 and the optical axis is HIF411 (example). The inflection point on image-side surface of the fourth lens element that is nearest to the optical axis is denoted by IF421, and the sinkage value of that inflection point IF421 is denoted by SGI421 (example). The sinkage value SGI421 is a horizontal distance paralleling the optical axis, which is from the axial point on the image-side surface of the fourth lens element to the inflection point nearest to the optical axis on the image-side surface of the fourth lens element. The distance perpendicular to the optical axis between the inflection point IF421 and the optical axis is HIF421 (example).

The object-side surface of the fourth lens element has one inflection point IF412 which is the second nearest to the optical axis and the sinkage value of the inflection point IF412 is denoted by SGI412 (example). SGI412 is a horizontal shift distance paralleling the optical axis from an axial point on the object-side surface of the fourth lens element to the inflection point which is the second nearest to the optical axis on the object-side surface of the fourth lens element. A distance perpendicular to the optical axis between the inflection point IF412 and the optical axis is HIF412 (example). The image-side surface of the fourth lens element has one inflection point IF422 which is the second nearest to the optical axis and the sinkage value of the inflection point IF422 is denoted by SGI422 (example). SGI422 is a horizontal shift distance paralleling the optical axis from an axial point on the image-side surface of the fourth lens element to the inflection point which is second nearest to the optical axis on the image-side surface of the fourth lens element. A distance perpendicular to the optical axis between the inflection point IF422 and the optical axis is HIF422 (example).

The object-side surface of the fourth lens element has one inflection point IF413 which is the third nearest to the optical axis and the sinkage value of the inflection point IF413 is denoted by SGI413 (example). SGI413 is a horizontal shift distance paralleling the optical axis from an axial point on the object-side surface of the fourth lens element to the inflection point which is the third nearest to the optical axis on the object-side surface of the fourth d lens element. A distance perpendicular to the optical axis between the inflection point IF413 and the optical axis is HIF413 (example). The image-side surface of the fourth lens element has one inflection point IF423 which is the third nearest to the optical axis and the sinkage value of the inflection point IF423 is denoted by SGI423 (example). SGI423 is a horizontal shift distance paralleling the optical axis from an axial point on the image-side surface of the fourth lens element to the inflection point which is the third nearest to the optical axis on the image-side surface of the fourth lens element. A distance perpendicular to the optical axis between the inflection point IF423 and the optical axis is HIF423 (example).

The object-side surface of the fourth lens element has one inflection point IF414 which is the fourth nearest to the optical axis and the sinkage value of the inflection point IF414 is denoted by SGI414 (example). SGI414 is a horizontal shift distance paralleling the optical axis from an axial point on the object-side surface of the fourth lens element to the inflection point which is the fourth nearest to the optical axis on the object-side surface of the fourth lens element. A distance perpendicular to the optical axis between the inflection point IF414 and the optical axis is HIF414 (example). The image-side surface of the fourth lens element has one inflection point IF424 which is the fourth nearest to the optical axis and the sinkage value of the inflection point IF424 is denoted by SGI424 (example). SGI424 is a horizontal shift distance paralleling the optical axis from an axial point on the image-side surface of the fourth lens element to the inflection point which is the fourth nearest to the optical axis on the image-side surface of the fourth lens element. A distance perpendicular to the optical axis between the inflection point IF424 and the optical axis is HIF424 (example).

The inflection points on the object-side surface or the image-side surface of the other lens elements and the perpendicular distances between them and the optical axis, or the sinkage values thereof are denoted in the similar way described above.

The Lens Element Parameter Related to the Aberration

Optical distortion for image formation in the optical image capturing system is denoted by ODT. TV distortion for image formation in the optical image capturing system is denoted by TDT. Furthermore, the degree of aberration offset within the range of 50% to 100% field of view of the formed image can be further illustrated. The offset of the spherical aberration is denoted by DFS. The offset of the coma aberration is denoted by DFC.

The transverse aberration of the edge of the aperture is defined as STOP Transverse Aberration (STA), which assesses the specific performance of the optical image capturing system. The tangential fan or sagittal fan may be applied to calculate the STA of any fields of view, and in particular, to calculate the STAs of the longest operation wavelength (e.g. 650 nm) and the shortest operation wavelength (e.g. 470 nm), which serve as the standard to indicate the performance. The aforementioned direction of the tangential fan can be further defined as the positive (overhead-light) and negative (lower-light) directions. The STA of the max operation wavelength is defined as the distance between the position of the image formed when the max operation wavelength passing through the edge of the aperture strikes a specific field of view of the first image plane and the image position of the reference primary wavelength (e.g. wavelength of 555 nm) on specific field of view of the first image plane. Whereas the STA of the shortest operation wavelength is defined as the distance between the position of the image formed when the shortest operation wavelength passing through the edge of the aperture strikes a specific field of view of the first image plane and the image position of the reference primary wavelength on a specific field of view of the first image plane. The criteria for the optical image capturing system to be qualified as having excellent performance may be set as: both STA of the incident longest operation wavelength and the STA of the incident shortest operation wavelength at 70% of the field of view of the first image plane (i.e. 0.7 HOI) have to be less than 50 µm or even less than 30 µm.

The optical image capturing system has a maximum image height HOI on the first image plane perpendicular to the optical axis. A transverse aberration of the longest operation wavelength of a positive direction tangential fan of the optical image capturing system passing through an edge of the entrance pupil and incident at the position of 0.7 HOI on the first image plane is denoted as PLTA. A transverse aberration of the shortest operation wavelength of the positive direction tangential fan of the optical image capturing system passing through the edge of the entrance pupil and incident at the position of 0.7 HOI on the first image plane is denoted as PSTA. A transverse aberration of the longest operation wavelength of a negative direction tangential fan of the optical image capturing system passing through the edge of the entrance pupil and incident at the position of 0.7 HOI on the first image plane is denoted as NLTA. A transverse aberration of the shortest operation wavelength of a negative direction tangential fan of the optical image capturing system passing through the edge of the entrance pupil and incident at the position of 0.7 HOI on the first image plane is denoted as NSTA. A transverse aberration of the longest operation wavelength of a sagittal fan of the optical image capturing system passing through the edge of the entrance pupil and incident at the position of 0.7 HOI on the first image plane denoted as SLTA. A transverse aberration of the shortest operation wavelength of the sagittal fan of the optical image capturing system passing through the edge of the entrance pupil and incident at the position of 0.7 HOI on the first image plane is denoted as SSTA.

The disclosure provides an optical image capturing system, the object-side surface or the image-side surface of the fourth lens element may have inflection points, such that the angle of incidence from each field of view to the fourth lens element can be adjusted effectively and the optical distortion and the TV distortion can be corrected as well. Besides, the surfaces of the fourth lens element may be endowed with better capability to adjust the optical path, which yields better image quality.

An optical image capturing system is provided in accordance with the present disclosure. In the order from an object side to an image side, the optical image capturing system includes a first lens element, a second lens element, a third lens element, a fourth lens element, a first image plane, and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. The first through fourth lens elements all have refractive powers. The focal lengths of the first lens element to the fourth lens element are f1, f2, f3, and f4 respectively. The focal length of the optical image capturing system is f. The entrance pupil diameter of the optical image capturing system is HEP. The distance on the optical axis from an object-side surface of the first lens element to the first image plane is HOS. Half of the maximum viewable angle of the optical image capturing system is denoted by HAF. The maximum image height on the first image plane perpendicular to the optical axis of the optical image capturing system is HOI. The distance on the optical axis from the object-side surface of the first lens element to the image-side surface of the fourth lens element is denoted by InTL. The distance on the optical axis between the first image plane and the second image plane is denoted by FS. The maximum effective diameter of the image-side surface of the fourth lens element is denoted by PhiA4. The following conditions are satisfied: 1≤f/HEP≤10, 0 deg<HAF≤150 deg, 0<PhiA4/InTL≥2.0, and |FS|≤30 μm.

Another optical image capturing system is further provided in accordance with the present disclosure. In the order from an object side to an image side, the optical image capturing system includes a first lens element, a second lens element, a third lens element, a fourth lens element, a first image plane, a second image plane and a first lens element positioning component. The first lens positioning element may include a lens base. The lens base may be hollow and opaque. The lens base may be disposed with a barrel portion and a base portion that are interconnected. The barrel portion may be configured to accommodate the first to fourth lens elements, and the base portion may be situated between the fourth lens element and the first image plane. The base portion may have an outer perimeter that is longer than an outer perimeter of the barrel portion. The shortest side length of the base portion, which is measured on a plane perpendicular to the optical axis, has a maximum value denoted by PhiD. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. The first lens element has positive refractive power. The second lens element has refractive power and has a convex image-side surface on the optical axis. The third lens element has refractive power and has a convex image-side surface on the optical axis. The focal lengths of the first lens element to the fourth lens element are f1, f2, f3, and f4 respectively. The focal length of the optical image capturing system is f. The entrance pupil diameter of the optical image capturing system is HEP. The distance on the optical axis from an object-side surface of the first lens element to the first image plane is HOS. Half of the maximum viewable angle of the optical image capturing system is denoted by HAF. The maximum image height on the first image plane perpendicular to the optical axis of the optical image capturing system is denoted by HOI. The distance on the optical axis from the object-side surface of the first lens element to the image-side surface of the fourth lens element is denoted by InTL. The maximum effective diameter of the image-side surface of the fourth lens element is denoted by PhiA4. The distance on the optical axis between the first image plane and the second image plane is denoted by FS. An outline curve starting from an axial point on any surface of any one of those lens elements, tracing along the outline of the surface, ending at a coordinate point on the surface that has a vertical height of ½ entrance pupil diameter from the optical axis is defined, and the length of the outline curve is denoted by ARE. The following conditions are satisfied: 1.0≤f/HEP≤10, 0 deg≤HAF≤150 deg, 0.9≤2(ARE/HEP)≤2.0, 0 mm<PhiD≤5.0 mm, and |FS|≤30 μm.

Yet another optical image capturing system is further provided in accordance with the present disclosure. In the order from an object side to an image side, the optical image capturing system includes a first lens element, a second lens element, a third lens element, a fourth lens element, a first average image plane, a second average image plane, a first lens positioning element, and a second lens positioning element. The first lens positioning element may include a lens base. The lens base may be hollow and opaque. The lens base may be disposed with a barrel portion and a base portion that are interconnected. The barrel portion may be configured to accommodate the first to fourth lens elements, and the base portion may be situated between the fourth lens element and the first average image plane. The outer perimeter of the base portion may be longer than the outer perimeter of the barrel portion. The shortest side length of the base portion, which is measured on a plane perpendicular to the optical axis, has a maximum value denoted by PhiD. The second lens positioning element may be accommodated in the lens base may include a positioning portion and a connecting portion. The positioning portion may be hollow and may come into direct contact with any lens elements to accommodate those lens elements, such that those lens elements are aligned along the optical axis. The connecting portion may be disposed at an outer side of the positioning portion and may come into direct contact with an inner perimeter of the barrel portion. The maximum outer diameter of the connecting portion, which is measured on a plane perpendicular to the optical axis, is denoted by PhiC. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency. The first lens element has positive refractive power. The second lens element has refractive power and has a convex image-side surface on the optical axis. The third lens element has positive refractive power and has a convex image-side surface on the optical axis. The focal lengths of the first lens element to the fourth lens element are f1, f2, f3, and f4 respectively. The focal length of the optical image capturing system is f. The entrance pupil diameter of the optical image capturing system is HEP. The distance on the optical axis from an object-side surface of the first lens element to the first average image plane is HOS. Half of the maximum viewable angle of the optical image capturing system is denoted by HAF. The maximum image height on the first average image plane perpendicular to the optical axis of the optical image capturing system is HOI. An outline curve starting from an axial point on any surface of any one of those lens elements, tracing along the outline of the surface, and ending at a coordinate point on the surface that has a vertical height of ½ entrance pupil diameter from the optical axis is defined, and the length of the outline curve is denoted by ARE. The maximum effective diameter of the image-side surface of the fourth lens element is denoted by PhiA4. The distance between the first average image plane and the second average image plane is denoted by AFS. Half of the vertical maximum viewable angle of the optical image capturing system is denoted by VHAF. The following conditions are satisfied: 1.0≥f/HEP≤10, 0 deg ≤HAF≤150 deg, |AFS|≤30 μm, VHAF≥20 deg, PhiC<PhiD, 0 mm<PhiD≤2.9 mm, and 0.9≤2(ARE/HEP)≤2.0.

The length of the outline curve of any surface of single lens element within the range of maximum effective half diameter affects the performance in correcting the surface aberration and the optical path difference between the rays in each field of view. The longer outline curve may lead to a better performance in aberration correction, but the difficulty of the production may become higher. Hence, the length of the outline curve (ARS) of any surface of a single lens element within the range of the maximum effective half diameter has to be controlled, and especially, the proportional relationship (ARS/TP) between the length of the outline curve (ARS) of the surface within the range of the maximum effective half diameter and the central thickness (TP) of the lens element to which the surface belongs on the optical axis has to be controlled. For example, the length of the maximum effective half diameter outline curve of the object-side surface of the first lens element is denoted as ARS11, and the central thickness of the first lens element on the optical axis is TP1, and the ratio between both of them is ARS11/TP1. The length of the maximum effective half diameter outline curve of the image-side surface of the first lens element is denoted as ARS12, and the ratio between ARS12 and TP1 is ARS12/TP1. The length of the maximum effective half diameter outline curve of the object-side surface of the second lens element is denoted as ARS21, and the central thickness of the second lens element on the optical axis is TP2, and the ratio between both of them is ARS21/TP2. The length of the maximum effective half diameter outline curve of the image-side surface of the second lens element is denoted as ARS22, and the ratio between ARS22 and TP2 is ARS22/TP2. The proportional relationships between the lengths of the maximum effective half diameter outline curve of any surface of the other lens elements and the central thicknesses (TP) of the lens elements to which the surfaces belong on the optical axis are denoted in the similar way.

The length of ½ entrance pupil diameter outline curve of any surface of a single lens element especially affects its performance of the surface in correcting the aberration in the shared region of each field of view, and the performance in correcting the optical path difference among each field of view. The longer outline curve may lead to a better function of aberration correction, but the difficulty in the production of such lens may become higher. Hence, the length of ½ entrance pupil diameter outline curve of any surface of a single lens element has to be controlled, and especially, the proportional relationship between the length of ½ entrance pupil diameter outline curve of any surface of a single lens element and the central thickness on the optical axis has to be controlled. For example, the length of the ½ entrance pupil diameter outline curve of the object-side surface of the first lens element is denoted as ARE11, and the central thickness of the first lens element on the optical axis is TP1, and the ratio thereof is ARE11/TP1. The length of the ½ entrance pupil diameter outline curve of the image-side surface of the first lens element is denoted as ARE12, and the central thickness of the first lens element on the optical axis is TP1, and the ratio thereof is ARE12/TP1. The length of the ½ entrance pupil diameter outline curve of the object-side surface of the first lens element is denoted as ARE21, and the central thickness of the second lens element on the optical axis is TP2, and the ratio thereof is ARE21/TP2. The length of the ½ entrance pupil diameter outline curve of the image-side surface of the second lens element is denoted as ARE22, and the central thickness of the second lens element on the optical axis is TP2, and the ratio thereof is ARE22/TP2. The ratios of the ½ HEP outline curves on any surface of the remaining lens elements of the optical image capturing system to the central thicknesses (TP) of that lens element can be computed in similar way.

The optical image capturing system described above may be configured to form the image on the image sensing device which is shorter than 1½ inch in diagonal length. The pixel size of the image sensing device is smaller than 1.4 micrometers (μm). Preferably the pixel size thereof is smaller than 1.12 micrometers (μm). The best pixel size thereof is smaller than 0.9 micrometers (μm). Furthermore, the optical image capturing system is applicable to the image sensing device with aspect ratio of 16:9.

The optical image capturing system described above is capable of meeting the demand for high quality video shooting with resolution of more than 1 megapixel or 10 megapixels (e.g. 4K and 2K videos or the so-called UHD and QHD).

The height of optical system (HOS) may be reduced to achieve the minimization of the optical image capturing system when the absolute value of f1 is larger than f4 (|f1|>f4).

When the condition |f2|+|f3|>|f1|+|f4| is satisfied, at least one of the second through third lens elements may have weak positive refractive power or weak negative refractive power. The weak refractive power indicates that an absolute value of the focal length of a specific lens element is greater than 10. When at least one of the second through third lens elements has the weak positive refractive power, the positive refractive power of the first lens element can be shared, such that the unnecessary aberration will not appear too early. On the contrary, when at least one of the second and third lens elements has the weak negative refractive power, the aberration of the optical image capturing system can be corrected and fine-tuned.

The fourth lens element may have positive refractive power. Besides, at least one surface of the fourth lens element may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

FIG. 1A is a schematic view of the optical image capturing system according to the first embodiment of the present invention.

FIG. 2C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the second embodiment of the present invention.

FIG. 4C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the fourth embodiment of the present invention.

FIG. 6C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the sixth embodiment of the present invention.

DESCRIPTION OF THE PREFERRED EMBODIMENTS

Figure 1B:
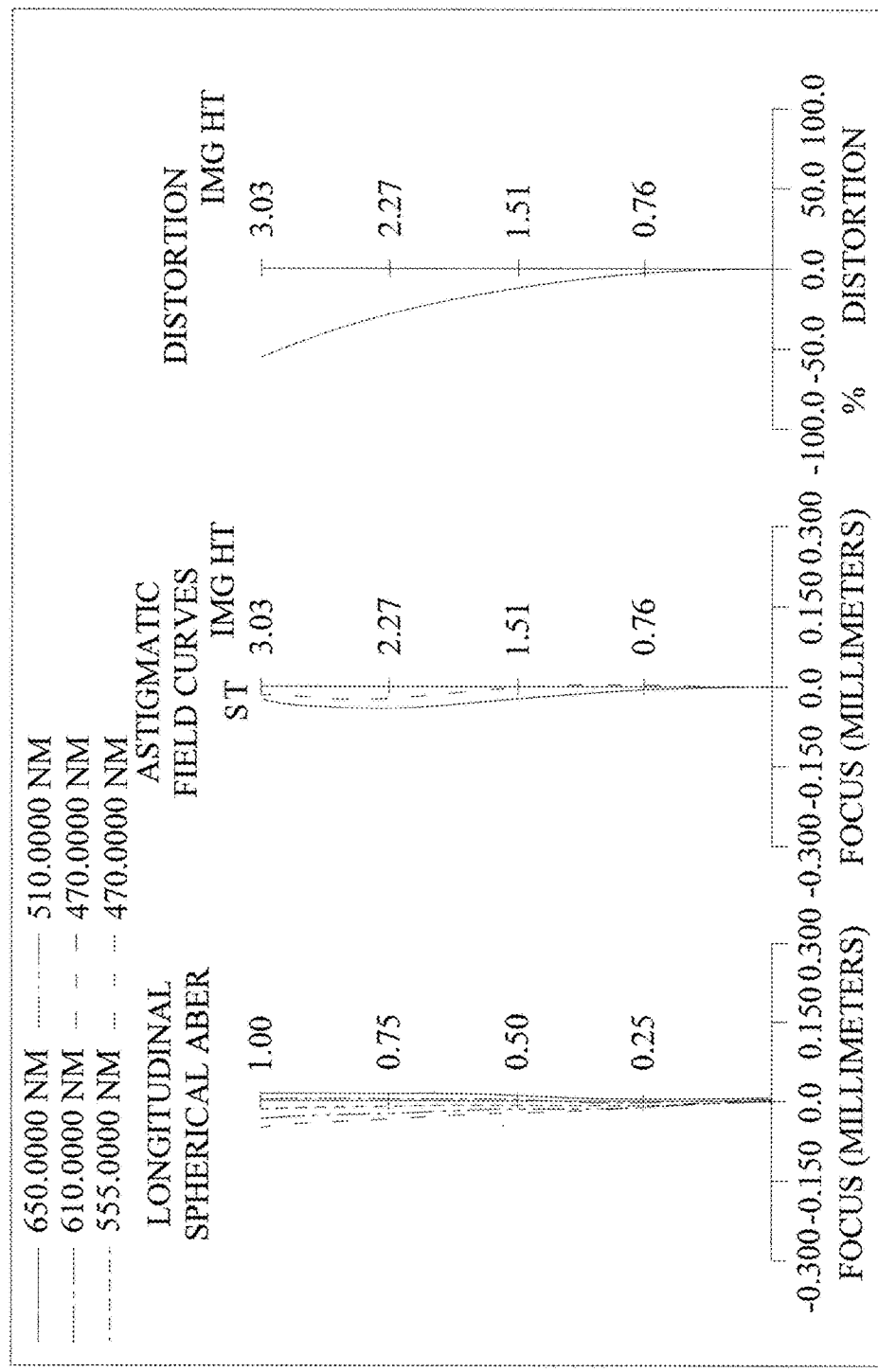
FIG. 1B shows the longitudinal spherical aberration curves, astigmatic field curves, and optical distortion curve of the optical image capturing system in the order from left to right according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system, in the order from an object side to an image side, includes a first, second, third and fourth lens elements with refractive power and an image plane. The optical image capturing system may further include an image sensing device which is disposed on an image plane.

The optical image capturing system may use three sets of operation wavelengths, which are 486.1 nm, 587.5 nm and 656.2 nm, respectively, wherein 587.5 nm is served as the primary reference wavelength and a reference wavelength to obtain technical features of the optical system. The optical image capturing system may also use five sets of wavelengths which are 470 nm, 510 nm, 555 nm, 610 nm and 650 nm, respectively, wherein 555 nm is served as the primary reference wavelength and a reference wavelength to obtain technical features of the optical system.

A ratio of the focal length f of the optical image capturing system to a focal length fp of each lens element with positive refractive power is PPR. A ratio of the focal length f of the optical image capturing system to a focal length fn of each lens element with negative refractive power is NPR. A sum of the PPR of all lens elements with positive refractive powers is ΣPPR. A sum of the NPR of all lens elements with negative refractive powers is ΣNPR. The total refractive power and the total length of the optical image capturing system can be controlled easily when following conditions are satisfied: 0.5≤ΣPPR/ΣNPR|≤4.5. Preferably, the following condition may be satisfied: 0.9≤ΣPPR/|ΣNPR|≤3.5.

The height of the optical image capturing system is HOS. When the value of the ratio, i.e. HOS/f approaches 1, it would be easier to manufacture the miniaturized optical image capturing system capable of ultra-high pixel image formation.

The sum of a focal length fp of each lens element with positive refractive power is ΣPP. A sum of a focal length fn of each lens element with negative refractive power is ΣNP. In one embodiment of the optical image capturing system of the present disclosure, the following conditions are satisfied: 0<ΣPP≤200 and f4/ΣPP≤0.85. Preferably, the following conditions may be satisfied: 0<ΣPP≤150 and 0.01≤f4/ΣPP≤0.7. As a result, the optical image capturing system will have better control over the focusing, and the positive refractive power of the optical system can be distributed appropriately, so as to suppress any premature formation of noticeable aberration.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following conditions are satisfied: HOS/HOI≥1.2 and 0.5≤HOS/f≤20.0. Preferably, the following conditions may be satisfied: HOS/HOI≥1.6 and 1≤HOS/f≤15. With this configuration, the size of the optical image capturing system can be kept small, such that a lightweight electronic product is able to accommodate it.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of the image sensing device in receiving image can be improved. If the aperture stop is the middle aperture, the angle of view of the optical image capturing system can be expended, such that the optical image capturing system has the same advantage that is owned by wide angle cameras. A distance from the aperture stop to the image plane is InS. The following condition is satisfied: 0.2≤InS/HOS≤1.1. Preferably, the following condition may be satisfied: 0.4≤InS/HOS≤1. Hereby, the size of the optical image capturing system can be kept small without sacrificing the feature of wide angle of view.

In the optical image capturing system of the disclosure, a distance from the object-side surface of the first lens element to the image-side surface of the fourth lens element is InTL. The sum of central thicknesses of all lens elements with refractive power on the optical axis is ΣTP. The following condition is satisfied: 0.2≤ΣTP/InTL≤0.95. Preferably, the following condition may be satisfied: 0.2≤ΣTP/InTL≤0.9. Hereby, the contrast ratio for the image formation in the optical image capturing system can be improved without sacrificing the yield rate for manufacturing the lens element, and a proper back focal length is provided to accommodate other optical components in the optical image capturing system.

The curvature radius of the object-side surface of the first lens element is R1. The curvature radius of the image-side surface of the first lens element is R2. The following condition is satisfied: 0.01≤|R1/R2|≤100. Preferably, the following condition may be satisfied: 0.01≤|R1/R2|≤60.

The curvature radius of the object-side surface of the fourth lens element is R9. The curvature radius of the image-side surface of the fourth lens element is R10. The following condition is satisfied: −200<(R7−R8)/(R7+R8)<30. This configuration is beneficial to the correction of the astigmatism generated by the optical image capturing system.

The distance between the first lens element and the second lens element on the optical axis is IN12. The following condition is satisfied: 0<IN12/f≤60. Preferably, the following condition may be satisfied: 0.01≤IN12/f≤4.0. Hereby, the chromatic aberration of the lens elements can be mitigated, such that their performance is improved.

The distance between the second lens element and the third lens element on the optical axis is IN23. The following condition is satisfied: 0<IN23/f≤5.0. Preferably, the following condition may be satisfied: 0.01≤IN23/f≤3.0. Hereby, the performance of the lens elements can be improved.

The distance between the third lens element and the fourth lens element on the optical axis is IN34. The following condition is satisfied: 0<IN34/f≤5.0. Preferably, the following condition may be satisfied: 0.001≤IN34/f≤3.0. Hereby, the performance of the lens elements can be improved.

Central thicknesses of the first lens element and the second lens element on the optical axis are TP1 and TP2, respectively. The following condition is satisfied: 1≤(TP1+IN12)/TP2≥20. Hereby, the sensitivity of the optical image capturing system can be controlled, and its performance can be improved.

Central thicknesses of the third lens element and the fourth lens element on the optical axis are TP3 and TP4, respectively, and a distance between the aforementioned two lens elements on the optical axis is IN34. The following condition is satisfied: $1 \leq (TP4+IN34)/TP3 \geq 10$. Hereby, the sensitivity produced by the optical image capturing system can be controlled and the total height of the optical image capturing system can be reduced.

The distance between the second lens element and the third lens element on the optical axis is IN23. The total sum of distances from the first lens element to the fourth lens element on the optical axis is $\Sigma TP$. The following condition is satisfied: $0.01 \leq IN23/(TP2+IN23+TP3) \leq 0.9$. Preferably, the following condition may be satisfied: $0.05 \leq IN23/(TP2+IN23+TP3) \leq 0.7$. Hereby, the aberration generated when the incident light is travelling inside the optical system can be corrected slightly layer upon layer, and the total height of the optical image capturing system can be reduced.

In the optical image capturing system of the disclosure, a distance paralleling an optical axis from a maximum effective diameter position to an axial point on the object-side surface 142 of the fourth lens element is InRS41 (InRS41 is positive if the horizontal displacement is toward the image-side surface, or InRS41 is negative if the horizontal displacement is toward the object-side surface). A distance paralleling an optical axis from a maximum effective diameter position to an axial point on the image-side surface 144 of the fourth lens element is InRS42. A central thickness of the fourth lens element 140 on the optical axis is TP4. The following conditions are satisfied: $-1 \text{ mm} \leq InRS41 \leq 1 \text{ mm}$, $-1 \text{ mm} \leq InRS42 \leq 1 \text{ mm}$, $1 \text{ mm} \leq |InRS41|+|InRS42| \leq 2 \text{ mm}$, $0.01 \leq |InRS41|/TP4 \geq 10$ and $0.01 \leq |InRS42|/TP4 \leq 10$. Hereby, the maximum effective diameter position between both surfaces of the fourth lens element can be controlled, so as to facilitate the aberration correction of peripheral field of view of the optical image capturing system and maintain its miniaturization effectively.

In the optical image capturing system of the disclosure, a distance paralleling an optical axis from an inflection point on the object-side surface of the fourth lens element which is nearest to the optical axis to an axial point on the object-side surface of the fourth lens element is denoted by SGI411. A distance paralleling an optical axis from an inflection point on the image-side surface of the fourth lens element which is nearest to the optical axis to an axial point on the image-side surface of the fourth lens element is denoted by SGI421. The following conditions are satisfied: $0 < SGI411/(SGI411+TP4) \leq 0.9$ and $0 < SGI421/(SGI421+TP4) \leq 0.9$. Preferably, the following conditions may be satisfied: $0.01 < SGI411/(SGI411+TP4) \leq 0.7$ and $0.01 < SGI421/(SGI421+TP4) \leq 0.7$.

A distance paralleling the optical axis from the inflection point on the object-side surface of the fourth lens element which is the second nearest to the optical axis to an axial point on the object-side surface of the fourth lens element is denoted by SGI412. A distance paralleling an optical axis from an inflection point on the image-side surface of the fourth lens element which is the second nearest to the optical axis to an axial point on the image-side surface of the fourth lens element is denoted by SGI422. The following conditions are satisfied: $0 < SGI412/(SGI412+TP4) \leq 0.9$ and $0 < SGI422/(SGI422+TP4) \leq 0.9$. Preferably, the following conditions may be satisfied: $0.1 \leq SGI412/(SGI412+TP4) \leq 0.8$ and $0.1 \leq SGI422/(SGI422+TP4) \leq 0.8$.

A distance perpendicular to the optical axis between the inflection point on the object-side surface of the fourth lens element which is nearest to the optical axis and the optical axis is denoted by HIF411. A distance perpendicular to the optical axis between an inflection point on the image-side surface of the fourth lens element which is nearest to the optical axis and an axial point on the image-side surface of the fourth lens element is denoted by HIF421. The following conditions are satisfied: $0.01 \leq HIF411/HOI \leq 0.9$ and $0.01 \leq HIF421/HOI \leq 0.9$. Preferably, the following conditions may be satisfied: $0.09 \leq HIF411/HOI \leq 0.5$ and $0.09 \leq HIF421/HOI \leq 0.5$.

A distance perpendicular to the optical axis between the inflection point on the object-side surface of the fourth lens element which is the second nearest to the optical axis and the optical axis is denoted by HIF412. A distance perpendicular to the optical axis between an axial point on the image-side surface of the fourth lens element and an inflection point on the image-side surface of the fourth lens element which is the second nearest to the optical axis is denoted by HIF422. The following conditions are satisfied: $0.01 \leq HIF412/HOI \leq 0.9$ and $0.01 \leq HIF422/HOI \leq 0.9$. Preferably, the following conditions may be satisfied: $0.09 \leq HIF412/HOI \leq 0.8$ and $0.09 \leq HIF422/HOI \leq 0.8$.

A distance perpendicular to the optical axis between the inflection point on the object-side surface of the fourth lens element which is the third nearest to the optical axis and the optical axis is denoted by HIF413. A distance perpendicular to the optical axis between an axial point on the image-side surface of the fourth lens element and an inflection point on the image-side surface of the fourth lens element which is the third nearest to the optical axis is denoted by HIF423. The following conditions are satisfied: $0.001 \text{ mm} \leq |HIF413| \leq 5 \text{ mm}$ and $0.001 \text{ mm} \leq |HIF423| \leq 5 \text{ mm}$. Preferably, the following conditions may be satisfied: $0.1 \text{ mm} \leq |HIF423| \leq 3.5 \text{ mm}$ and $0.1 \text{ mm} \leq |HIF413| \leq 3.5 \text{ mm}$.

A distance perpendicular to the optical axis between the inflection point on the object-side surface of the fourth lens element which is the fourth nearest to the optical axis and the optical axis is denoted by HIF414. A distance perpendicular to the optical axis between an axial point on the image-side surface of the fourth lens element and an inflection point on the image-side surface of the fourth lens element which is the fourth nearest to the optical axis is denoted by HIF424. The following conditions are satisfied: $0.001 \text{ mm} \leq |HIF414| \leq 5 \text{ mm}$ and $0.001 \text{ mm} \leq |HIF424| \leq 5 \text{ mm}$ Preferably, the following conditions may be satisfied: $0.1 \text{ mm} \leq |HIF424| \leq 3.5 \text{ mm}$ and $0.1 \text{ mm} \leq |HIF414| \leq 3.5 \text{ mm}$.

In one embodiment of the optical image capturing system of the present disclosure, the chromatic aberration of the optical image capturing system can be corrected by alternatively arranging the lens elements with large Abbe number and small Abbe number.

The equation for the aforementioned aspheric surface is:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \ldots \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

The optical image capturing system provided by the disclosure, the lens elements may be made of glass or plastic material. If plastic material is adopted to produce the lens elements, the cost of manufacturing as well as the weight of the lens element can be reduced effectively. If lens elements are made of glass, the heat effect can be controlled, and there will be more options to allocation the refractive powers of the lens elements in the optical image capturing system. Besides, the object-side surface and the image-side surface of the first through fourth lens elements may be aspheric, which provides more control variables, such that the number of lens elements used can be reduced in contrast to traditional glass lens element, and the aberration can be reduced too. Thus, the total height of the optical image capturing system can be reduced effectively.

In addition, in the optical image capturing system provided by the disclosure, if the lens element has a convex surface, the surface of the lens element adjacent to the optical axis is convex. If the lens element has a concave surface, the surface of the lens element adjacent to the optical axis is concave.

Besides, in the optical image capturing system of the disclosure, according to different requirements, at least one aperture stop may be arranged for reducing stray light and improving the imaging quality.

The optical image capturing system of the disclosure can be adapted to the optical image capturing system with automatic focus if required. With the features of a good aberration correction and a high quality of image formation, the optical image capturing system can be used in various applications.

The optical image capturing system of the disclosure can include a driving module according to the actual requirements. The driving module may be coupled with the lens elements and enables the movement of the lens elements. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens element among the first lens element, the second lens element, the third lens element and the fourth lens element of the optical image capturing system of the present disclosure may be a light filtering element which has a wavelength less than 500 nm according to the actual requirements. The light filtering element may be made by coating film on at least one surface of that lens element with certain filtering function, or forming the lens element with material that can filter light with short wavelength.

According to the above embodiments, the specific embodiments with figures are presented in detail as below.

The First Embodiment

Figure 1C:
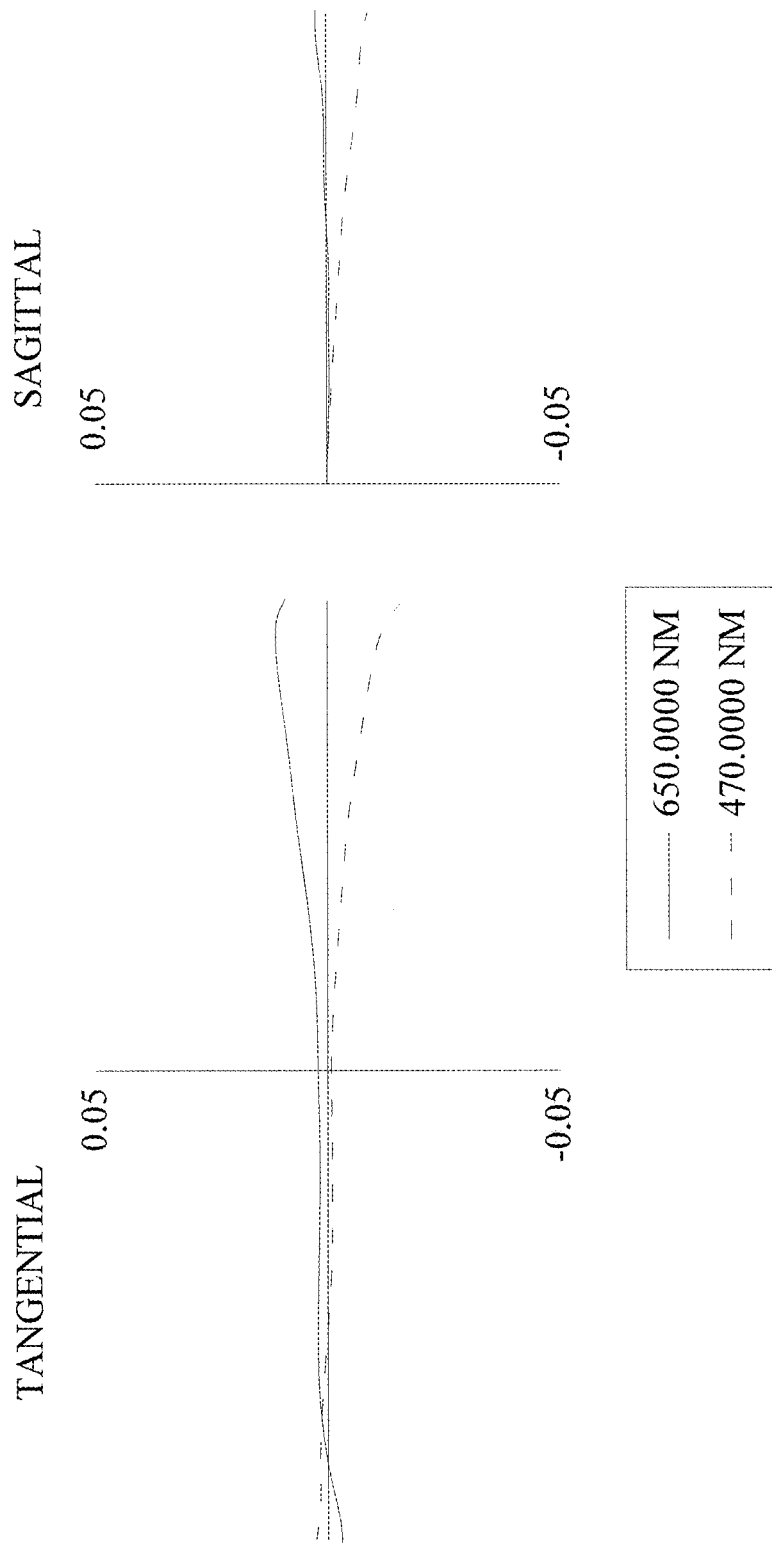
FIG. 1C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the first embodiment of the present invention.
Figure 1D:
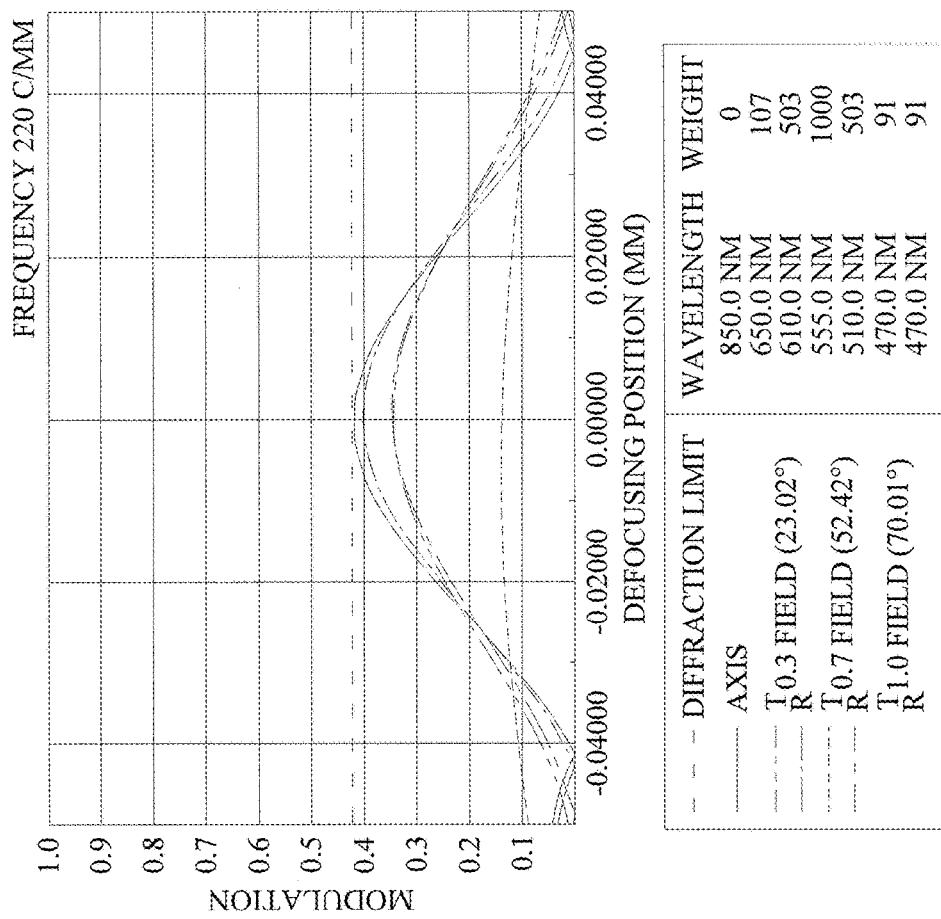
FIG. 1D is a diagram showing the through-focus MTF values of the visible light spectrum at the central field of view, 0.3 field of view, and 0.7 field of view of the first embodiment of the present invention.
Figure 1E:
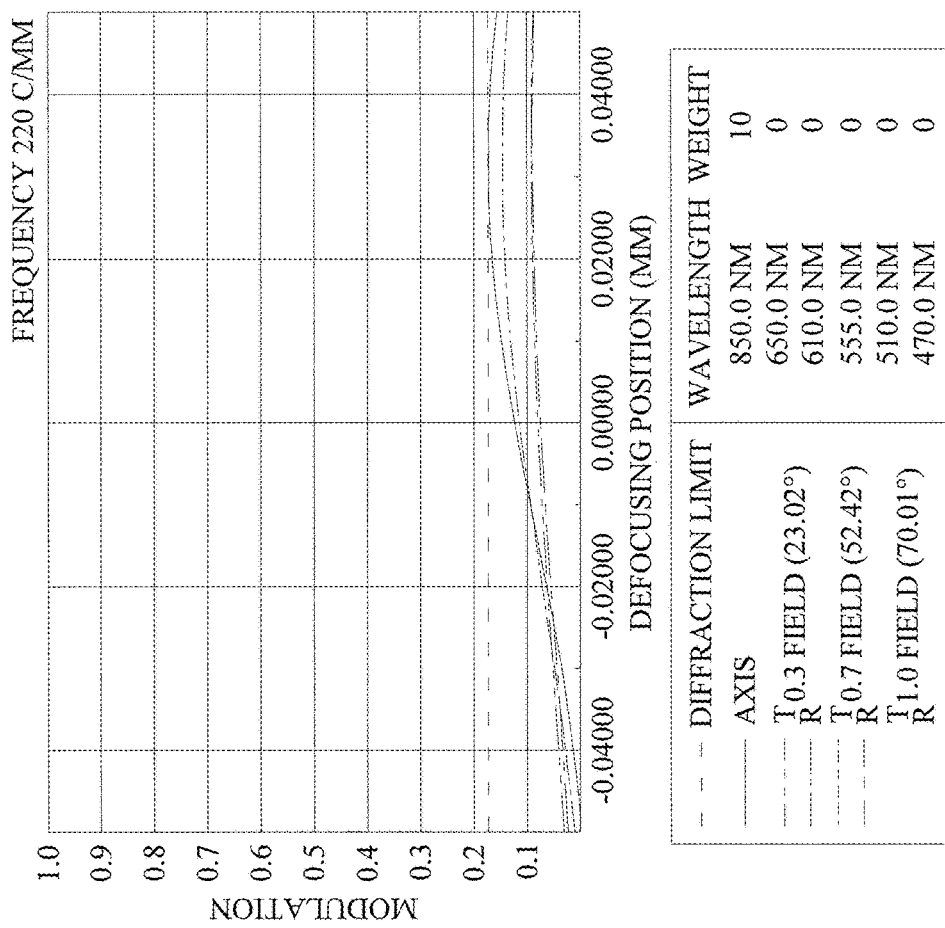
FIG. 1E is a diagram showing the through-focus MTF values of the infrared light spectrum at the central field of view, 0.3 field of view, and 0.7 field of view of the first embodiment of the present disclosure.

Please refer to FIGS. 1A to 1E. FIG. 1A is a schematic view of the optical image capturing system according to the first embodiment of the present invention. FIG. 1B shows the longitudinal spherical aberration curves, astigmatic field curves, and optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the first embodiment of the present invention. FIG. 1D is a diagram showing the through-focus MTF values of the visible light spectrum at the central field of view, 0.3 field of view, and 0.7 field of view of the first embodiment of the present invention. FIG. 1E is a diagram showing the through-focus MTF values of the infrared light spectrum at the central field of view, 0.3 field of view, and 0.7 field of view of the first embodiment of the present disclosure. As shown in FIG. 1A, in the order from an object side to an image side, the optical image capturing system includes a first lens element 110, a second lens element 120, an aperture stop 100, a third lens element 130, a fourth lens element 140, an IR-bandstop filter 170, an image plane 180, and an image sensing device 190.

The first lens element 110 has negative refractive power and it is made of glass material. The first lens element 110 has a convex object-side surface 112 and a concave image-side surface 114, and both of the object-side surface 112 and the image-side surface 114 are aspheric. The length of outline curve of the maximum effective half diameter of the object-side surface of the first lens element is denoted as ARS11. The length of outline curve of the maximum effective half diameter of the image-side surface of the first lens element is denoted as ARS12. The length of outline curve of ½ entrance pupil diameter (HEP) of the object-side surface of the first lens element is denoted as ARE11, and the length of outline curve of ½ entrance pupil diameter (HEP) of the image-side surface of the first lens element is denoted as ARE12. The central thickness of the first lens element on the optical axis is TP1.

A distance paralleling an optical axis from an inflection point on the object-side surface of the first lens element which is nearest to the optical axis to an axial point on the object-side surface of the first lens element is denoted by SGI111. A distance paralleling an optical axis from an inflection point on the image-side surface of the first lens element which is nearest to the optical axis to an axial point on the image-side surface of the first lens element is denoted by SGI121. The following conditions are satisfied: SGI111=0 mm, SGI121=0 mm, |SGI111|/(|SGI111|+TP1)=0 and |SGI121|/(|SGI121|+TP1)=0.

A distance perpendicular to the optical axis from the inflection point on the object-side surface of the first lens element which is nearest to the optical axis to an axial point on the object-side surface of the first lens element is denoted by HIF111. A distance perpendicular to the optical axis from the inflection point on the image-side surface of the first lens element which is nearest to the optical axis to an axial point on the image-side surface of the first lens element is denoted by HIF121. The following conditions are satisfied: HIF111=0 mm, HIF121=0 mm, HIF111/HOI=0 and HIF121/HOI=0.

The second lens element 120 has positive refractive power and it is made of plastic material. The second lens element 120 has a concave object-side surface 122 and a convex image-side surface 124, and both of the object-side surface 122 and the image-side surface 124 are aspheric. The object-side surface 122 thereof has an inflection point. The length of outline curve of the maximum effective half diameter of the object-side surface of the second lens element is denoted as ARS21, and the length of outline curve of the maximum effective half diameter of the image-side surface of the second lens element is denoted as ARS22. The length of outline curve of ½ entrance pupil diameter (HEP) of the object-side surface of the second lens element is denoted as ARE21, and the length of outline curve of ½ entrance pupil diameter (HEP) of the image-side surface of the second lens element is denoted as ARE22. The central thickness of the second lens element on the optical axis is TP2.

A distance paralleling an optical axis from an inflection point on the object-side surface of the second lens element which is nearest to the optical axis to an axial point on the object-side surface of the second lens element is denoted by SGI211. A distance paralleling an optical axis from an inflection point on the image-side surface of the second lens element which is nearest to the optical axis to an axial point on the image-side surface of the second lens element is denoted by SGI221. The following conditions are satisfied: SGI211=−0.13283 mm and SGI2111/(|SGI211|+TP2)=0.05045.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following conditions are satisfied: HIF211=2.10379 mm and HIF211/HOI=0.69478.

The third lens element 130 has negative refractive power and it is made of plastic material. The third lens element 130 has a concave object-side surface 132 and a concave image-side surface 134, and both of the object-side surface 132 and the image-side surface 134 are aspheric. The image-side surface 134 thereof has an inflection point. The length of outline curve of the maximum effective half diameter of the object-side surface of the third lens element is denoted as ARS31, and the length of outline curve of the maximum effective half diameter position of the image-side surface of the third lens element is denoted as ARS32. The length of outline curve of a ½ entrance pupil diameter (HEP) of the object-side surface of the third lens element is denoted as ARE31, and the length of outline curve of the ½ entrance pupil diameter (HEP) of the image-side surface of the third lens element is denoted as ARE32. The central thickness of the third lens element on the optical axis is TP3.

A distance paralleling an optical axis from an inflection point on the object-side surface of the third lens element which is nearest to the optical axis to an axial point on the object-side surface of the third lens element is denoted by SGI311. A distance paralleling an optical axis from an inflection point on the image-side surface of the third lens element which is nearest to the optical axis to an axial point on the image-side surface of the third lens element is denoted by SGI321. The following relationship are satisfied: SGI321=0.01218 mm, and |SGI321|/(|SGI321|+TP3)=0.03902.

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following conditions are satisfied: HIF321=0.84373 mm and HIF321/HOI=0.27864.

The fourth lens element 140 has positive refractive power and it is made of plastic material. The fourth lens element 140 has a convex object-side surface 142 and a convex image-side surface 144; both of the object-side surface 142 and the image-side surface 144 are aspheric. The image-side surface 144 thereof has one inflection point. The length of the maximum effective half diameter outline curve of the object-side surface of the fourth lens element is denoted as ARS41, and the length of the maximum effective half diameter outline curve of the image-side surface of the fourth lens element is denoted as ARS42. The length of ½ entrance pupil diameter (HEP) outline curve of the object-side surface of the fourth lens element is denoted as ARE41, and the length of the ½ entrance pupil diameter (HEP) outline curve of the image-side surface of the fourth lens element is denoted as ARE42. The central thickness of the fourth lens element on the optical axis is TP4.

A distance paralleling an optical axis from an inflection point on the object-side surface of the fourth lens element which is nearest to the optical axis to an axial point on the object-side surface of the fourth lens element is denoted by SGI411. A distance paralleling an optical axis from an inflection point on the image-side surface of the fourth lens element which is nearest to the optical axis to an axial point on the image-side surface of the fourth lens element is denoted by SGI421. The following conditions are satisfied: SGI411=0 mm, SGI421=−0.41627 mm, |SGI411|/(|SGI411|+TP4)=0, and |SGI421|/(|SGI421|+TP4)=0.25015.

A distance paralleling an optical axis from an inflection point on the object-side surface of the fourth lens element which is the second nearest to the optical axis to an axial point on the object-side surface of the fourth lens element is denoted by SGI412. The following conditions are satisfied: SGI412=0 mm and |SGI412|/(|SGI412|+TP4)=0.

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following conditions are satisfied: HIF411=0 mm, HIF421=1.55079 mm, HIF411/HOI=0, and HIF421/HOI=0.51215.

A distance perpendicular to the optical axis between the inflection point on the object-side surface of the fourth lens element which is second nearest to the optical axis and the optical axis is denoted by HIF412. The following conditions are satisfied: HIF412=0 mm and HIF412/HOI=0.

The IR-bandstop filter 170 is made of glass material and is disposed between the fourth lens element 140 and the image plane 180. The IR-bandstop filter 170 does not affect the focal length of the optical image capturing system.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=2.6841 mm, f/HEP=2.7959, HAF=70 deg, and tan(HAF)=2.7475.

In the optical image capturing system of the first embodiment, a focal length of the first lens element 110 is f1 and a focal length of the fourth lens element 140 is f4. The following conditions are satisfied: f1=−5.4534 mm, |f/f1|=0.4922, f4=2.7595 mm, and |f1/f4|=1.9762.

In the optical image capturing system of the first embodiment, a focal length of the second lens element 120 is f2 and a focal length of the third lens element 130 is f3. The following conditions are satisfied: |f2|+|f3|=13.2561 mm, |f1|+|f4|=8.2129 mm, and |f2|+|f3|>|f1|+|f4|.

The ratio of the focal length f of the optical image capturing system to a focal length fp of each of lens elements with positive refractive powers is PPR. The ratio of the focal length f of the optical image capturing system to a focal length fn of each of lens elements with negative refractive powers is NPR. In the optical image capturing system of the first embodiment, a sum of the PPR of all lens elements with positive refractive powers is ΣPPR=|f/f2|+|f/f4|=1.25394. The sum of the NPR of all lens elements with negative refractive powers is ΣNPR=|f/f1|+|f/f2|=1.21490 and ΣPPR/

|ΣNPR|=1.03213. The following conditions are also satisfied: |f/f1|=0.49218, |f/f2|=0.28128, |f/f3|=0.72273, and |f/f4|=0.97267.

In the optical image capturing system of the first embodiment, a distance from the object-side surface 112 of the first lens element to the image-side surface 144 of the fourth lens element is InTL. A distance from the object-side surface 112 of the first lens element to the image plane 180 is HOS. A distance from an aperture 100 to an image plane 180 is InS. Half of a diagonal length of an effective detection field of the image sensing device 190 is HOI. A distance from the image-side surface 144 of the fourth lens element to an image plane 180 is InB. The following conditions are satisfied: InTL+InB=HOS, HOS=18.74760 mm, HOI=3.088 mm, HOS/HOI=6.19141, HOS/f=6.9848, InTL/HOS=0.6605, InS=8.2310 mm, and InS/HOS=0.4390.

In the optical image capturing system of the first embodiment, the sum of central thicknesses of all lens elements with refractive power on the optical axis is ΣTP. The following conditions are satisfied: ΣTP=4.9656 mm and ΣTP/InTL=0.4010. Therefore, both contrast ratio for the image formation in the optical image capturing system and yield rate of the manufacturing process of the lens element can be balanced, and a proper back focal length is provided to accommodate other optical components in the optical image capturing system.

In the optical image capturing system of the first embodiment, a curvature radius of the object-side surface 112 of the first lens element is R1. A curvature radius of the image-side surface 114 of the first lens element is R2. The following condition is satisfied: |R1/R2|=9.6100. Hereby, the first lens element has a suitable magnitude of the positive refractive power, so as to prevent the spherical aberration from increasing too fast.

In the optical image capturing system of the first embodiment, a curvature radius of the object-side surface 142 of the fourth lens element is R7. A curvature radius of the image-side surface 144 of the fourth lens element is R8. The following condition is satisfied: (R7−R8)/(R7+R8)=−35.5932. As such, the astigmatism generated by the optical image capturing system can be corrected.

In the optical image capturing system of the first embodiment, the sum of the focal lengths for all lens elements having positive refractive power is ΣPP, which satisfies the following conditions: ΣPP=12.30183 mm, and f4/ΣPP=0.22432. Therefore, the positive refractive power of the fourth lens element 140 may be distributed to other lens elements with positive refractive power appropriately, so as to suppress noticeable aberrations generated when the incident light is propagating in the optical system.

In the optical image capturing system of the first embodiment, the sum of the focal lengths for all lens elements having negative refractive power is ΣNP, which satisfies the following conditions: ΣNP=−14.6405 mm, and f1/ΣNP=0.59488. Therefore, the negative refractive power of the first lens element 110 may be distributed to other lens elements with negative refractive power appropriately, so as to suppress noticeable aberrations generated when the incident light is propagating in the optical system.

In the optical image capturing system of the first embodiment, a distance between the first lens element 110 and the second lens element 120 on the optical axis is IN12. The following conditions are satisfied: IN12=4.5709 mm and IN12/f=1.70299. Hereby, the chromatic aberration of the lens elements can be mitigated, such that the performance of the optical system is increased.

In the optical image capturing system of the first embodiment, a distance between the second lens element 120 and the third lens element 130 on the optical axis is IN23. The following conditions are satisfied: IN23=2.7524 mm, IN23/f=1.02548. Hereby, the chromatic aberration of the lens elements can be mitigated, such that the performance of the optical system is increased.

In the optical image capturing system of the first embodiment, a distance between the third lens element 130 and the fourth lens element 140 on the optical axis is IN34. The following conditions are satisfied: IN34=0.0944 mm and IN34/f=0.03517. Hereby, the chromatic aberration of the lens elements can be mitigated, such that the performance of the optical system is increased.

In the optical image capturing system of the first embodiment, central thicknesses of the first lens element 110 and the second lens element 120 on the optical axis are TP1 and TP2, respectively. The following conditions are satisfied: TP1=0.9179 mm, TP2=2.5000 mm, TP1/TP2=0.36715, and (TP1+IN12)/TP2=2.19552. Hereby, the sensitivity of the optical image capturing system can be controlled, and the performance thereof can be improved.

In the optical image capturing system of the first embodiment, central thicknesses of the third lens element 130 and the fourth lens element 140 on the optical axis are TP3 and TP4, respectively. The separation distance between the third lens element 130 and the fourth lens element 140 on the optical axis is IN34. The following conditions are satisfied: TP3=0.3 mm, TP4=1.2478 mm, TP3/TP4=0.24043, and (TP4+IN34)/TP3=4.47391 Hereby, the sensitivity of the optical image capturing system can be controlled, and the total height of the optical image capturing system can be reduced.

In the optical image capturing system of the first embodiment, the following conditions are satisfied: IN23/(TP2+IN23+TP3)=0.49572. Hereby, the aberration generated when the incident light is propagating inside the optical system can be corrected slightly by each lens element, and the total height of the optical image capturing system can be reduced.

In the optical image capturing system of the first embodiment, a distance paralleling an optical axis from a maximum effective diameter position to an axial point on the object-side surface 142 of the fourth lens element is InRS41. A distance paralleling an optical axis from a maximum effective diameter position to an axial point on the image-side surface 144 of the fourth lens element is InRS42. A central thickness of the fourth lens element 140 is TP4. The following conditions are satisfied: InRS41=0.2955 mm, InRS42=−0.4940 mm, |InRS41|+|InRS42|=0.7894 mm, |InRS41|/TP4=0.23679, and |lnRS42|/TP4=0.39590. This configuration is favorable to the manufacturing and forming of lens elements, as well as the minimization of the optical image capturing system.

In the optical image capturing system of the first embodiment, a distance perpendicular to the optical axis between a critical point C41 on the object-side surface 142 of the fourth lens element and the optical axis is HVT41. A distance perpendicular to the optical axis between a critical point C42 on the image-side surface 144 of the fourth lens element and the optical axis is HVT42. The following conditions are satisfied: HVT41=0 mm and HVT42=0 mm.

In the optical image capturing system of the first embodiment, the following condition is satisfied: HVT42/HOI=0.

In the optical image capturing system of the first embodiment, the following condition is satisfied: HVT42/HOS=0.

In the optical image capturing system of the first embodiment, the Abbe number of the first lens element is NA1. The Abbe number of the second lens element is NA2. The Abbe number of the third lens element is NA3. The Abbe number of the fourth lens element is NA4. The following conditions are satisfied: |NA1−NA2|=0.0351. Hereby, the chromatic aberration of the optical image capturing system can be corrected.

In the optical image capturing system of the first embodiment, TV distortion and optical distortion for image formation in the optical image capturing system are TDT and ODT, respectively. The following conditions are satisfied: TDT=37.4846% and ODT=−55.3331%

In the present embodiment, the lights of any field of view can be further divided into sagittal ray and tangential ray, and the spatial frequency of 220 cycles/mm serves as the benchmark for assessing the focus shifts and the values of MTF. The focus shifts where the through-focus MTF values of the visible sagittal ray at the central field of view, 0.3 field of view, and 0.7 field of view of the optical image capturing system are at their respective maxima are denoted by VSFS0, VSFS3, and VSFS7 (unit of measurement: mm), respectively. The values of VSFS0, VSFS3, and VSFS7 equal to 0.00000 mm, 0.00000 mm, and 0.00000 mm, respectively. The maximum values of the through-focus MTF of the visible sagittal ray at the central field of view, 0.3 field of view, and 0.7 field of view are denoted by VSMTF0, VSMTF3, and VSMTF7, respectively. The values of VSMTF0, VSMTF3, and VSMTF7 equal to 0.416, 0.397, and 0.342, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The values of VTFS0, VTFS3, and VTFS7 equal to 0.00000 mm, 0.00000 mm, and −0.01000 mm, respectively. The maximum values of the through-focus MTF of the visible tangential ray at the central field of view, 0.3 field of view, and 0.7 field of view are denoted by VTMTF0, VTMTF3, and VTMTF7, respectively. The values of VTMTF0, VTMTF3, and VTMTF7 equal to 0.416, 0.34, and 0.139, respectively. The average focus shift (position) of both of the aforementioned focus shifts of the visible sagittal ray at three fields of view and focus shifts of the visible tangential ray at three fields of view is denoted by AVFS (unit of measurement: mm), which satisfies the absolute value |(VSFS0+VSFS3+VSFS7+VTFS0+VTFS3+VTFS7)/6|=|−0.00200 mm|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The values of ISFS0, ISFS3, and ISFS7 equal to 0.03000 mm, 0.03300 mm, and 0.03300 mm, respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The values of ISMTF0, ISMTF3, and ISMTF7 equal to 0.169, 0.148, and 0.089, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The values of ITFS0, ITFS3, and ITFS7 equal to 0.03, 0.028, and 0.005, respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The values of ITMTF0, ITMTF3, and ITMTF7 equal to 0.169, 0.093, and 0.00000, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|=|0.02600 mm|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS (the distance between the first and second image planes on the optical axis), which satisfies the absolute value |(VSFS0+VTFS0)/2−(ISFS0+ITFS0)/2|=|0.03000 mm|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), for which the absolute value of |AIFS−AVFS|=|0.02800 mm| is satisfied.

In the optical image capturing system of the first embodiment, the transverse aberration of the longest operation wavelength of a positive direction tangential fan passing through the edge of the aperture and incident at the position of 0.7 field of view on the first image plane is denoted as PLTA, which is −0.018 mm. The transverse aberration of the shortest operation wavelength of a positive direction tangential fan passing through the edge of the aperture and incident at the position of 0.7 field of view on the first image plane is denoted as PSTA, which is 0.010 mm. The transverse aberration of the longest operation wavelength of the negative direction tangential fan passing through the edge of the aperture and incident at the position of 0.7 field of view on the first image plane is denoted as NLTA, which is 0.003 mm. The transverse aberration of the shortest operation wavelength of the negative direction tangential fan passing through the edge of the aperture and incident at the position of 0.7 field of view on the first image plane is denoted as NSTA, which is −0.003 mm. The transverse aberration of the longest operation wavelength of the sagittal fan passing through the edge of the aperture and incident at the position of 0.7 field of view on the first image plane is denoted as SLTA, which is −0.010 mm. The transverse aberration of the shortest operation wavelength of the sagittal fan passing through the edge of the aperture and incident at the position of 0.7 field of view on the first image plane is denoted as SSTA, which is 0.003 mm.

Figure 7:
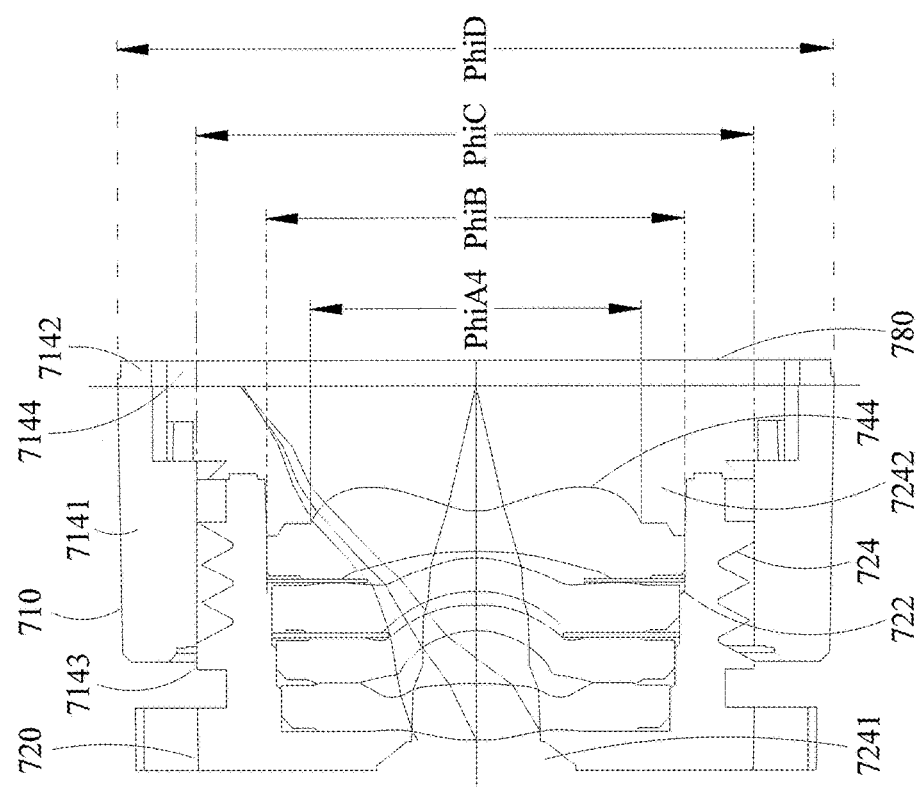
FIG. 7 is a schematic diagram illustrating the maximum effective diameter PhiA4 of the image-side surface of the fourth lens element, the maximum diameter PhiB of the image-side surface of the fourth lens element, the shortest side length PhiD of the base portion of the first lens positioning element, and the maximum outer diameter PhiC of the connecting portion of the second lens positioning element, in which PhiC and PhiD are measured on the plane perpendicular to the optical axis.

Please refer to FIG. 7. In the present embodiment, the optical image capturing system may include an image sensing device (not illustrated). The image sensor may include a substrate and an image sensor. The optical image capturing system may further include a first lens positioning element 710. The first lens positioning element may include a base and a lens base. The lens base may be disposed with an open accommodation space and may be disposed on the substrate, such that the image sensor may be accommodated in the accommodation space. The lens base, which may be integrally formed, may be hollow and opaque. The lens base may be disposed with a barrel portion 7141 and a base portion 7142 that are interconnected. The first hole 7143 and the second hole 7144 are respectively disposed at two opposite ends of the lens base. The first hole 7143 may be connected to the barrel portion 7141 and the second hole 7144 may be connected to the base portion 7142. The shortest side length of the base portion 7142, which is measured on a plane perpendicular to the optical axis, has a maximum value denoted by PhiD. The following condition is satisfied: PhiD=3.3 mm.

In the present embodiment, the optical image capturing system may further include a second lens positioning element 720. The second lens positioning element 720, which may include a positioning portion 722 and a connecting portion 724, may be accommodated in the lens base of the first lens positioning element 710. The positioning portion 722 may be hollow. A third hole 7241 and a fourth hole 7242 may be respectively disposed at two ends of the positioning portion 722 that are opposite to each other in the direction of the optical axis. The third hole 7241 may be connected to the positioning portion 722, and the fourth hole 7242 may be connected to the base portion 7142. The positioning portion 722 may come into direct contact with any lens element of the present embodiment. In addition, the positioning portion 722 is capable of accommodating the lens element and aligning the lens element on the optical axis. The connecting portion 724 may be disposed on the outer side of the positioning portion 722. The connecting portion 724 may directly couple with the barrel portion 7141 such that the second lens positioning element 720 can be accommodated in the lens base of the first lens positioning element, the optical image capturing system is capable of adjusting the focal length thereof along the optical axis, and the lens element can be positioned. The maximum outer diameter of the connecting portion 724 measured on a plane perpendicular to the optical axis is denoted by PhiC. The following condition is satisfied: PhiC=2.85 mm. The maximum inner diameter of the fourth hole 7242 is denoted by Phi4. The aforementioned connecting portion 724 may be disposed with screw threads, such that the second lens positioning element 720 and the lens base of the first lens positioning element 710 may be screwed together.

Any lens element in the present embodiment may be indirectly disposed in the first lens positioning element 710 through the second lens positioning element 720. Furthermore, the lens element may be nearer to the third hole 7241 than the image sensor, and the optical axis of the lens element may be perpendicular to the image sensor.

In the present embodiment, the fourth lens element 140 is closest to the image plane. The maximum effective diameter of the image-side surface thereof is denoted by PhiA4. The following condition is satisfied: PhiA=2 EHD42=1.767 mm. When the surface is aspheric, the terminal point of the curve defining the maximum effective diameter is the terminal point of the aspheric surface. The ineffective half diameter (IHD) of the image-side surface of the fourth lens element 140 is defined as the section of the image-side surface of the fourth lens element 140, in which the section extends, in a direction away from the optical axis, from the terminal point of the curve defining the maximum effective half diameter on the same surface. In the present embodiment, the fourth lens element 140 is closest to the image plane, and the maximum diameter of the image-side surface thereof is denoted by PhiB. The following condition is satisfied: PhiB=2 (EHD42+IHD)=PhiA4+2 IHD=2.167 mm.

In the present embodiment, the maximum effective diameter of the image-side surface on the lens element that is closest to the image plane (i.e. image space) is the optical exit pupil of the optical image capturing system, which is denoted by PhiA4. The pupil magnification ratio is denoted by PMR, which may satisfy the following condition: PMR=PhiA4/HEP=1.84337. The exit pupil-image height ratio is denoted by PMMR, which may satisfy the following condition: PMMR=PhiA4/2HOI=0.58355. The miniaturization factor is denoted by PSMR, which may satisfy the following condition: PSMR=PhiA4/InTL=0.14269.

Table 1 and Table 2 below should be incorporated into the reference of the present embodiment.

TABLE 1

Lens Parameters for the First Embodiment
f(focal length) = 2.6841 mm; f/HEP = 2.7959;
HAF(half angle of view) = 70 deg; tan(HAF) = 2.7475

| Surface No. | | Curvature Radius | Thickness (mm) | Material | Refractive Index | Abbe No. | Focal Distance |
|---|---|---|---|---|---|---|---|
| 0 | Object | Plane | At infinity | | | | |
| 1 | Lens 1 | 31.98102785 | 0.918 | Glass | 1.688 | 50.26 | −5.453 |
| 2 | | 3.327880578 | 4.571 | | | | |
| 3 | Lens 2 | −15.2556818 | 2.500 | Plastic | 1.642 | 22.46 | 9.542 |
| 4 | | −4.681543531 | 2.528 | | | | |
| 5 | Aperture Stop | Plane | 0.225 | | | | |
| 6 | Lens 3 | −2.453543123 | 0.300 | Plastic | 1.642 | 22.46 | −3.714 |
| 7 | | 127.8664454 | 0.094 | | | | |
| 8 | Lens 4 | 2.697747363 | 1.248 | Plastic | 1.544 | 56.09 | 2.759 |
| 9 | | −2.853715061 | 0.725 | | | | |
| 10 | IR-bandstop Filter | Plane | 2.000 | BK7_SCHOTT | 1.517 | 64.13 | |
| 11 | | Plane | 3.640 | | | | |
| 12 | Image Plane | Plane | | | | | |

Reference Wavelength = 555 nm; Shield Position: The 3$^{rd}$ surface with clear aperture of 3.0 mm

TABLE 2

Aspheric Coefficients of the First Embodiment
Table 2: Aspheric Coefficients

| Surface No. | 3 | 4 | 6 | 7 | 8 | 9 |
|---|---|---|---|---|---|---|
| k = | −2.918829E+01 | −3.214789E+00 | −1.504539E+01 | −2.970417E+01 | −1.613370E+01 | −1.145951E+00 |
| $A_4$ = | −9.004096E−04 | −9.725260E−06 | 8.890018E−05 | 3.634454E−02 | 9.587367E−03 | −4.742020E−03 |
| $A_6$ = | 2.391364E−04 | −8.096303E−05 | −1.166688E−02 | −3.060142E−02 | −3.693991E−03 | 1.232422E−03 |
| $A_8$ = | −2.421089E−05 | 7.787465E−07 | −5.720942E−04 | 8.833265E−03 | 8.653836E−04 | 3.333400E−04 |
| $A_{10}$ = | 1.716292E−06 | 3.517517E−07 | 8.305770E−04 | −1.362695E−03 | −7.093620E−05 | −2.583094E−06 |
| $A_{12}$ = | 0.000000E+00 | 0.000000E+00 | 0.000000E+00 | 0.000000E+00 | 0.000000E+00 | 0.000000E+00 |

The values pertaining to the length of the outline curves are obtainable from the data in Table 1 and Table 2:

| First Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.480 | 0.480 | 0.000 | 100.00% | 0.918 | 52.30% |
| 12 | 0.480 | 0.482 | 0.002 | 100.35% | 0.918 | 52.48% |
| 21 | 0.480 | 0.480 | 0.000 | 100.02% | 2.500 | 19.20% |
| 22 | 0.480 | 0.481 | 0.001 | 100.17% | 2.500 | 19.23% |
| 31 | 0.480 | 0.482 | 0.002 | 100.49% | 0.300 | 160.78% |
| 32 | 0.480 | 0.480 | 0.000 | 100.00% | 0.300 | 160.00% |
| 41 | 0.480 | 0.482 | 0.002 | 100.42% | 1.248 | 38.63% |
| 42 | 0.480 | 0.482 | 0.002 | 100.47% | 1.248 | 38.65% |
| ARS | EHD | ARS value | ARS − EHD | (ARS/EHD) % | TP | ARS/TP (%) |
| 11 | 5.943 | 5.978 | 0.035 | 100.58% | 0.918 | 651.27% |
| 12 | 3.236 | 4.439 | 1.204 | 137.20% | 0.918 | 483.66% |
| 21 | 3.000 | 3.007 | 0.007 | 100.24% | 2.500 | 120.29% |
| 22 | 2.855 | 2.983 | 0.128 | 104.49% | 2.500 | 119.33% |
| 31 | 1.061 | 1.079 | 0.017 | 101.61% | 0.300 | 359.54% |
| 32 | 1.293 | 1.292 | −0.001 | 99.95% | 0.300 | 430.77% |
| 41 | 1.642 | 1.676 | 0.034 | 102.06% | 1.248 | 134.30% |
| 42 | 1.767 | 1.859 | 0.092 | 105.21% | 1.248 | 148.98% |

Table 1 is the detailed structural data for the first embodiment in FIG. 1A, wherein the unit for the curvature radius, the central thickness, the distance, and the focal length is millimeters (mm) Surfaces 0-11 illustrate the surfaces from the object side to the image plane in the optical image capturing system. Table 2 shows the aspheric coefficients of the first embodiment, wherein k is the conic coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
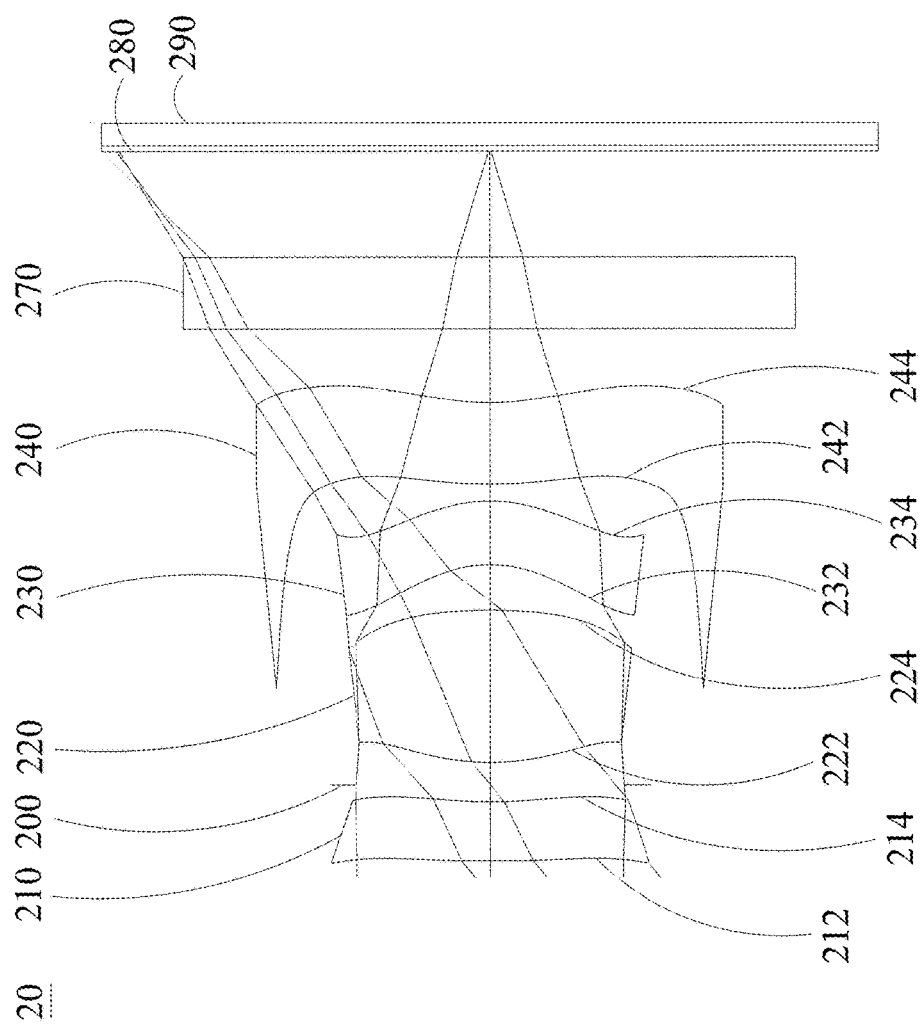
FIG. 2A is a schematic view of the optical image capturing system according to the second embodiment of the present invention.
Figure 2B:
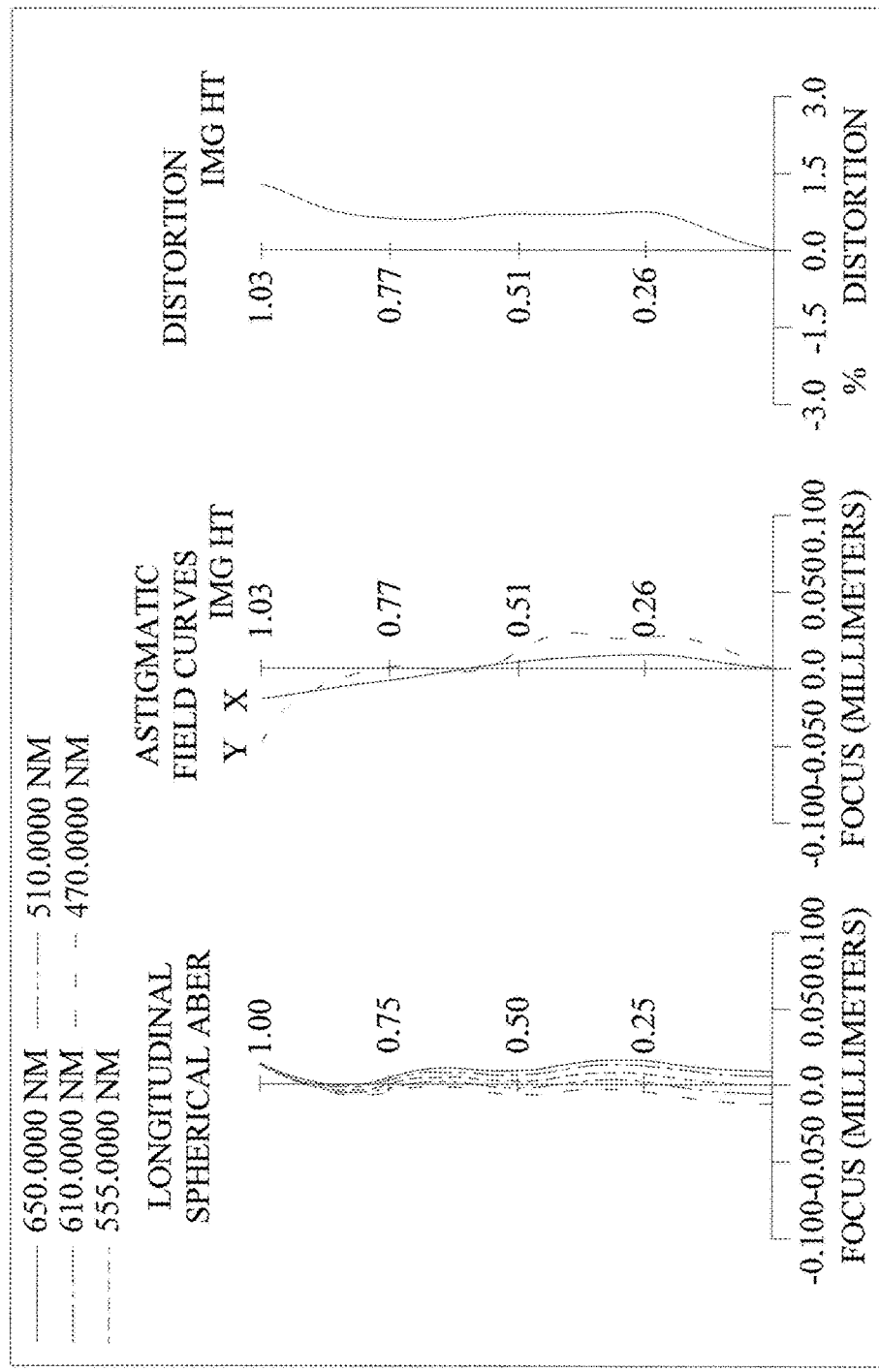
FIG. 2B shows the longitudinal spherical aberration curves, astigmatic field curves, and optical distortion curve of the optical image capturing system in the order from left to right according to the second embodiment of the present invention.
Figure 2D:
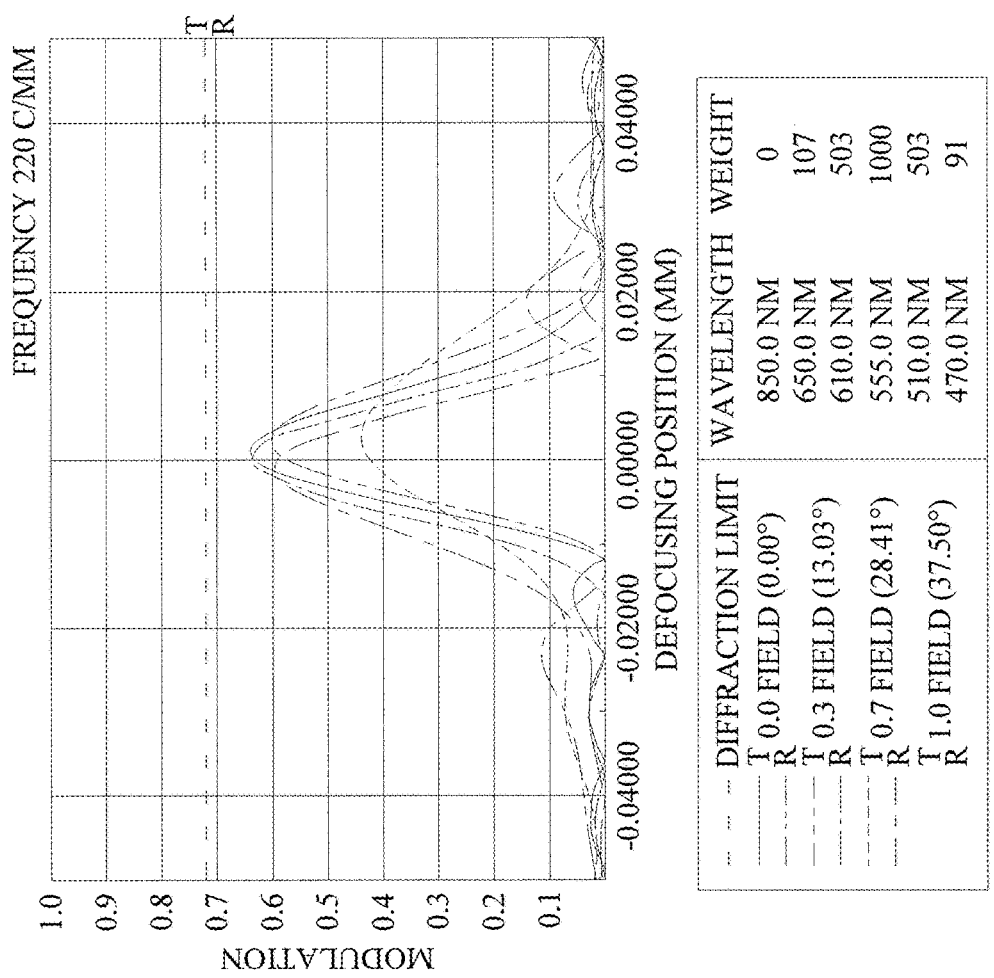
FIG. 2D is a diagram showing the through-focus MTF values of the visible light spectrum at the central field of view, 0.3 field of view, and 0.7 field of view of the second embodiment of the present invention.
Figure 2E:
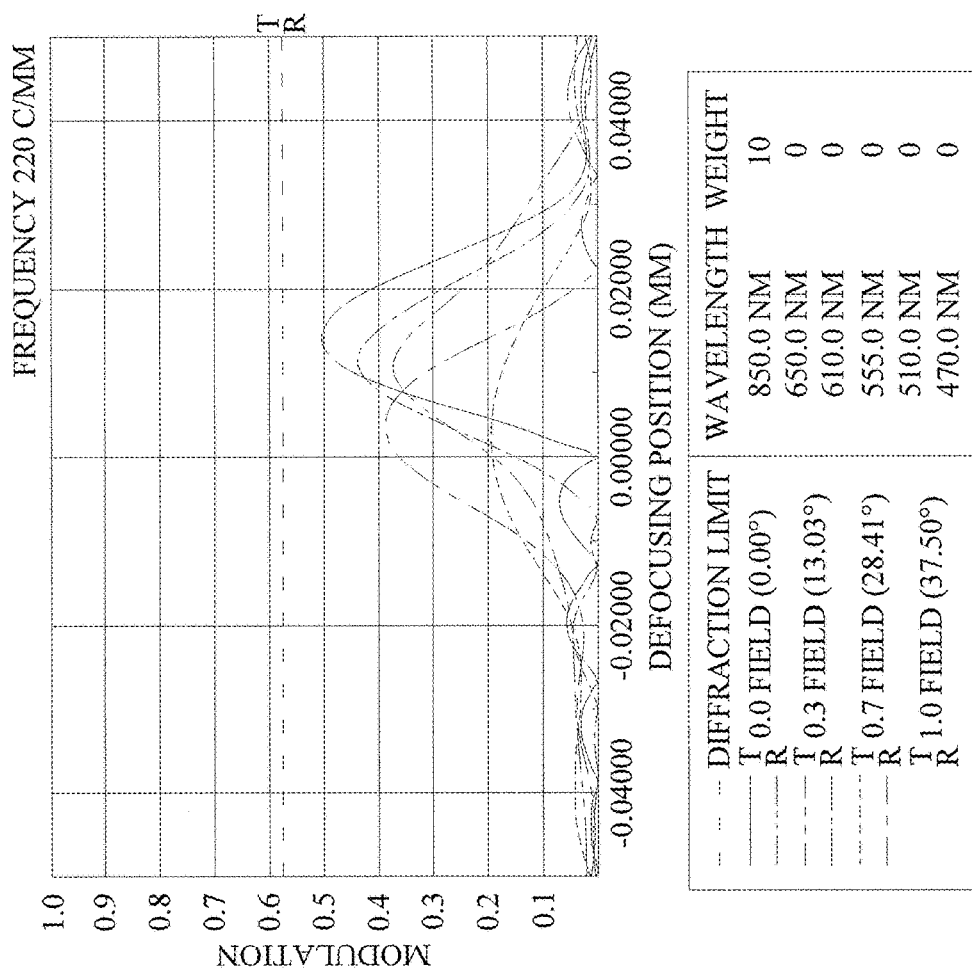
FIG. 2E is a diagram showing the through-focus MTF values of the infrared light spectrum at the central field of view, 0.3 field of view, and 0.7 field of view of the second embodiment of the present disclosure.

Please refer to FIGS. 2A to 2E. FIG. 2A is a schematic view of the optical image capturing system according to the second embodiment of the present invention. FIG. 2B shows the longitudinal spherical aberration curves, astigmatic field curves, and optical distortion curve of the optical image capturing system of the second embodiment, in the order from left to right. FIG. 2C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to optical image capturing system of the second embodiment. FIG. 2D is a diagram showing the through-focus MTF values of the visible light spectrum at the central field of view, 0.3 field of view, and 0.7 field of view of the second embodiment of the present invention. FIG. 2E is a diagram showing the through-focus MTF values of the infrared light spectrum at the central field of view, 0.3 field of view, and 0.7 field of view of the second embodiment of the present disclosure. As shown in FIG. 2A, in the order from an object side to an image side, the optical image capturing system includes a first lens element 210, an aperture stop 200, a second lens element 220, a third lens element 230, a fourth lens element 240, an IR-bandstop filter 270, an image plane 280, and an image sensing device 290.

The first lens element 210 has negative refractive power and is made of plastic material. The first lens element 210 has a convex object-side surface 212 and a concave image-side surface 214. Both object-side surface 212 and image-side surface 214 are aspheric and have one inflection point.

The second lens element 220 has positive refractive power and is made of plastic material. The second lens element 220 has a convex object-side surface 222 and a convex image-side surface 224, and both object-side surface 222 and image-side surface 224 are aspheric. The object-side surface 222 thereof has one inflection point.

The third lens element 230 has positive refractive power and is made of plastic material. The third lens element 230 has a concave object-side surface 232 and a convex image-side surface 234, and both object-side surface 232 and image-side surface 234 are aspheric. Both object-side surface 232 and image-side surface 234 have one inflection point.

The fourth lens element 240 has negative refractive power and is made of plastic material. The fourth lens element 240 has a convex object-side surface 242 and a concave image-side surface 244, and both object-side surface 242 and image-side surface 244 are aspheric. The object-side surface 242 and image-side surface 244 thereof have one inflection point.

The IR-bandstop filter 270 is made of glass material and is disposed between the fourth lens element 240 and the image plane 280. The IR-bandstop filter 270 does not affect the focal length of the optical image capturing system.

In the optical image capturing system of the second embodiment, the second and third lens elements are positive lens, and their focal lengths are f2 and f3, respectively. The sum of the focal lengths for all lens elements having positive refractive power is ΣPP, which satisfies the following condition: ΣPP=f2+f3. Therefore, the positive refractive power of a single lens element may be distributed to other positive lens elements appropriately, so as to suppress noticeable aberrations generated when the incident light is propagating in the optical system.

In the optical image capturing system of the second embodiment, the sum of the focal lengths for all lens elements having negative refractive power is ΣNP, which satisfies the following condition: ΣNP=f1+f4.

Table 3 and Table 4 below should be incorporated into the reference of the present embodiment

TABLE 3

Lens Parameters for the Second Embodiment
f(focal length) = 1.323 mm; f/HEP = 1.8;
HAF(half angle of view) = 37.5 deg; tan(HAF) = 0.7673

| Surface No. | | Curvature Radius | Thickness (mm) | Material | Refractive Index | Abbe No. | Focal Length |
|---|---|---|---|---|---|---|---|
| 0 | Object | Plane | At infinity | | | | |
| 1 | Lens 1 | 2.815155869 | 0.175 | Plastic | 1.515 | 56.55 | −4.014 |
| 2 | | 1.16843349 | 0.051 | | | | |
| 3 | Aperture Stop | Plane | 0.066 | | | | |
| 4 | Lens 2 | 0.599339272 | 0.450 | Plastic | 1.544 | 55.96 | 0.837 |
| 5 | | −1.411016917 | 0.133 | | | | |
| 6 | Lens 3 | −0.317760089 | 0.187 | Plastic | 1.642 | 22.46 | 5.004 |
| 7 | | −0.356324528 | 0.050 | | | | |
| 8 | Lens 4 | 1.400960481 | 0.238 | Plastic | 1.642 | 22.46 | −2.390 |
| 9 | | 0.686143826 | 0.219 | | | | |
| 10 | IR-bandstop Filter | Plane | 0.210 | BK7_SCHOTT | 1.517 | 64.13 | |
| 11 | | Plane | 0.31 | | | | |
| 12 | Image Plane | Plane | | | | | |

Reference Wavelength = 555 nm; Shield Position: The 1$^{st}$ surface with clear aperture of 0.43 mm and the 5$^{th}$ surface with clear aperture of 0.390 mm

TABLE 4

The Aspheric Coefficients of the Second Embodiment
Table 4: Aspheric Coefficients

| Surface No. | 1 | 2 | 4 | 5 | 6 | 7 |
|---|---|---|---|---|---|---|
| k = | −2.100896E+01 | −3.117650E+01 | −6.594072E−01 | −5.749340E+00 | −1.293538E+00 | −1.778968E+00 |
| $A_4$ = | −1.034815E+00 | −1.247743E+00 | −2.144582E+00 | −5.564182E−01 | 5.280891E+00 | 7.147752E+00 |
| $A_6$ = | −1.467293E+01 | −3.933644E+01 | −2.397809E+01 | −5.601046E+01 | −4.929357E+01 | −1.152802E+02 |
| $A_8$ = | 4.846220E+02 | 1.049222E+03 | 1.466540E+03 | 7.715029E+02 | −5.524670E+02 | 1.188148E+03 |
| $A_{10}$ = | −7.102825E+03 | −1.234792E+04 | −4.393327E+04 | −8.580555E+03 | 2.181848E+04 | −6.205622E+03 |
| $A_{12}$ = | 5.884002E+04 | 5.356074E+04 | 7.002153E+05 | 6.735915E+04 | −2.298819E+05 | 2.212051E+04 |
| $A_{14}$ = | −2.820526E+05 | 1.558329E+05 | −6.248007E+06 | −2.902619E+05 | 1.176507E+06 | −6.949962E+04 |
| $A_{16}$ = | 7.245452E+05 | −2.134561E+06 | 2.912419E+07 | 5.267012E+05 | −3.006163E+06 | 1.681686E+05 |
| $A_{18}$ = | −7.701193E+05 | 5.176547E+06 | −5.535295E+07 | −1.326747E+05 | 3.050941E+06 | −1.906600E+05 |
| $A_{20}$ = | 1.874256E+01 | 0.000000E+00 | 0.000000E+00 | 0.000000E+00 | 0.000000E+00 | 0.000000E+00 |

| Surface No. | 8 | 9 |
|---|---|---|
| k = | −9.958872E−02 | −9.720777E+00 |
| $A_4$ = | 2.668792E+00 | −6.993487E−01 |
| $A_6$ = | −1.053723E+02 | −9.822777E+00 |
| $A_8$ = | 1.164018E+03 | 9.374187E+01 |
| $A_{10}$ = | −7.629138E+03 | −4.377047E+02 |
| $A_{12}$ = | 3.098893E+04 | 1.160682E+03 |
| $A_{14}$ = | −7.777603E+04 | −1.720966E+03 |
| $A_{16}$ = | 1.168351E+05 | 1.259258E+03 |
| $A_{18}$ = | −9.146103E+04 | −3.228384E+02 |
| $A_{20}$ = | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 3 and Table 4.

| Second Embodiment (Primary Reference Wavelength 555 nm) | | | | | |
|---|---|---|---|---|---|
| InRS41 | InRS42 | HVT41 | HVT42 | ODT % | TDT % |
| −0.02448 | −0.00545 | 0.30907 | 0.42296 | 1.30002 | 0.70606 |
| \|f/f1\| | \|f/f2\| | \|f/f3\| | \|f/f4\| | \|f1/f2\| | \|f2/f3\| |
| 0.32944 | 1.58025 | 0.26432 | 0.55346 | 4.79676 | 0.16726 |
| ΣPPR | ΣNPR | ΣPPR/ΣNPR\| | ΣPP | ΣNP | f1/ΣPP |
| 1.84456 | 0.88290 | 2.08922 | 5.84043 | −6.40396 | −0.68735 |
| f4/ΣNP | IN12/f | IN23/f | IN34/f | TP3/f | TP4/f |
| 0.37314 | 0.08827 | 0.10034 | 0.03781 | 0.14140 | 0.18018 |
| InTL | HOS | HOS/HOI | InS/HOS | InTL/HOS | ΣTP/InTL |
| 1.34974 | 2.08923 | 2.03232 | 0.89196 | 0.64605 | 0.77815 |
| (TP1 + IN12)/TP2 | (TP4 + IN34)/TP3 | TP1/TP2 | TP3/TP4 | IN23/(TP24 + IN23 + TP3) | |
| 0.64830 | 1.54164 | 0.38889 | 0.78476 | 0.17240 | |
| \|InRS41\|/TP4 | \|InRS42\|/TP4 | HVT42/HOI | HVT42/HOS | | |
| 0.1027 | 0.0229 | 0.4114 | 0.2024 | | |
| PSTA | PLTA | NSTA | NLTA | SSTA | SLTA |
| 0.001 mm | 0.001 mm | 0.018 mm | 0.012 mm | −0.002 mm | 0.001 mm |
| VSFS0 | VSFS3 | VSFS7 | VTFS0 | VTFS3 | VTFS7 |
| 0.00100 | −0.00000 | −0.00000 | −0.00000 | 0.00250 | 0.00250 |
| VSMTF0 | VSMTF3 | VSMTF7 | VTMTF0 | VTMTF3 | VTMTF7 |
| 0.63100 | 0.63600 | 0.59000 | 0.63100 | 0.60300 | 0.43700 |
| ISFS0 | ISFS3 | ISFS7 | ITFS0 | ITFS3 | ITFS7 |
| 0.01600 | 0.01250 | 0.00500 | 0.01500 | 0.01000 | 0.00250 |
| ISMTF0 | ISMTF3 | ISMTF7 | ITMTF0 | ITMTF3 | ITMTF7 |
| 0.52100 | 0.44400 | 0.40200 | 0.52000 | 0.37400 | 0.19700 |
| FS | AIFS | AVFS | AFS | PhiA4/InTL | PhiA4/2HOI |
| 0.01500 | 0.01000 | 0.00083 | 0.00917 | 1.0372 | 0.6809 |
| PhiA4 | PhiB | PhiC | PhiD | PhiA4/HEP | |
| 1.4 mm | 1.8 mm | 2.2 mm | 2.5 mm | 1.9055 | |

The following values for the conditional expressions can be obtained from the data in Table 3 and Table 4.

| Values Related to Inflection Point of Second Embodiment (Primary Reference Wavelength = 555 nm) | | | | | | | |
|---|---|---|---|---|---|---|---|
| HIF111 | 0.1522 | HIF111/HOI | 0.1481 | SGI111 | 0.0034 | \|SGI111\|/(\|SGI111\| + TP1) | 0.0192 |
| HIF121 | 0.1456 | HIF121/HOI | 0.1417 | SGI121 | 0.0074 | \|SGI121\|/(\|SGI121\| + TP1) | 0.0408 |
| HIF211 | 0.2328 | HIF211/HOI | 0.2264 | SGI211 | 0.0389 | \|SGI211\|/(\|SGI211\| + TP2) | 0.0796 |
| HIF311 | 0.2617 | HIF311/HOI | 0.2546 | SGI311 | −0.0900 | \|SGI311\|/(\|SGI311\| + TP3) | 0.3249 |
| HIF321 | 0.2495 | HIF321/HOI | 0.2427 | SGI321 | −0.0673 | \|SGI321\|/(\|SGI321\| + TP3) | 0.2646 |
| HIF411 | 0.1827 | HIF411/HOI | 0.1778 | SGI411 | 0.0122 | \|SGI411\|/(\|SGI411\| + TP4) | 0.0486 |
| HIF421 | 0.2076 | HIF421/HOI | 0.2020 | SGI421 | 0.0250 | \|SGI421\|/(\|SGI421\| + TP4) | 0.0950 |

The values pertaining to the length of the outline curves are obtainable from the data in Table 3 and Table 4:

| Second Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.367 | 0.367 | −0.00021 | 99.94% | 0.175 | 209.80% |
| 12 | 0.367 | 0.368 | 0.00053 | 100.14% | 0.175 | 210.22% |
| 21 | 0.363 | 0.369 | 0.00589 | 101.62% | 0.450 | 81.92% |
| 22 | 0.367 | 0.387 | 0.01919 | 105.22% | 0.450 | 85.90% |
| 31 | 0.367 | 0.398 | 0.03014 | 108.20% | 0.187 | 212.56% |
| 32 | 0.367 | 0.384 | 0.01694 | 104.61% | 0.187 | 205.51% |
| 41 | 0.367 | 0.368 | 0.00075 | 100.20% | 0.238 | 154.48% |
| 42 | 0.367 | 0.371 | 0.00333 | 100.91% | 0.238 | 155.56% |
| ARS | EHD | ARS value | ARS − EHD | (ARS/EHD) % | TP | ARS/TP (%) |
| 11 | 0.430 | 0.430 | −0.00027 | 99.94% | 0.175 | 245.56% |
| 12 | 0.393 | 0.395 | 0.00137 | 100.35% | 0.175 | 225.46% |

-continued

| Second Embodiment (Primary Reference Wavelength = 555 nm) | | | | | |
|---|---|---|---|---|---|
| 21 | 0.363 | 0.369 | 0.00589 | 101.62% | 0.450 | 81.92% |
| 22 | 0.390 | 0.415 | 0.02497 | 106.40% | 0.450 | 92.22% |
| 31 | 0.402 | 0.433 | 0.03104 | 107.71% | 0.187 | 231.77% |
| 32 | 0.433 | 0.452 | 0.01854 | 104.28% | 0.187 | 241.65% |
| 41 | 0.503 | 0.519 | 0.01623 | 103.23% | 0.238 | 217.83% |
| 42 | 0.697 | 0.732 | 0.03446 | 104.94% | 0.238 | 307.07% |

Third Embodiment

Figure 3A:
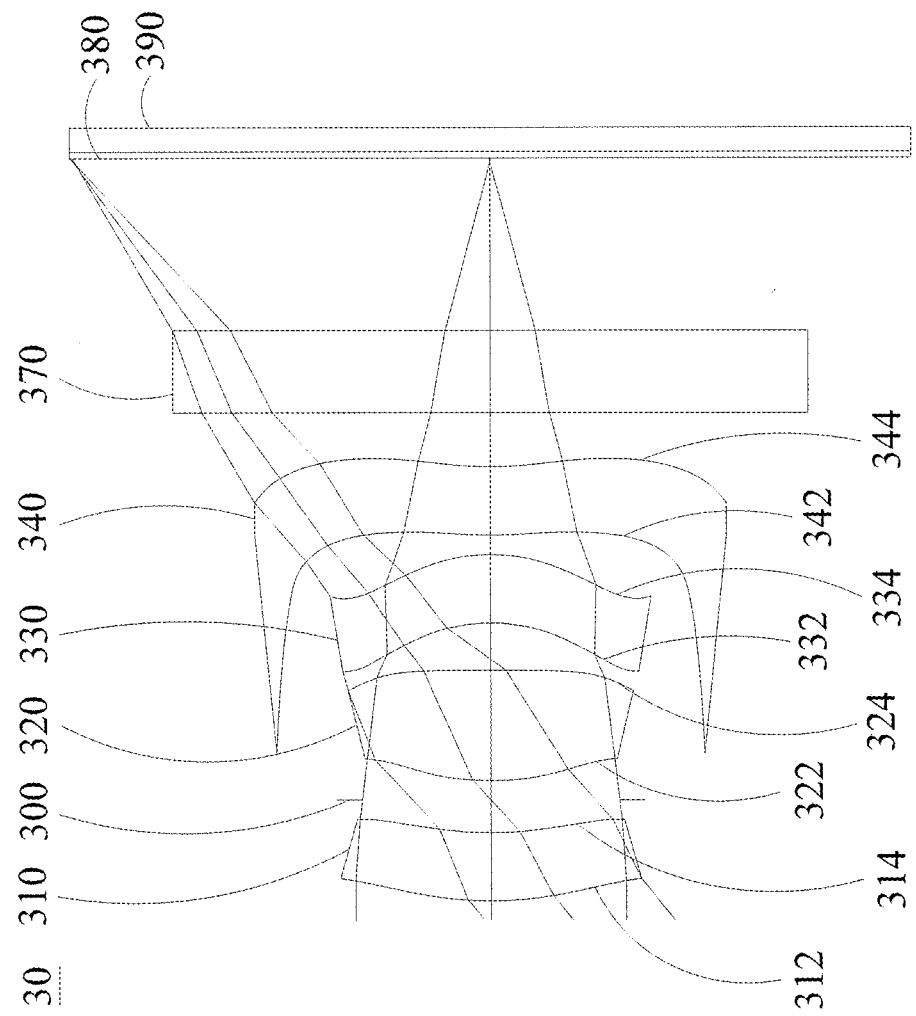
FIG. 3A is a schematic view of the optical image capturing system according to the third embodiment of the present invention.
Figure 3B:
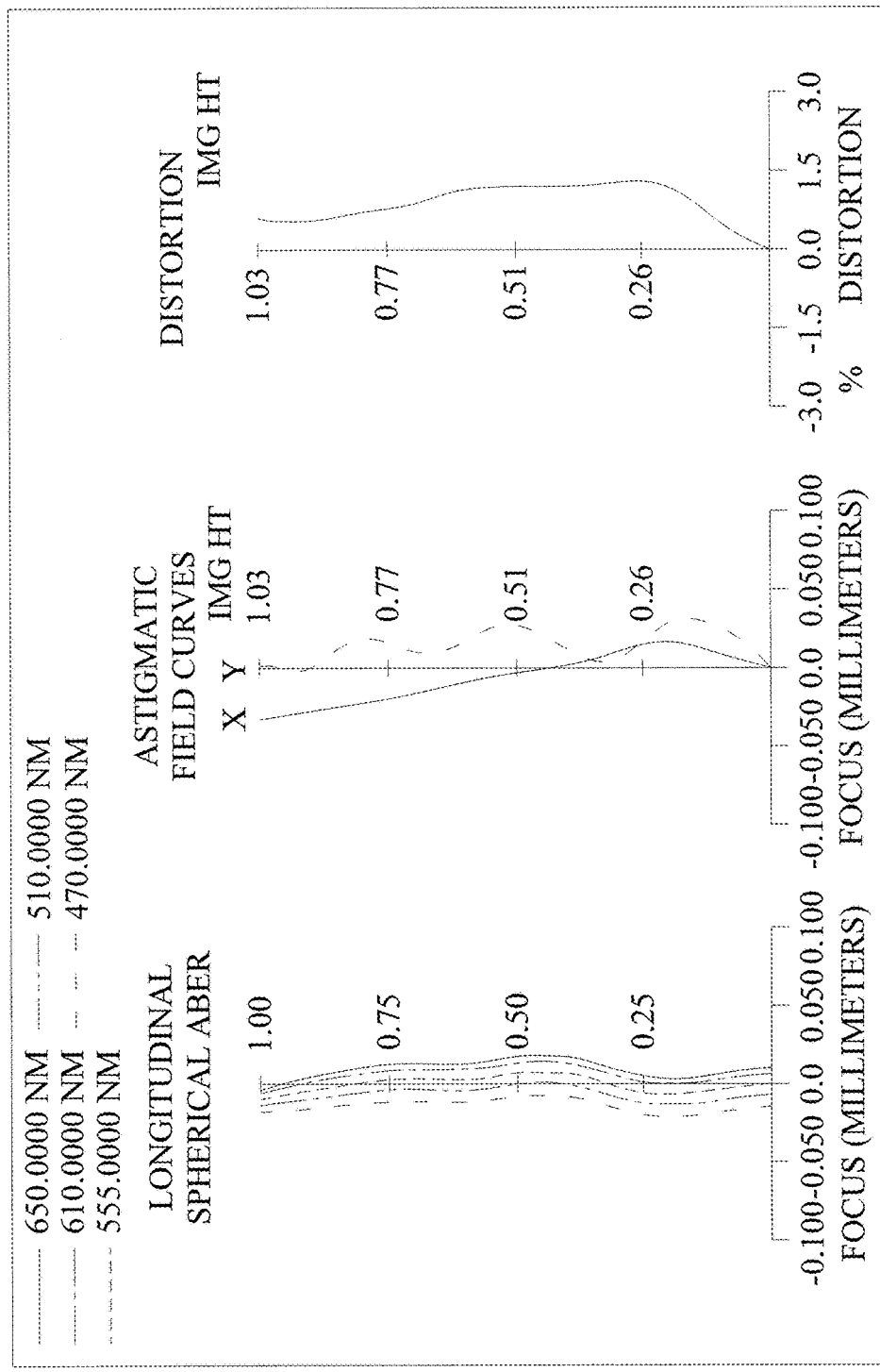
FIG. 3B shows the longitudinal spherical aberration curves, astigmatic field curves, and optical distortion curve of the optical image capturing system in the order from left to right according to the third embodiment of the present invention.
Figure 3C:
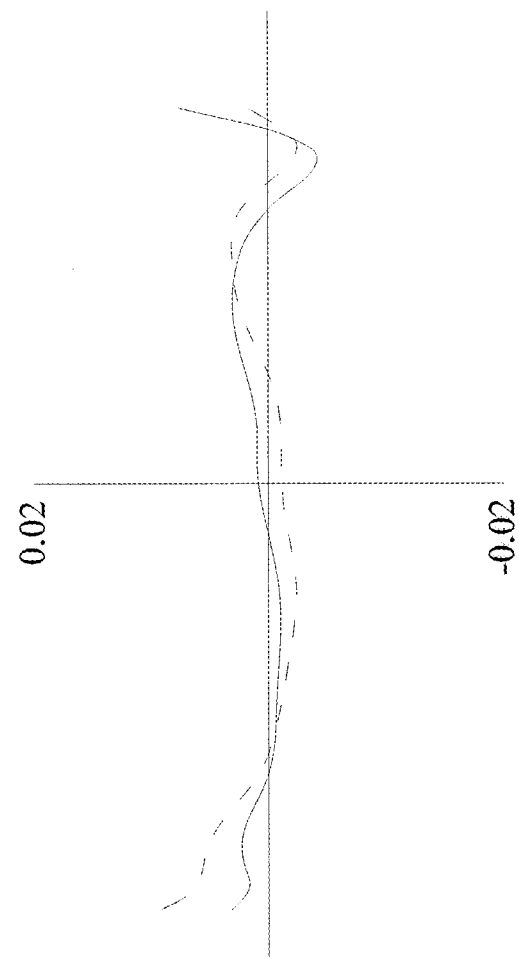
FIG. 3C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the third embodiment of the present invention.
Figure 3D:
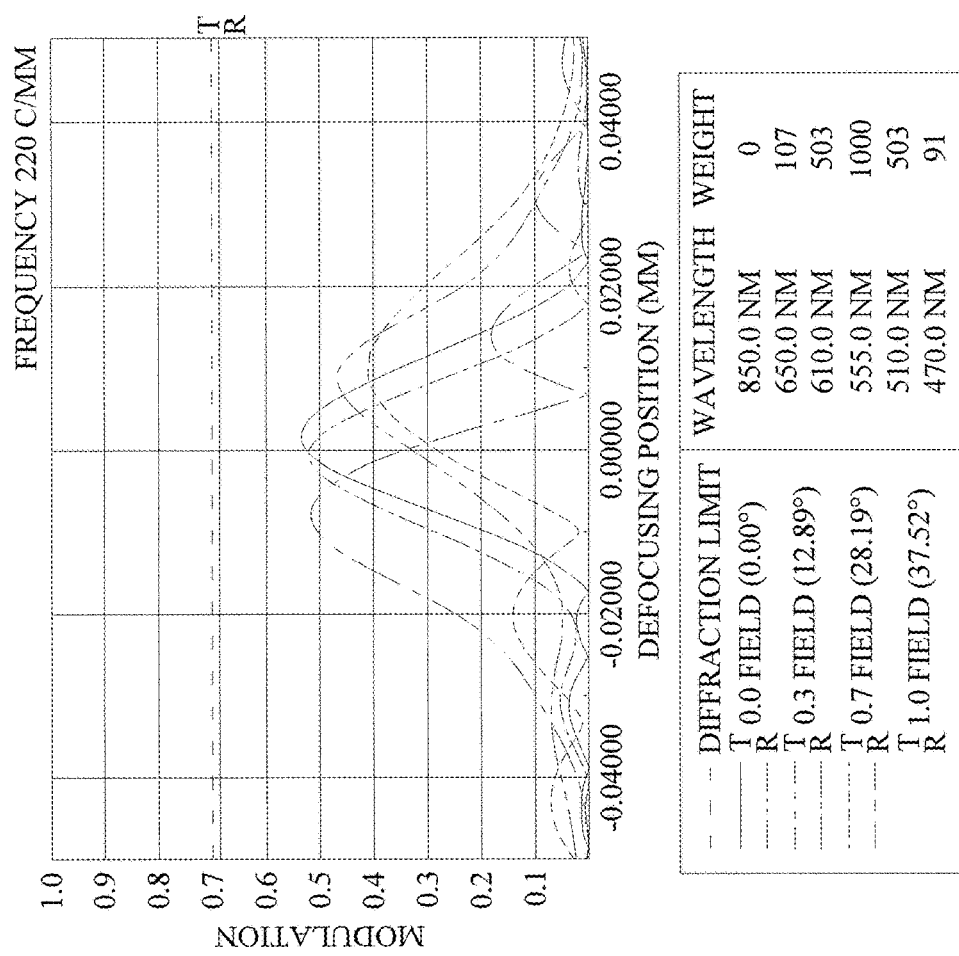
FIG. 3D is a diagram showing the through-focus MTF values of the visible light spectrum at the central field of view, 0.3 field of view, and 0.7 field of view of the third embodiment of the present invention.
Figure 3E:
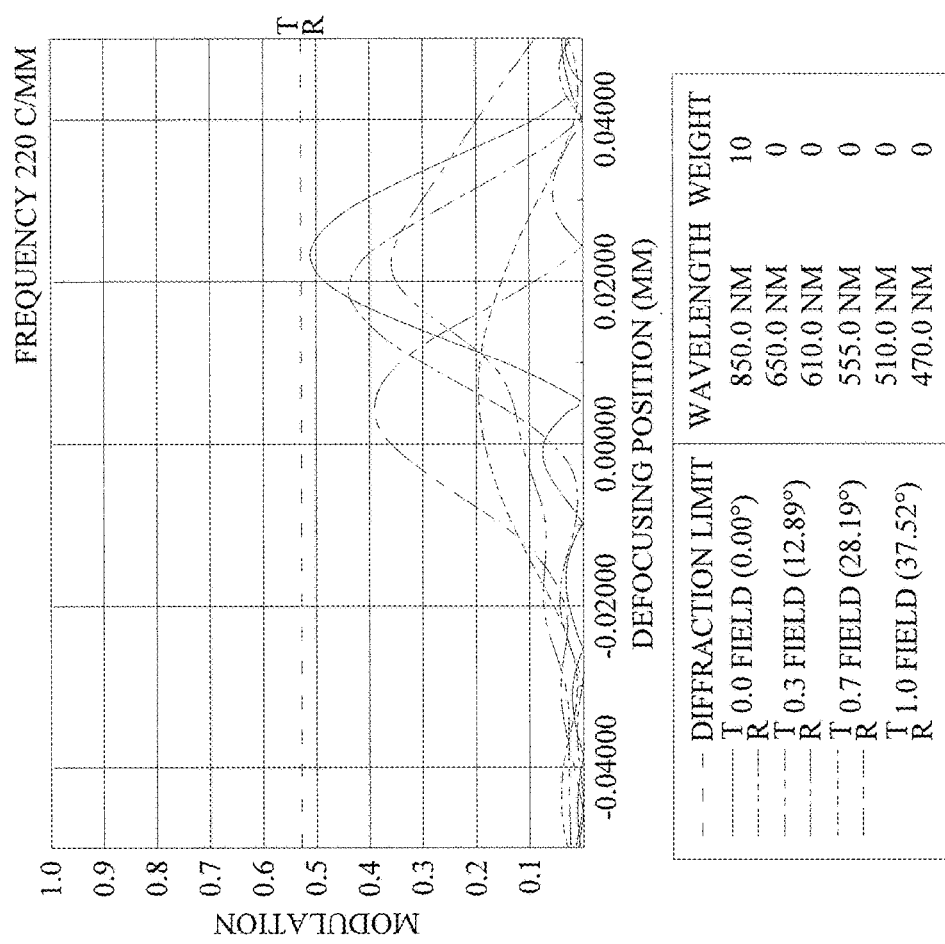
FIG. 3E is a diagram showing the through-focus MTF values of the infrared light spectrum at the central field of view, 0.3 field of view, and 0.7 field of view of the third embodiment of the present disclosure.

Please refer to FIGS. 3A to 3E. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the third embodiment of the present invention. FIG. 3D is a diagram showing the through-focus MTF values of the visible light spectrum at the central field of view, 0.3 field of view, and 0.7 field of view of the third embodiment of the present invention. FIG. 3E is a diagram showing the through-focus MTF values of the infrared light spectrum at the central field of view, 0.3 field of view, and 0.7 field of view of the third embodiment of the present disclosure. As shown in FIG. 3A, in the order from an object side to an image side, the optical image capturing system includes a first lens element 310, an aperture stop 300, a second lens element 320, a third lens element 330, a fourth lens element 340, an IR-bandstop filter 370, an image plane 380, and an image sensing device 390.

The first lens element 310 has positive refractive power and is made of plastic material. The first lens element 310 has a convex object-side surface 312 and a concave image-side surface 314, and both object-side surface 312 and image-side surface 314 are aspheric. Both of the object-side surface 312 and image-side surface 314 thereof have one inflection point.

The second lens element 320 has positive refractive power and is made of plastic material. The second lens element 320 has a convex object-side surface 322 and a convex image-side surface 324, and both object-side surface 322 and image-side surface 324 are aspheric. Both of the object-side surface 322 and image-side surface 324 thereof have one inflection point.

The third lens element 330 has positive refractive power and is made of plastic material. The third lens element 330 has a concave object-side surface 332 and a convex image-side surface 334, and both object-side surface 332 and image-side surface 334 are aspheric. Both of the object-side surface 332 and image-side surface 334 thereof have one inflection point.

The fourth lens element 340 has negative refractive power and is made of plastic material. The fourth lens element 340 has a convex object-side surface 342 and a concave image-side surface 344. Both object-side surface 342 and image-side surface 344 are aspheric and have one inflection point.

The IR-bandstop filter 370 is made of glass material and is disposed between the fourth lens element 340 and the image plane 380, without affecting the focal length of the optical image capturing system.

In the optical image capturing system of the third embodiment, the first, second and third lens elements are positive lens, and their focal lengths are f1, f2 and f3, respectively. The sum of the focal lengths for all lens elements having positive refractive power is ΣPP, which satisfies the following condition: ΣPP=f1+f2+f3. Therefore, the positive refractive power of a single lens element may be distributed to other positive lens elements appropriately, so as to suppress noticeable aberrations generated when the incident light is propagating in the optical system.

In the optical image capturing system of the third embodiment, the sum of the focal lengths for all lens elements having negative refractive power is ΣNT, which satisfies the following condition: ΣNP=f4.

Table 5 and Table 6 below should be incorporated into the reference of the present embodiment.

TABLE 5

Lens Parameters for the Third Embodiment
f(focal length) = 1.3310 mm; f/HEP = 2.0;
HAF(half angle of view) = 37.5170 deg; tan(HAF) = 0.7678

| Surface No. | | Curvature Radius | Thickness (mm) | Material | Refractive Index | Abbe No. | Focal Length |
|---|---|---|---|---|---|---|---|
| 0 | Object | Plane | At infinity | | | | |
| 1 | Lens 1 | 0.83935305 | 0.175 | Plastic | 1.584 | 29.88 | 238.535 |
| 2 | | 0.779262354 | 0.085 | | | | |
| 3 | Aperture Stop | Plane | 0.050 | | | | |
| 4 | Lens 2 | 0.623234619 | 0.285 | Plastic | 1.545 | 55.96 | 1.089 |
| 5 | | −11.00170615 | 0.123 | | | | |
| 6 | Lens 3 | −0.364938387 | 0.175 | Plastic | 1.642 | 22.46 | 10.040 |
| 7 | | −0.410676892 | 0.050 | | | | |
| 8 | Lens 4 | 1.0692297 | 0.175 | Plastic | 1.642 | 22.46 | −7.515 |
| 9 | | 0.820249597 | 0.138 | | | | |

TABLE 5-continued

Lens Parameters for the Third Embodiment
f(focal length) = 1.3310 mm; f/HEP = 2.0;
HAF(half angle of view) = 37.5170 deg; tan(HAF) = 0.7678

| Surface No. | | Curvature Radius | Thickness (mm) | Material | Refractive Index | Abbe No. | Focal Length |
|---|---|---|---|---|---|---|---|
| 10 | IR-bandstop Filter | Plane | 0.210 | BK7_SCHOTT | 1.517 | 64.13 | |
| 11 | | Plane | 0.442 | | | | |
| 12 | Image Plane | Plane | | | | | |

Reference Wavelength = 555 nm; Shield Position: The 1$^{st}$ surface with clear aperture of 0.370 mm and the 5$^{th}$ surface with clear aperture of 0.350 mm

TABLE 6

The Aspheric Coefficients of the Third Embodiment
Table 6: Aspheric Coefficients

| Surface No. | 1 | 2 | 4 | 5 | 6 | 7 |
|---|---|---|---|---|---|---|
| k = | −1.559670E+01 | −3.285895E+01 | −3.283737E−01 | −2.715604E+01 | −1.097425E+00 | −1.384866E+00 |
| $A_4$ = | 2.960488E+00 | 5.065976E+00 | −7.176660E−01 | 3.614461E−01 | 2.214305E+00 | −4.780890E+00 |
| $A_6$ = | −8.781953E+01 | −1.155499E+02 | −5.059534E+01 | −7.045897E+01 | −8.731178E+01 | 1.414294E+02 |
| $A_8$ = | 2.168917E+03 | 1.873961E+02 | 2.209574E+03 | 1.490315E+03 | 2.841182E+03 | −1.711255E+03 |
| $A_{10}$ = | −3.808808E+04 | 4.119672E+04 | −6.239210E+04 | −2.783463E+04 | −5.162307E+04 | 9.272611E+03 |
| $A_{12}$ = | 4.172494E+05 | −9.858251E+05 | 9.875788E+05 | 2.549608E+05 | 5.492447E+05 | 4.055356E+04 |
| $A_{14}$ = | −2.731712E+06 | 1.068435E+07 | −9.081709E+06 | −1.110874E+06 | −3.054910E+06 | −7.073760E+05 |
| $A_{16}$ = | 9.752197E+06 | −5.730864E+07 | 4.401602E+07 | 2.625091E+06 | 7.919499E+06 | 2.992540E+06 |
| $A_{18}$ = | −1.459442E+07 | 1.229646E+08 | −8.582584E+07 | −4.104192E+06 | −6.822180E+06 | −4.349295E+06 |
| $A_{20}$ = | 1.874089E+01 | 0.000000E+00 | 0.000000E+00 | 0.000000E+00 | 0.000000E+00 | 0.000000E+00 |

| Surface No. | 8 | 9 |
|---|---|---|
| k = | −9.000000E+01 | −1.042971E+01 |
| $A_4$ = | −5.438650E+00 | −5.344102E+00 |
| $A_6$ = | 9.066051E+01 | 5.295146E+01 |
| $A_8$ = | −1.364068E+03 | −4.481013E+02 |
| $A_{10}$ = | 1.266697E+04 | 2.489477E+03 |
| $A_{12}$ = | −7.011162E+04 | −8.594433E+03 |
| $A_{14}$ = | 2.041429E+05 | 1.680325E+04 |
| $A_{16}$ = | −2.001005E+05 | −1.520673E+04 |
| $A_{18}$ = | −1.771508E+05 | 2.609779E+03 |
| $A_{20}$ = | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| InRS41 | InRS42 | HVT41 | HVT42 | ODT % | TDT % |
| −0.06700 | −0.09200 | 0.20300 | 0.29700 | 1.30000 | 0.60800 |
| |f/f1| | |f/f2| | |f/f3| | |f/f4| | |f1/f2| | |f2/f3| |
| 0.00558 | 1.22222 | 0.13257 | 0.17711 | 219.04040 | 0.10847 |
| ΣPPR | ΣNPR | ΣPPR/|ΣNPR| | ΣPP | ΣNP | f1/ΣPP |
| 1.36037 | 0.17711 | 7.68084 | 249.66400 | −7.51500 | 0.95542 |
| f4/ΣNP | IN12/f | IN23/f | IN34/f | TP3/f | TP4/f |
| −0.14491 | 0.10143 | 0.09241 | 0.10143 | 0.13148 | 0.13148 |
| InTL | HOS | HOS/HOI | InS/HOS | InTL/HOS | ΣTP/InTL |
| 1.11700 | 1.90700 | 1.85506 | 0.86418 | 0.58574 | 0.72516 |
| (TP1 + IN12)/TP2 | (TP4 + IN34)/TP3 | TP1/TP2 | TP3/TP4 | IN23/(TP2 + IN23 + TP3) | |
| 1.08772 | 1.28571 | 0.61404 | 1.00000 | 0.21098 | |
| |InRS41|/TP4 | |InRS42|/TP4 | HVT42/HOI | HVT42/HOS | | |
| 0.3829 | 0.5257 | 0.2889 | 0.1557 | | |
| PSTA | PLTA | NSTA | NLTA | SSTA | SLTA |
| 0.002 mm | 0.008 mm | 0.010 mm | 0.003 mm | 0.004 mm | 0.004 mm |
| VSFS0 | VSFS3 | VSFS7 | VTFS0 | VTFS3 | VTFS7 |

-continued

| Third Embodiment (Primary Reference Wavelength = 555 nm) | | | | | |
|---|---|---|---|---|---|
| 0.00250 | −0.00000 | −0.00750 | 0.00250 | 0.00750 | 0.01000 |
| VSMTF0 | VSMTF3 | VSMTF7 | VTMTF0 | VTMTF3 | VTMTF7 |
| 0.53300 | 0.52000 | 0.51900 | 0.48200 | 0.40700 | |
| ISFS0 | ISFS3 | ISFS7 | ITFS0 | ITFS3 | ITFS7 |
| 0.02250 | 0.01750 | 0.00500 | 0.02250 | 0.02250 | 0.00750 |
| ISMTF0 | ISMTF3 | ISMTF7 | ITMTF0 | ITMTF3 | ITMTF7 |
| 0.52000 | 0.43000 | 0.39200 | 0.52000 | 0.34700 | 0.20200 |
| FS | AIFS | AVFS | AFS | PhiA4/InTL | PhiA4/2HOI |
| 0.02000 | 0.01625 | 0.00250 | 0.01375 | 1.0743 | 0.5837 |
| PhiA4 | PhiB | PhiC | PhiD | PhiA4/HEP | |
| 1.2 mm | 1.6 mm | 2.0 mm | 2.3 mm | 1.8032 | |

The following values for the conditional expressions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF111 | 0.2660 | HIF111/HOI | 0.2588 | SGI111 | 0.0370 | \|SGI111\|/(\|SGI111\| + TP1) | 0.1745 |
| HIF121 | 0.1940 | HIF121/HOI | 0.1887 | SGI121 | 0.0200 | \|SGI121\|/(\|SGI121\| + TP1) | 0.1026 |
| HIF211 | 0.2270 | HIF211/HOI | 0.2208 | SGI211 | 0.0380 | \|SGI211\|/(\|SGI211\| + TP2) | 0.1176 |
| HIF221 | 0.3430 | HIF221/HOI | 0.3337 | SGI221 | −0.0490 | \|SGI221\|/(\|SGI221\| + TP2) | 0.1467 |
| HIF311 | 0.2590 | HIF311/HOI | 0.2519 | SGI311 | −0.0860 | \|SGI311\|/(\|SGI311\| + TP3) | 0.3295 |
| HIF321 | 0.2470 | HIF321/HOI | 0.2403 | SGI321 | −0.0730 | \|SGI321\|/(\|SGI321\| + TP3) | 0.2944 |
| HIF411 | 0.0950 | HIF411/HOI | 0.0924 | SGI411 | 0.0030 | \|SGI411\|/(\|SGI411\| + TP4) | 0.0169 |
| HIF421 | 0.1440 | HIF421/HOI | 0.1401 | SGI421 | 0.0100 | \|SGI421\|/(\|SGI421\| + TP4) | 0.0541 |

The values pertaining to the length of the outline curves are obtainable from the data in Table 5 and Table 6:

| Third Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.333 | 0.337 | 0.00406 | 101.22% | 0.175 | 192.42% |
| 12 | 0.333 | 0.334 | 0.00166 | 100.50% | 0.175 | 191.05% |
| 21 | 0.329 | 0.335 | 0.00624 | 101.90% | 0.285 | 117.73% |
| 22 | 0.333 | 0.339 | 0.00628 | 101.89% | 0.285 | 119.01% |
| 31 | 0.333 | 0.358 | 0.02516 | 107.56% | 0.175 | 204.48% |
| 32 | 0.333 | 0.353 | 0.02042 | 106.14% | 0.175 | 201.77% |
| 41 | 0.333 | 0.333 | 0.00028 | 100.08% | 0.175 | 190.26% |
| 42 | 0.333 | 0.333 | 0.00021 | 100.06% | 0.175 | 190.22% |
| ARS | EHD | ARS value | ARS − EHD | (ARS/EHD) % | TP | ARS/TP (%) |
| 11 | 0.370 | 0.374 | 0.004 | 101.14% | 0.175 | 213.83% |
| 12 | 0.335 | 0.337 | 0.002 | 100.66% | 0.175 | 192.77% |
| 21 | 0.329 | 0.335 | 0.006 | 101.90% | 0.285 | 117.73% |
| 22 | 0.350 | 0.358 | 0.008 | 102.36% | 0.285 | 125.79% |
| 31 | 0.366 | 0.392 | 0.026 | 107.17% | 0.175 | 224.16% |
| 32 | 0.401 | 0.423 | 0.022 | 105.49% | 0.175 | 241.46% |
| 41 | 0.463 | 0.488 | 0.026 | 105.55% | 0.175 | 278.99% |
| 42 | 0.601 | 0.660 | 0.060 | 109.93% | 0.175 | 377.37% |

Fourth Embodiment

Figure 4A:
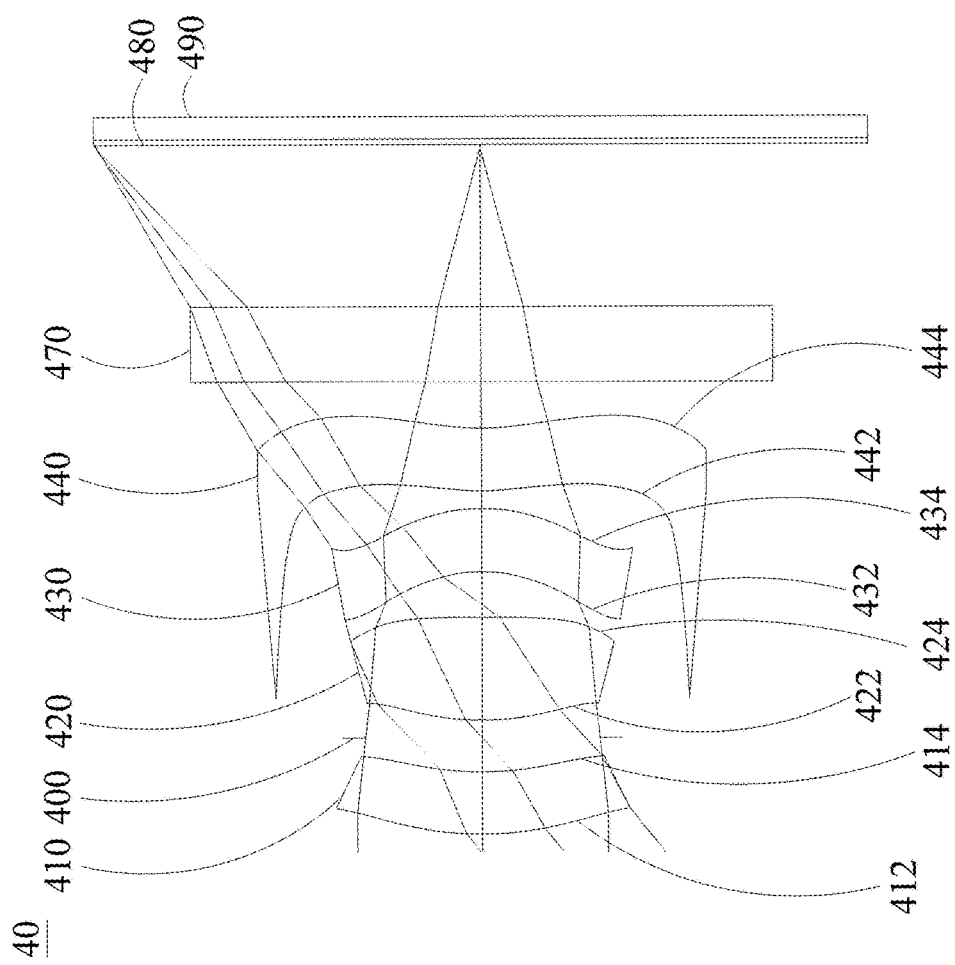
FIG. 4A is a schematic view of the optical image capturing system according to the fourth embodiment of the present invention.
Figure 4B:
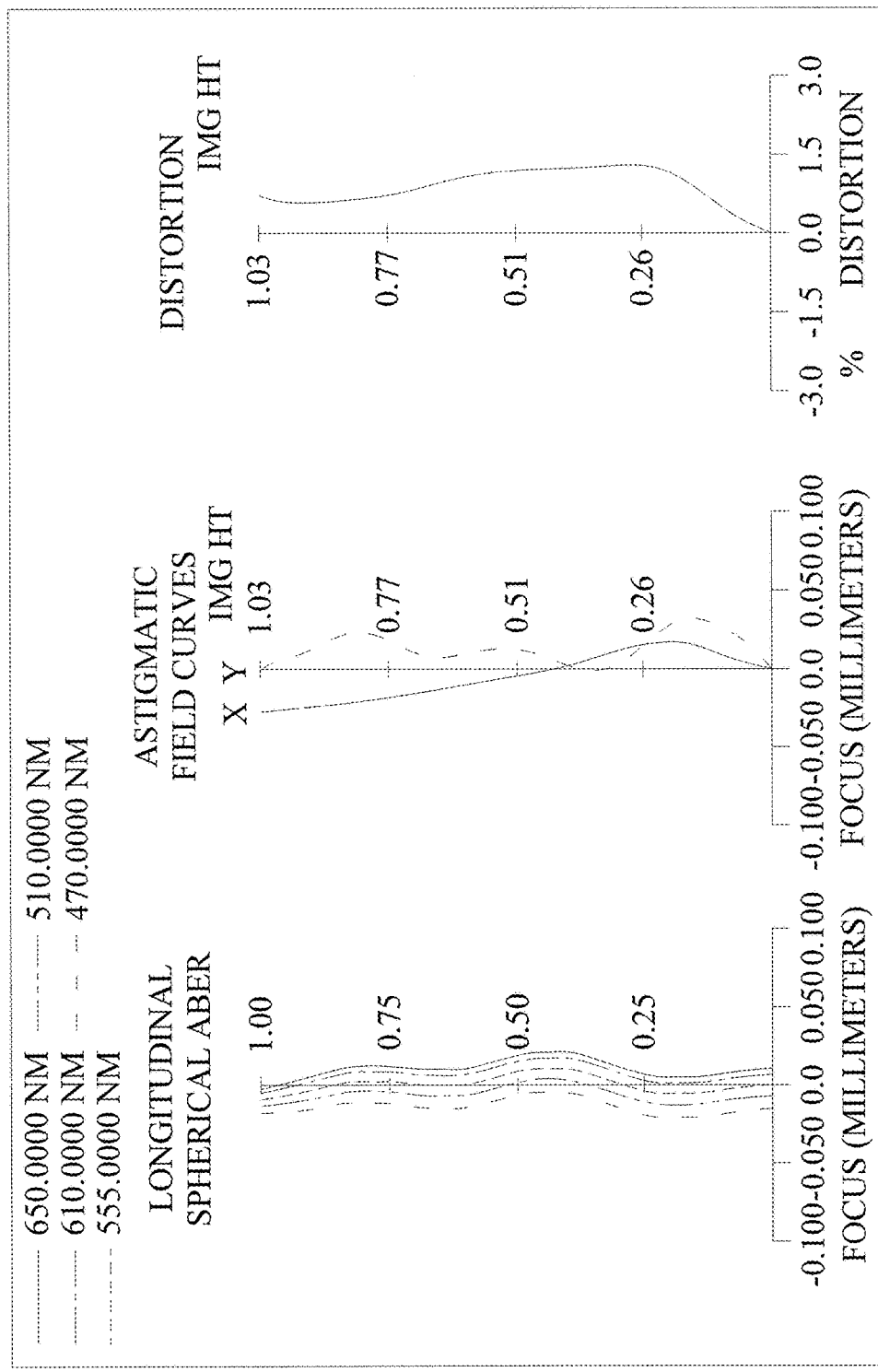
FIG. 4B shows the longitudinal spherical aberration curves, astigmatic field curves, and optical distortion curve of the optical image capturing system in the order from left to right according to the fourth embodiment of the present invention.
Figure 4D:
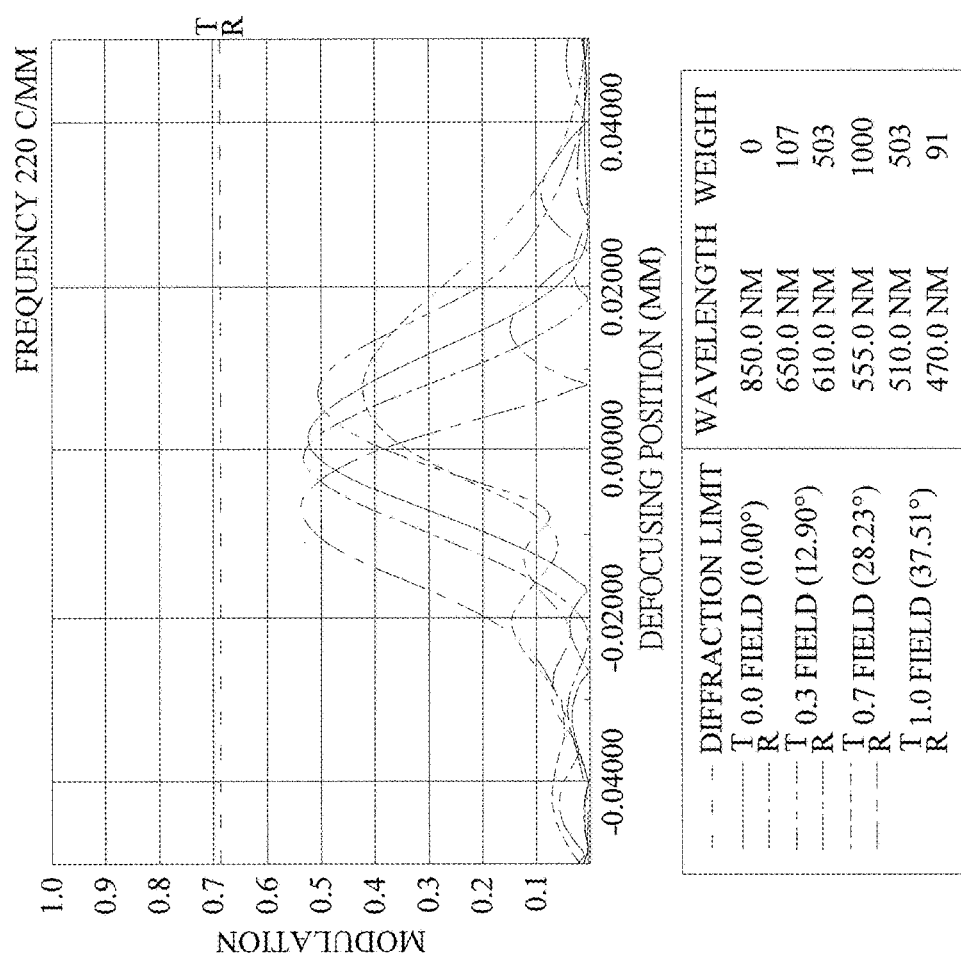
FIG. 4D is a diagram showing the through-focus MTF values of the visible light spectrum at the central field of view, 0.3 field of view, and 0.7 field of view of the fourth embodiment of the present invention.
Figure 4E:
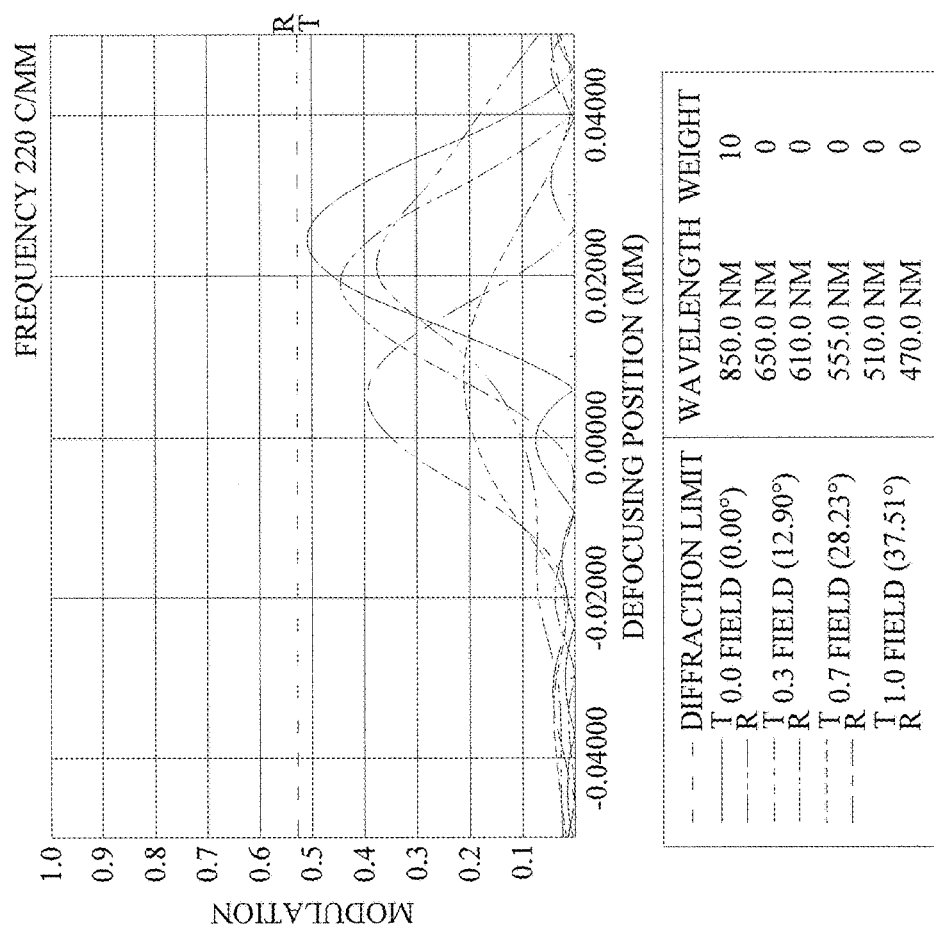
FIG. 4E is a diagram showing the through-focus MTF values of the infrared light spectrum at the central field of view, 0.3 field of view, and 0.7 field of view of the fourth embodiment of the present disclosure.

Please refer to FIGS. 4A to 4E. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the fourth embodiment of the present invention. FIG. 4D is a diagram showing the through-focus MTF values of the visible light spectrum at the central field of view, 0.3 field of view, and 0.7 field of view of the fourth embodiment of the present invention. FIG. 4E is a diagram showing the through-focus MTF values of the infrared light spectrum at the central field of view, 0.3 field of view, and 0.7 field of view of the fourth embodiment of the present disclosure. As shown in FIG. 4A, in the order from an object side to an image side, the optical image capturing system includes a first lens element 410, an aperture stop 400, a second lens element 420, a third lens element 430, a fourth lens element 440, an IR-bandstop filter 470, an image plane 480, and an image sensing device 490.

The first lens element 410 has positive refractive power and is made of plastic material. The first lens element 410 has a convex object-side surface 412 and a concave image-side surface 414, and both object-side surface 412 and image-side surface 414 are aspheric. Both of the object-side surface 412 and image-side surface 414 thereof have an inflection point.

The second lens element 420 has positive refractive power and is made of plastic material. The second lens element 420 has a convex object-side surface 422 and a convex image-side surface 424, and both object-side surface 422 and image-side surface 424 are aspheric. The object-side surface 422 thereof has an inflection point.

The third lens element 430 has negative refractive power and is made of plastic material. The third lens element 430 has a concave object-side surface 432 and a convex image-side surface 434, and both object-side surface 432 and image-side surface 434 are aspheric. The object-side surface 432 and image-side surface 434 thereof both have an inflection point.

The fourth lens element 440 has positive refractive power and is made of plastic material. The fourth lens element 440 has a convex object-side surface 442 and a concave image-side surface 444. Both object-side surface 442 and image-side surface 444 are aspheric and have an inflection point.

The IR-bandstop filter 470 is made of glass material and is disposed between the fourth lens element 440 and the image plane 480, without affecting the focal length of the optical image capturing system.

In the optical image capturing system of the fourth embodiment, the first, second and fourth lens elements are positive lens, and their focal lengths are f1, f2 and f4, respectively. The sum of the focal lengths for all lens elements having positive refractive power is $\Sigma PP$, which satisfies the following condition: $\Sigma PP=f1+f2+f4$. Therefore, the positive refractive power of a single lens element may be distributed to other positive lens elements appropriately, so as to suppress noticeable aberrations generated when the incident light is propagating in the optical system.

In the optical image capturing system of the fourth embodiment, the focal length of the third lens element is f3, and the sum of the focal lengths for all lens elements having negative refractive power is $\Sigma NP$, which satisfies the following condition: $\Sigma NP=f3$.

Table 7 and Table 8 below should be incorporated into the reference of the present embodiment.

TABLE 7

Lens Parameters for the Fourth Embodiment
f(focal length) = 1.3290 mm; f/HEP = 2.0;
HAF(half angle of view) = 37.5150 deg; tan(HAF) = 0.7677

| Surface No. | | Curvature Radius | Thickness (mm) | Material | Refractive Index | Abbe No. | Focal Length |
|---|---|---|---|---|---|---|---|
| 0 | Object | Plane | At infinity | | | | |
| 1 | Lens 1 | 0.796358327 | 0.175 | Plastic | 1.584 | 29.88 | 47.93 |
| 2 | | 0.752894203 | 0.095 | | | | |
| 3 | Aperture Stop | Plane | 0.050 | | | | |
| 4 | Lens 2 | 0.69002414 | 0.289 | Plastic | 1.545 | 55.96 | 1.14 |
| 5 | | −5.470145447 | 0.127 | | | | |
| 6 | Lens 3 | −0.375226684 | 0.175 | Plastic | 1.642 | 22.46 | −7.54 |
| 7 | | −0.480949837 | 0.050 | | | | |
| 8 | Lens 4 | 0.634776701 | 0.175 | Plastic | 1.642 | 22.46 | 9.92 |
| 9 | | 0.628050498 | 0.130 | | | | |
| 10 | IR-bandstop Filter | Plane | 0.210 | BK7_SCHOTT | 1.517 | 64.13 | |
| 11 | | Plane | 0.446 | | | | |
| 12 | Image Plane | Plane | | | | | |

Reference Wavelength = 555 nm; Shield Position: The $1^{st}$ surface with clear aperture of 0.390 mm and the $5^{th}$ surface with clear aperture of 0.350 mm

TABLE 8

The Aspheric Coefficients of the Fourth Embodiment
Table 8: Aspheric Coefficients

| Surface No. | 1 | 2 | 4 | 5 | 6 | 7 |
|---|---|---|---|---|---|---|
| k = | −1.559070E+01 | −3.277696E+01 | −1.338964E−01 | −2.644155E+01 | −9.444825E−01 | −8.569895E−01 |
| $A_4$ = | 3.931058E+00 | 6.407587E+00 | −7.455663E−01 | −3.112638E−01 | 1.474769E+00 | −7.584700E+00 |
| $A_6$ = | −1.040453E+02 | −1.208225E+02 | −4.905075E+01 | −7.316173E+01 | −2.913984E+01 | 2.026719E+02 |
| $A_8$ = | 2.548788E+03 | −4.252993E+01 | 2.152711E+03 | 1.536768E+03 | 1.861605E+02 | −2.697091E+03 |
| $A_{10}$ = | −4.367449E+04 | 4.938506E+04 | −6.180943E+04 | −3.005936E+04 | −1.107176E+03 | 1.921504E+04 |
| $A_{12}$ = | 4.647813E+05 | −1.098966E+06 | 9.823348E+05 | 3.189116E+05 | 8.405416E+04 | −1.663989E+04 |
| $A_{14}$ = | −2.944070E+06 | 1.140707E+07 | −9.044375E+06 | −1.714189E+06 | −9.804138E+05 | −5.393357E+05 |
| $A_{16}$ = | 1.013712E+07 | −5.908647E+07 | 4.382259E+07 | 4.420446E+06 | 4.316120E+06 | 2.803448E+06 |
| $A_{18}$ = | −1.459442E+07 | 1.229646E+08 | −8.582584E+07 | −4.104192E+06 | −6.822180E+06 | −4.349295E+06 |
| $A_{20}$ = | 1.874407E+01 | 0.000000E+00 | 0.000000E+00 | 0.000000E+00 | 0.000000E+00 | 0.000000E+00 |

TABLE 8-continued

The Aspheric Coefficients of the Fourth Embodiment
Table 8: Aspheric Coefficients

| Surface No. | 8 | 9 |
|---|---|---|
| k = | −2.727253E+01 | −1.028315E+01 |
| $A_4$ = | −4.999799E+00 | −3.743632E+00 |
| $A_6$ = | 6.751631E+01 | 2.859772E+01 |
| $A_8$ = | −9.280684E+02 | −2.281186E+02 |
| $A_{10}$ = | 7.954824E+03 | 1.278101E+03 |
| $A_{12}$ = | −3.875688E+04 | −4.522034E+03 |
| $A_{14}$ = | 8.940373E+04 | 9.165264E+03 |
| $A_{16}$ = | −2.453740E+04 | −9.062636E+03 |
| $A_{18}$ = | −1.771508E+05 | 2.609779E+03 |
| $A_{20}$ = | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| InRS41 | InRS42 | HVT41 | HVT42 | ODT % | TDT % |
| −0.04300 | −0.06200 | 0.26100 | 0.34000 | 1.30500 | 0.49200 |
| \|f/f1\| | \|f/f2\| | \|f/f3\| | \|f/f4\| | \|f1/f2\| | \|f2/f3\| |
| 0.02773 | 1.16477 | 0.17617 | 0.13399 | 42.00876 | 0.15125 |
| ΣPPR | ΣNPR | ΣPPR/\|ΣNPR\| | ΣPP | ΣNP | f1/ΣPP |
| 1.32648 | 0.17617 | 7.52969 | 58.99200 | −7.54400 | 0.81252 |
| f4/ΣNP | IN12/f | IN23/f | IN34/f | TP3/f | TP4/f |
| −0.15125 | 0.10910 | 0.09556 | 0.03762 | 0.13168 | 0.13168 |
| InTL | HOS | HOS/HOI | InS/HOS | InTL/HOS | ΣTP/InTL |
| 1.13600 | 1.92300 | 1.87062 | 0.85959 | 0.59074 | 0.71655 |
| (TP1 + IN12)/TP2 | (TP4 + IN34)/TP3 | TP1/TP2 | TP3/TP4 | IN23/(TP24 + IN23 + TP3) | |
| 1.10727 | 1.28571 | 0.60554 | 1.00000 | 0.21489 | |
| \|InRS41\|/TP4 | \|InRS42\|/TP4 | HVT42/HOI | HVT42/HOS | | |
| 0.2457 | 0.3543 | 0.3307 | 0.1768 | | |
| PSTA | PLTA | NSTA | NLTA | SSTA | SLTA |
| 0.00007 mm | 0.004 mm | 0.008 mm | −0.00001 mm | 0.005 mm | 0.005 mm |
| VSFS0 | VSFS3 | VSFS7 | VTFS0 | VTFS3 | VTFS7 |
| 0.003 | −0.000 | −0.008 | 0.003 | 0.008 | 0.008 |
| VSMTF0 | VSMTF3 | VSMTF7 | VTMTF0 | VTMTF3 | VTMTF7 |
| 0.525 | 0.532 | 0.540 | 0.525 | 0.514 | 0.418 |
| ISFS0 | ISFS3 | ISFS7 | ITFS0 | ITFS3 | ITFS7 |
| 0.025 | 0.020 | 0.005 | 0.025 | 0.020 | 0.008 |
| ISMTF0 | ISMTF3 | ISMTF7 | ITMTF0 | ITMTF3 | ITMTF7 |
| 0.519 | 0.440 | 0.400 | 0.519 | 0.368 | 0.214 |
| FS | AIFS | AVFS | AFS | PhiA4/InTL | PhiA4/2HOI |
| 0.023 | 0.017 | 0.002 | 0.015 | 1.1004 | 0.6080 |
| PhiA4 | PhiB | PhiC | PhiD | PhiA4/HEP | |
| 1.25 mm | 1.65 mm | 2.05 mm | 2.35 mm | 1.8811 | |

The following values for the conditional expressions can be obtained from the data in Table 7 and Table 8.

| Values Related to Inflection Point of Fourth Embodiment (Primary Reference Wavelength = 555 nm) | | | | | |
|---|---|---|---|---|---|
| HIF111 | 0.3010 | HIF111/HOI | 0.2928 | SGI111 | 0.0510 | \|SGI111\|/(\|SGI111\| + TP1) | 0.2257 |
| HIF121 | 0.2200 | HIF121/HOI | 0.2140 | SGI121 | 0.0280 | \|SGI121\|/(\|SGI121\| + TP1) | 0.1379 |
| HIF211 | 0.2190 | HIF211/HOI | 0.2130 | SGI211 | 0.0320 | \|SGI211\|/(\|SGI211\| + TP2) | 0.0997 |
| HIF311 | 0.2600 | HIF311/HOI | 0.2529 | SGI311 | −0.0870 | \|SGI311\|/(\|SGI311\| + TP3) | 0.3321 |
| HIF321 | 0.2570 | HIF321/HOI | 0.2500 | SGI321 | −0.0750 | \|SGI321\|/(\|SGI321\| + TP3) | 0.3000 |
| HIF411 | 0.1210 | HIF411/HOI | 0.1177 | SGI411 | 0.0090 | \|SGI411\|/(\|SGI411\| + TP4) | 0.0489 |
| HIF421 | 0.1620 | HIF421/HOI | 0.1576 | SGI421 | 0.0160 | \|SGI421\|/(\|SGI421\| + TP4) | 0.0838 |

The values pertaining to the length of the outline curves are obtainable from the data in Table 7 and Table 8:

| Fourth Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.332 | 0.339 | 0.00620 | 101.87% | 0.175 | 193.46% |
| 12 | 0.332 | 0.336 | 0.00327 | 100.98% | 0.175 | 191.78% |
| 21 | 0.321 | 0.326 | 0.00425 | 101.32% | 0.289 | 112.60% |
| 22 | 0.332 | 0.342 | 0.00955 | 102.87% | 0.289 | 118.23% |
| 31 | 0.332 | 0.360 | 0.02753 | 108.28% | 0.175 | 205.65% |
| 32 | 0.332 | 0.353 | 0.02089 | 106.28% | 0.175 | 201.85% |
| 41 | 0.332 | 0.333 | 0.00065 | 100.20% | 0.175 | 190.29% |
| 42 | 0.332 | 0.334 | 0.00172 | 100.52% | 0.175 | 190.90% |
| ARS | EHD | ARS value | ARS − EHD | (ARS/EHD) % | TP | ARS/TP (%) |
| 11 | 0.390 | 0.397 | 0.007 | 101.82% | 0.175 | 226.92% |
| 12 | 0.338 | 0.341 | 0.003 | 100.82% | 0.175 | 194.64% |
| 21 | 0.321 | 0.326 | 0.004 | 101.32% | 0.289 | 112.60% |
| 22 | 0.350 | 0.362 | 0.012 | 103.55% | 0.289 | 125.32% |
| 31 | 0.368 | 0.397 | 0.029 | 107.80% | 0.175 | 226.72% |
| 32 | 0.407 | 0.429 | 0.022 | 105.43% | 0.175 | 244.96% |
| 41 | 0.486 | 0.511 | 0.025 | 105.08% | 0.175 | 291.94% |
| 42 | 0.625 | 0.683 | 0.057 | 109.17% | 0.175 | 390.18% |

Fifth Embodiment

Figure 5A:
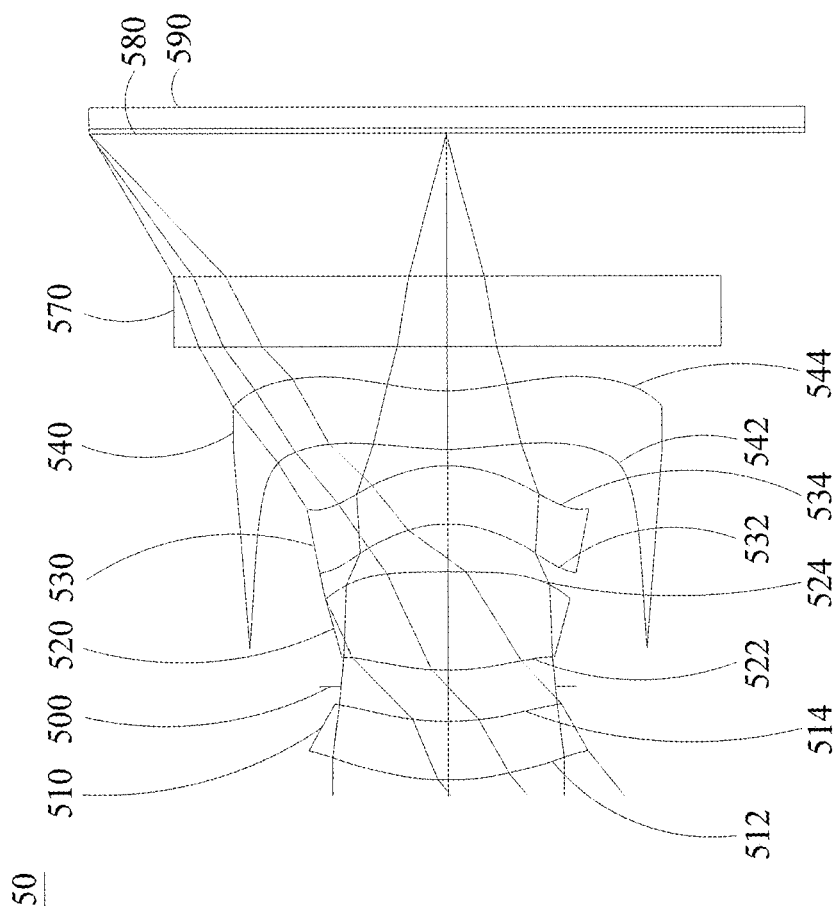
FIG. 5A is a schematic view of the optical image capturing system according to the fifth embodiment of the present invention.
Figure 5B:
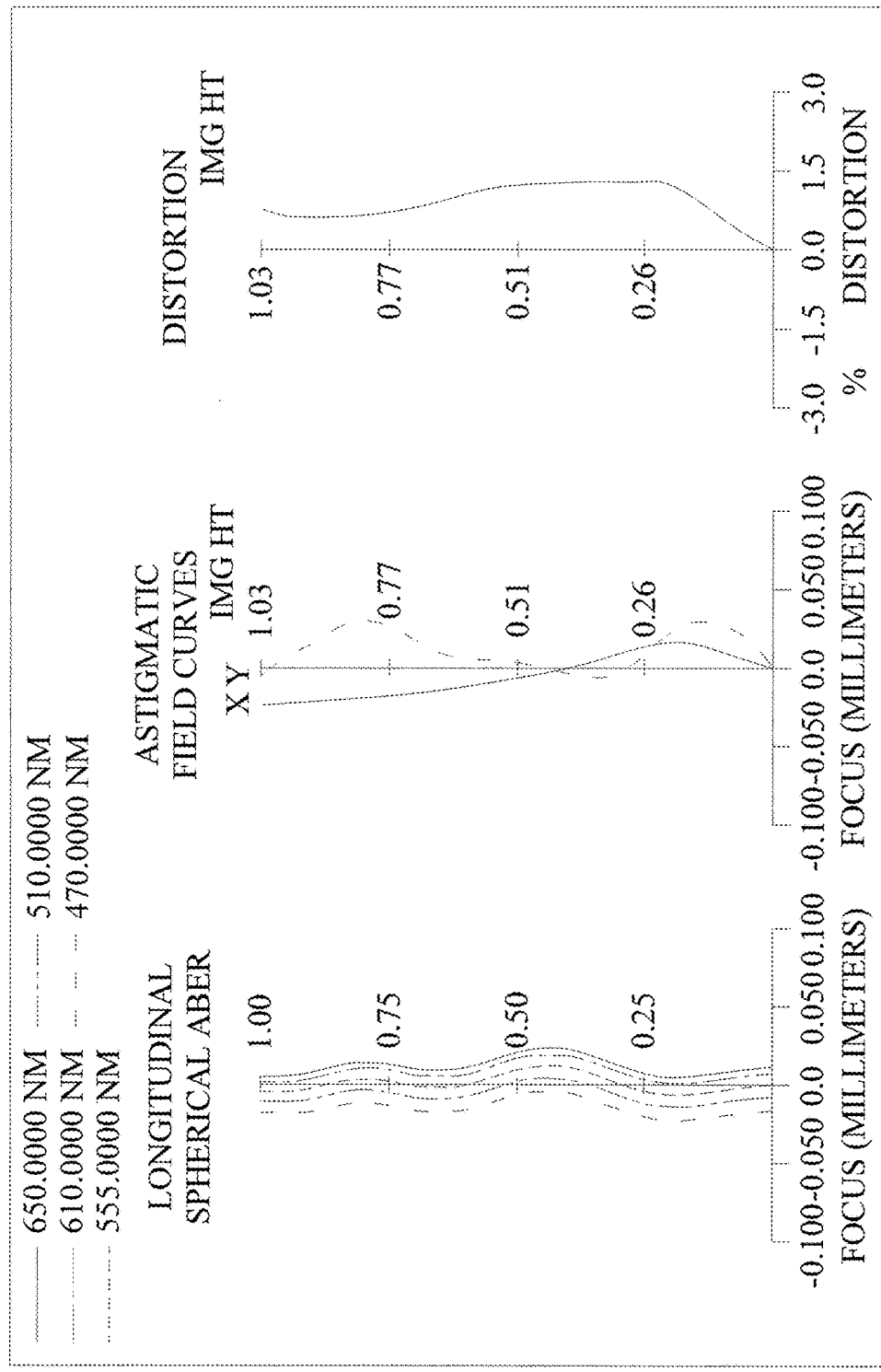
FIG. 5B shows the longitudinal spherical aberration curves, astigmatic field curves, and optical distortion curve of the optical image capturing system in the order from left to right according to the fifth embodiment of the present invention.
Figure 5C:
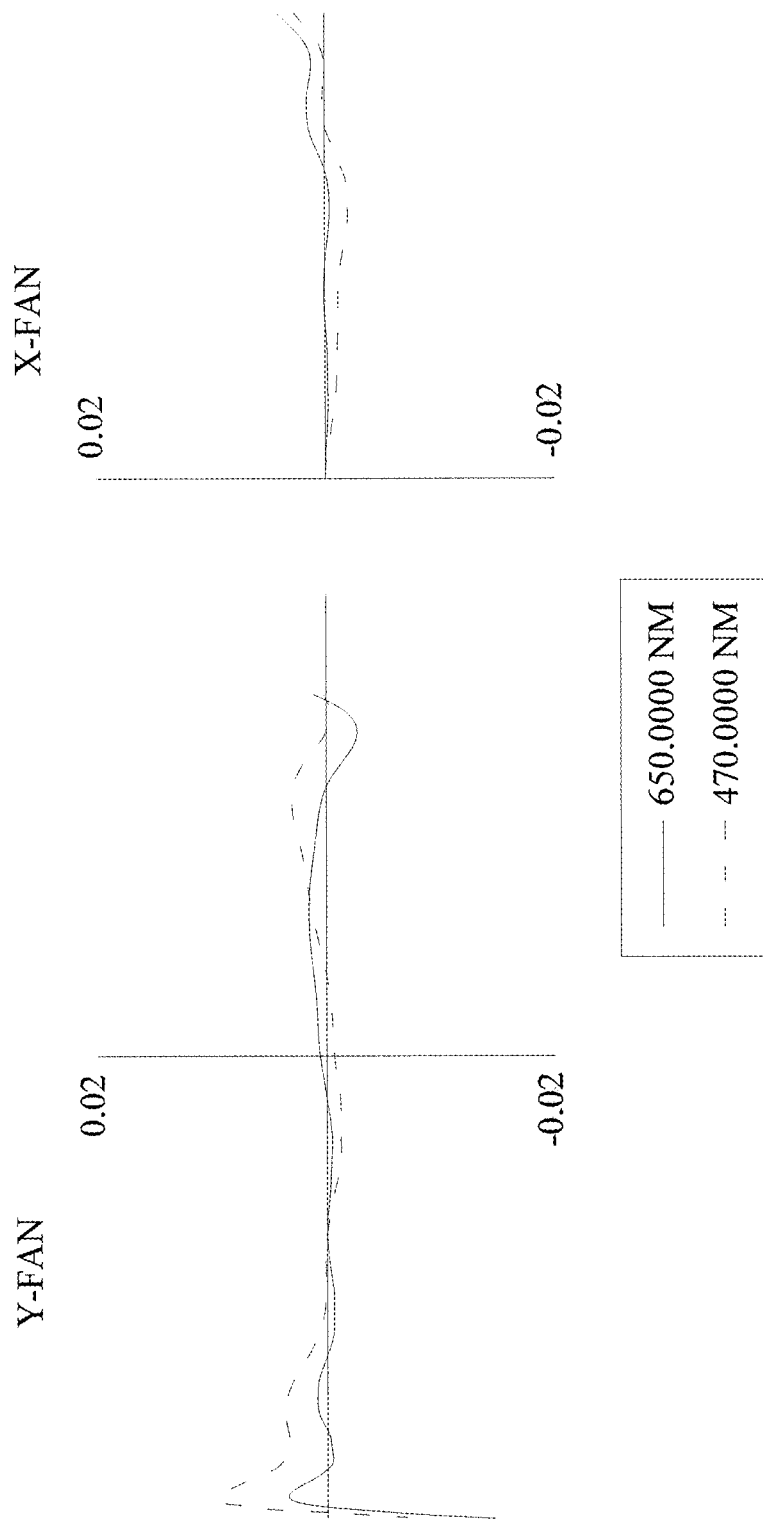
FIG. 5C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the fifth embodiment of the present invention.
Figure 5D:
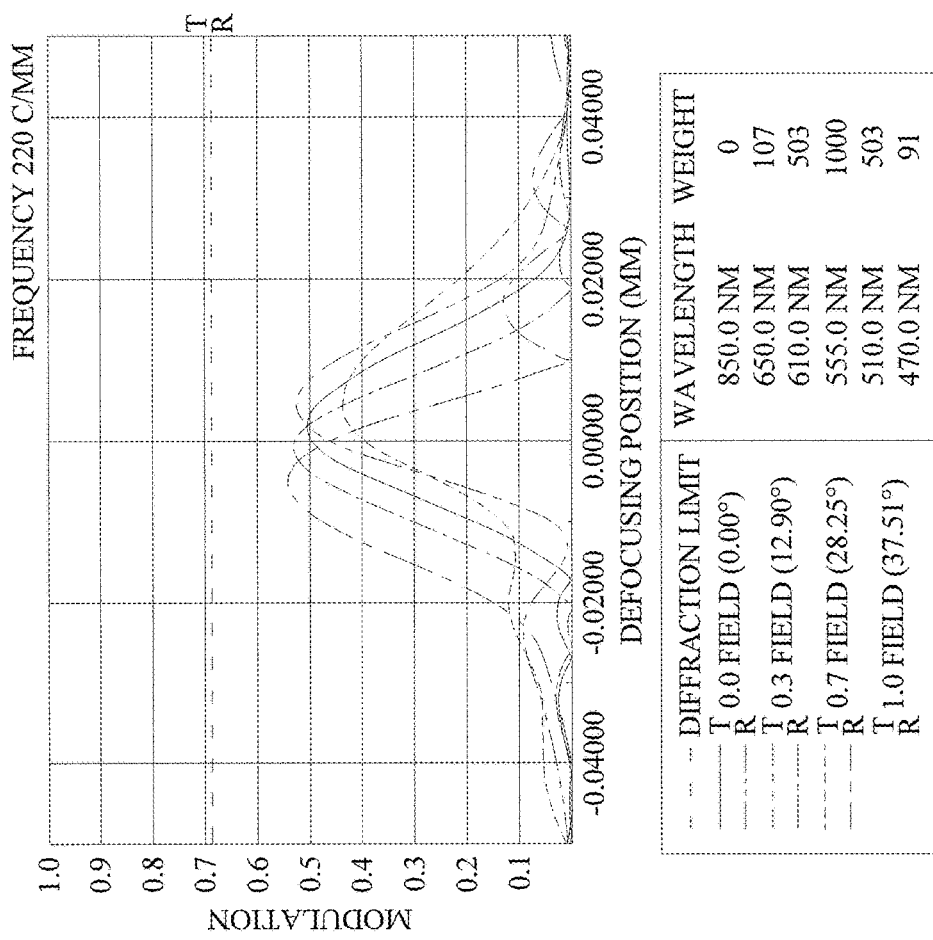
FIG. 5D is a diagram showing the through-focus MTF values of the visible light spectrum at the central field of view, 0.3 field of view, and 0.7 field of view of the fifth embodiment of the present invention.
Figure 5E:
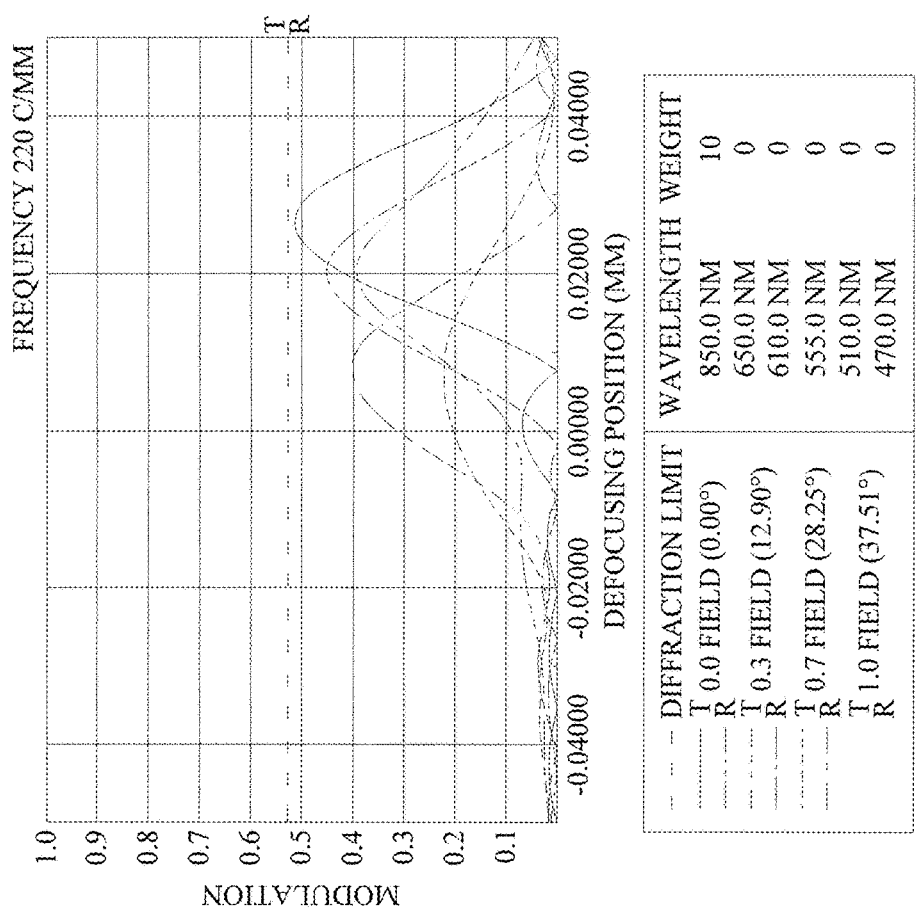
FIG. 5E is a diagram showing the through-focus MTF values of the infrared light spectrum at the central field of view, 0.3 field of view, and 0.7 field of view of the fifth embodiment of the present disclosure.

Please refer to FIGS. 5A to 5E. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the optical image capturing system of the fifth embodiment. FIG. 5D is a diagram showing the through-focus MTF values of the visible light spectrum at the central field of view, 0.3 field of view, and 0.7 field of view of the fifth embodiment of the present invention. FIG. 5E is a diagram showing the through-focus MTF values of the infrared light spectrum at the central field of view, 0.3 field of view, and 0.7 field of view of the fifth embodiment of the present disclosure. As shown in FIG. 5A, in the order from an object side to an image side, the optical image capturing system includes a first lens element 510, an aperture stop 500, a second lens element 520, a third lens element 530, a fourth lens element 540, an IR-bandstop filter 570, an image plane 580, and an image sensing device 590.

The first lens element 510 has positive refractive power and is made of plastic material. The first lens element 510 has a convex object-side surface 512 and a concave image-side surface 514, and both object-side surface 512 and image-side surface 514 are aspheric. The object-side surface 512 and image-side surface 514 thereof both have one inflection point.

The second lens element 520 has positive refractive power and is made of plastic material. The second lens element 520 has a convex object-side surface 522 and a convex image-side surface 524, and both object-side surface 522 and image-side surface 524 are aspheric. The object-side surface 522 thereof has one inflection point.

The third lens element 530 has positive refractive power and is made of plastic material. The third lens element 530 has a concave object-side surface 532 and a convex image-side surface 534, and both object-side surface 532 and image-side surface 534 are aspheric. The object-side surface 532 and image-side surface 534 thereof both have one inflection point.

The fourth lens element 540 has negative refractive power and is made of plastic material. The fourth lens element 540 has a convex object-side surface 542 and a concave image-side surface 544. Both object-side surface 542 and image-side surface 544 are aspheric. The object-side surface 542 and image-side surface 544 thereof both have one inflection point.

The IR-bandstop filter 570 is made of glass material and is disposed between the fourth lens element 540 and the image plane 580, without affecting the focal length of the optical image capturing system.

In the optical image capturing system of the fifth embodiment, the first, second and third lens elements are positive lens, and their focal lengths are f1, f2 and f3, respectively. The sum of the focal lengths for all lens elements having positive refractive power is ΣPP, which satisfies the following condition: ΣPP=f1+f2+f3. Therefore, the positive refractive power of a single lens element may be distributed to other positive lens elements appropriately, so as to suppress noticeable aberrations generated when the incident light is propagating in the optical system.

In the optical image capturing system of the fifth embodiment, the sum of the focal lengths for all lens elements having negative refractive power is ΣNP, which satisfies the following condition: ΣNP=f4.

Table 9 and Table 10 below should be incorporated into the reference of the present embodiment.

TABLE 9

Lens Parameters for the Fifth Embodiment
f(focal length) = 1.3290 mm; f/HEP = 2.0;
HAF(half angle of view) = 37.5120 deg; tan(HAF) = 0.7677

| Surface No. | | Curvature Radius | Thickness (mm) | Material | Refractive Index | Abbe No. | Focal Length |
|---|---|---|---|---|---|---|---|
| 0 | Object | Plane | At Infinity | | | | |
| 1 | Lens 1 | 0.764838324 | 0.175 | Plastic | 1.584 | 29.88 | 32.549 |
| 2 | | 0.729251375 | 0.105 | | | | |
| 3 | Aperture Stop | Plane | 0.050 | | | | |
| 4 | Lens 2 | 0.770395463 | 0.297 | Plastic | 1.545 | 55.96 | 1.164 |
| 5 | | −3.142770862 | 0.142 | | | | |
| 6 | Lens 3 | −0.364018853 | 0.175 | Plastic | 1.642 | 22.46 | 10.785 |
| 7 | | −0.411367225 | 0.050 | | | | |
| 8 | Lens 4 | 0.704534047 | 0.175 | Plastic | 1.642 | 22.46 | −8.882 |
| 9 | | 0.566378176 | 0.133 | | | | |
| 10 | IR-bandstop Filter | Plane | 0.210 | BK_7 | 1.517 | 64.13 | |
| 11 | | Plane | 0.426 | | | | |
| 12 | Image Plane | Plane | 0.000 | | | | |

Reference Wavelength = 555 nm; Shield Position: The 1$^{st}$ surface with clear aperture of 0.400 mm and the 5$^{th}$ surface with clear aperture of 0.350 mm

TABLE 10

The Aspheric Coefficients of the Fifth Embodiment
Table 10: Aspheric Coefficients

| Surface No. | 1 | 2 | 4 | 5 | 6 | 7 |
|---|---|---|---|---|---|---|
| k = | −1.556135E+01 | −3.280664E+01 | −3.827055E−01 | −2.644155E+01 | −9.330802E−01 | −1.025218E+00 |
| $A_4$ = | 4.702703E+00 | 7.815202E+00 | −7.484692E−01 | −1.194821E+00 | 2.840791E−01 | −4.611834E+00 |
| $A_6$ = | −1.160799E+02 | −1.393947E+02 | −3.722463E+01 | −5.746811E+01 | 2.103726E+01 | 1.376837E+02 |
| $A_8$ = | 2.832783E+03 | 2.293905E+02 | 1.632621E+03 | 1.097333E+03 | −1.663331E+03 | −1.900876E+03 |
| $A_{10}$ = | −4.795248E+04 | 4.713187E+04 | −5.067966E+04 | −2.273134E+04 | 3.161881E+04 | 1.231873E+04 |
| $A_{12}$ = | 5.017520E+05 | −1.090364E+06 | 8.450075E+05 | 2.609284E+05 | −2.054994E+05 | 2.342849E+04 |
| $A_{14}$ = | −3.109684E+06 | 1.139193E+07 | −8.139072E+06 | −1.526369E+06 | 2.733846E+05 | −6.727018E+05 |
| $A_{16}$ = | 1.043435E+07 | −5.906522E+07 | 4.116555E+07 | 4.236962E+06 | 2.190178E+06 | 2.990921E+06 |
| $A_{18}$ = | −1.459442E+07 | 1.229646E+08 | −8.582584E+07 | −4.104192E+06 | −6.822180E+06 | −4.349295E+06 |
| $A_{20}$ = | 1.874596E+01 | 0.000000E+00 | 0.000000E+00 | 0.000000E+00 | 0.000000E+00 | 0.000000E+00 |

| Surface No. | 8 | 9 |
|---|---|---|
| k = | −3.602467E+01 | −1.030472E+01 |
| $A_4$ = | −2.350703E+00 | −2.912683E+00 |
| $A_6$ = | 1.381331E+01 | 1.830157E+01 |
| $A_8$ = | −2.230149E+02 | −1.401876E+02 |
| $A_{10}$ = | 1.983758E+03 | 7.950709E+02 |
| $A_{12}$ = | −7.402581E+03 | −2.878355E+03 |
| $A_{14}$ = | −2.462934E+03 | 6.062118E+03 |
| $A_{16}$ = | 9.002743E+04 | −6.575243E+03 |
| $A_{18}$ = | −1.771508E+05 | 2.609779E+03 |
| $A_{20}$ = | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| InRS41 | InRS42 | HVT41 | HVT42 | ODT % | TDT % |
| −0.04100 | −0.04600 | 0.27400 | 0.36500 | 1.30000 | 0.44600 |
| \|f/f1\| | \|f/f2\| | \|f/f3\| | \|f/f4\| | \|f1/f2\| | \|f2/f3\| |
| 0.04083 | 1.14175 | 0.12323 | 0.14963 | 27.96306 | 0.10793 |
| ΣPPR | ΣNPR | ΣPPR/\|ΣNPR\| | ΣPP | ΣNP | f1/ΣPP |

| Fifth Embodiment (Primary Reference Wavelength = 555 nm) | | | | | |
|---|---|---|---|---|---|
| 1.30581 | 0.14963 | 8.72702 | 44.49800 | −8.88200 | 0.73147 |
| f4/ΣNP | IN12/f | IN23/f | IN34/f | TP3/f | TP4/f |
| 1.00000 | 0.11663 | 0.10685 | 0.03762 | 0.13168 | 0.13168 |
| InTL | HOS | HOS/HOI | InS/HOS | InTL/HOS | ΣTP/InTL |
| 1.16800 | 1.93700 | 1.88424 | 0.85545 | 0.60299 | 0.70377 |
| (TP1 + IN12)/TP2 | (TP4 + IN34)/TP3 | TP1/TP2 | TP3/TP4 | IN23/(TP24 + IN23 + TP3) | |
| 1.11111 | 1.28571 | 0.58923 | 1.00000 | 0.23127 | |
| \|InRS41\|/TP4 | \|InRS42\|/TP4 | HVT42/HOI | HVT42/HOS | | |
| 0.2343 | 0.2629 | 0.3551 | 0.1884 | | |
| PSTA | PLTA | NSTA | NLTA | SSTA | SLTA |
| 0.00019 mm | 0.001 mm | −0.007 mm | −0.016 mm | 0.003 mm | 0.005 mm |
| VSFS0 | VSFS3 | VSFS7 | VTFS0 | VTFS3 | VTFS7 |
| 0.003 | −0.000 | −0.005 | 0.003 | 0.005 | 0.005 |
| VSMTF0 | VSMTF3 | VSMTF7 | VTMTF0 | VTMTF3 | VTMTF7 |
| 0.506 | 0.529 | 0.555 | 0.506 | 0.535 | 0.434 |
| ISFS0 | ISFS3 | ISFS7 | ITFS0 | ITFS3 | ITFS7 |
| 0.025 | 0.020 | 0.008 | 0.025 | 0.020 | 0.008 |
| ISMTF0 | ISMTF3 | ISMTF7 | ITMTF0 | ITMTF3 | ITMTF7 |
| 0.527 | 0.458 | 0.408 | 0.527 | 0.392 | 0.222 |
| FS | AIFS | AVFS | AFS | PhiA4/InTL | PhiA4/2HOI |
| 0.023 | 0.018 | 0.002 | 0.016 | 1.1130 | 0.6323 |
| PhiA4 | PhiB | PhiC | PhiD | PhiA4/HEP | |
| 1.3 mm | 1.7 mm | 2.1 mm | 2.4 mm | 1.9564 | |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF111 | 0.3250 | HIF111/HOI | 0.3161 | SGI111 | 0.0640 | \|SGI111\|/(\|SGI111\| + TP1) | 0.2678 |
| HIF121 | 0.2410 | HIF121/HOI | 0.2344 | SGI121 | 0.0350 | \|SGI121\|/(\|SGI121\| + TP1) | 0.1667 |
| HIF211 | 0.2080 | HIF211/HOI | 0.2023 | SGI211 | 0.0260 | \|SGI211\|/(\|SGI211\| + TP2) | 0.0805 |
| HIF311 | 0.2620 | HIF311/HOI | 0.2549 | SGI311 | −0.0950 | \|SGI311\|/(\|SGI311\| + TP3) | 0.3519 |
| HIF321 | 0.2640 | HIF321/HOI | 0.2568 | SGI321 | −0.0860 | \|SGI321\|/(\|SGI321\| + TP3) | 0.3295 |
| HIF411 | 0.1330 | HIF411/HOI | 0.1294 | SGI411 | 0.0090 | \|SGI411\|/(\|SGI411\| + TP4) | 0.0489 |
| HIF421 | 0.1710 | HIF421/HOI | 0.1663 | SGI421 | 0.0200 | \|SGI421\|/(\|SGI421\| + TP4) | 0.1026 |

The values pertaining to the length of the outline curves are obtainable from the data in Table 9 and Table 10:

| Fifth Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.332 | 0.340 | 0.00801 | 102.41% | 0.175 | 194.44% |
| 12 | 0.332 | 0.337 | 0.00497 | 101.50% | 0.175 | 192.70% |
| 21 | 0.317 | 0.319 | 0.00257 | 100.81% | 0.297 | 107.74% |
| 22 | 0.332 | 0.346 | 0.01356 | 104.08% | 0.297 | 116.63% |
| 31 | 0.332 | 0.365 | 0.03253 | 109.79% | 0.175 | 208.45% |
| 32 | 0.332 | 0.358 | 0.02594 | 107.81% | 0.175 | 204.68% |
| 41 | 0.332 | 0.333 | 0.00066 | 100.20% | 0.175 | 190.23% |
| 42 | 0.332 | 0.335 | 0.00265 | 100.80% | 0.175 | 191.37% |
| ARS | EHD | ARS value | ARS − EHD | (ARS/EHD) % | TP | ARS/TP (%) |
| 11 | 0.400 | 0.410 | 0.010 | 102.60% | 0.175 | 234.51% |
| 12 | 0.338 | 0.343 | 0.005 | 101.46% | 0.175 | 196.15% |
| 21 | 0.317 | 0.319 | 0.003 | 100.81% | 0.297 | 107.74% |
| 22 | 0.350 | 0.368 | 0.018 | 105.17% | 0.297 | 124.15% |
| 31 | 0.370 | 0.405 | 0.034 | 109.26% | 0.175 | 231.15% |
| 32 | 0.412 | 0.439 | 0.027 | 106.62% | 0.175 | 250.85% |
| 41 | 0.503 | 0.528 | 0.025 | 105.06% | 0.175 | 301.99% |
| 42 | 0.650 | 0.707 | 0.057 | 108.80% | 0.175 | 404.26% |

Sixth Embodiment

Figure 6A:
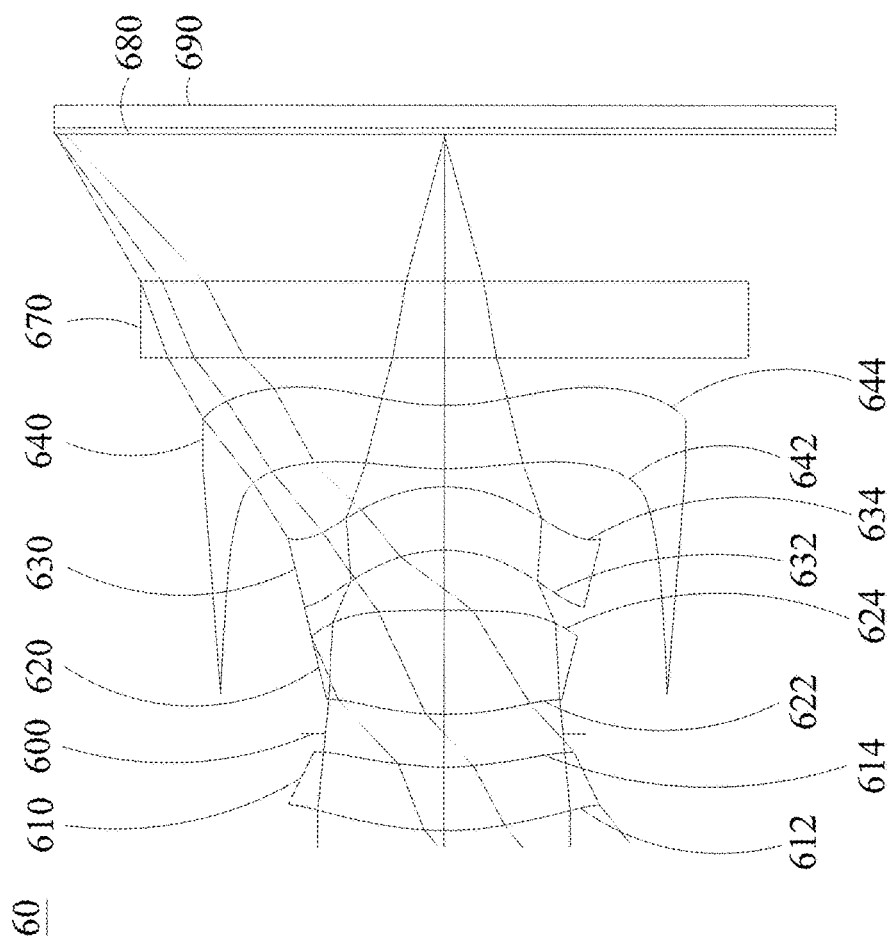
FIG. 6A is a schematic view of the optical image capturing system according to the sixth embodiment of the present invention.
Figure 6B:
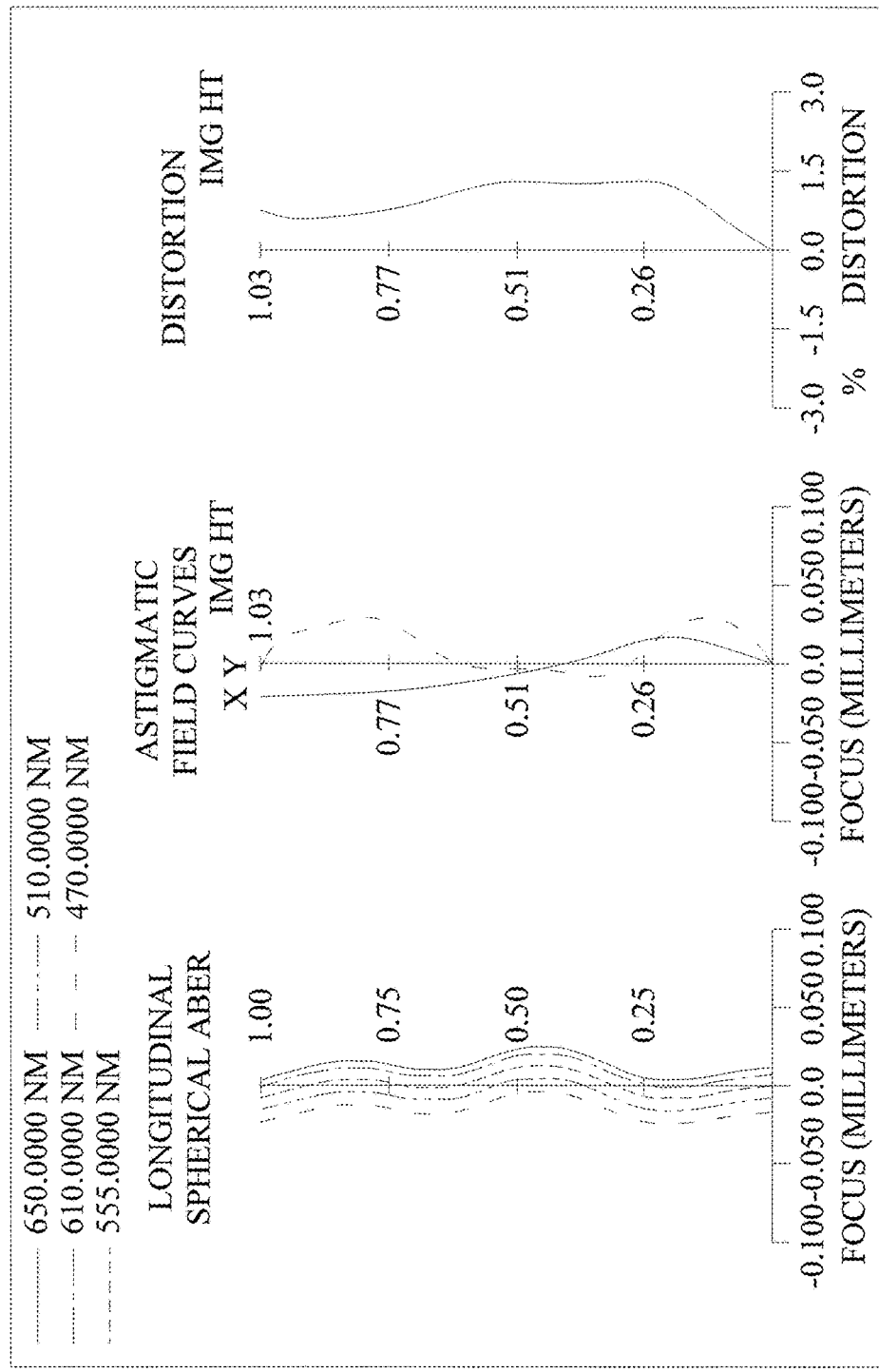
FIG. 6B shows the longitudinal spherical aberration curves, astigmatic field curves, and optical distortion curve of the optical image capturing system in the order from left to right according to the sixth embodiment of the present invention.
Figure 6D:
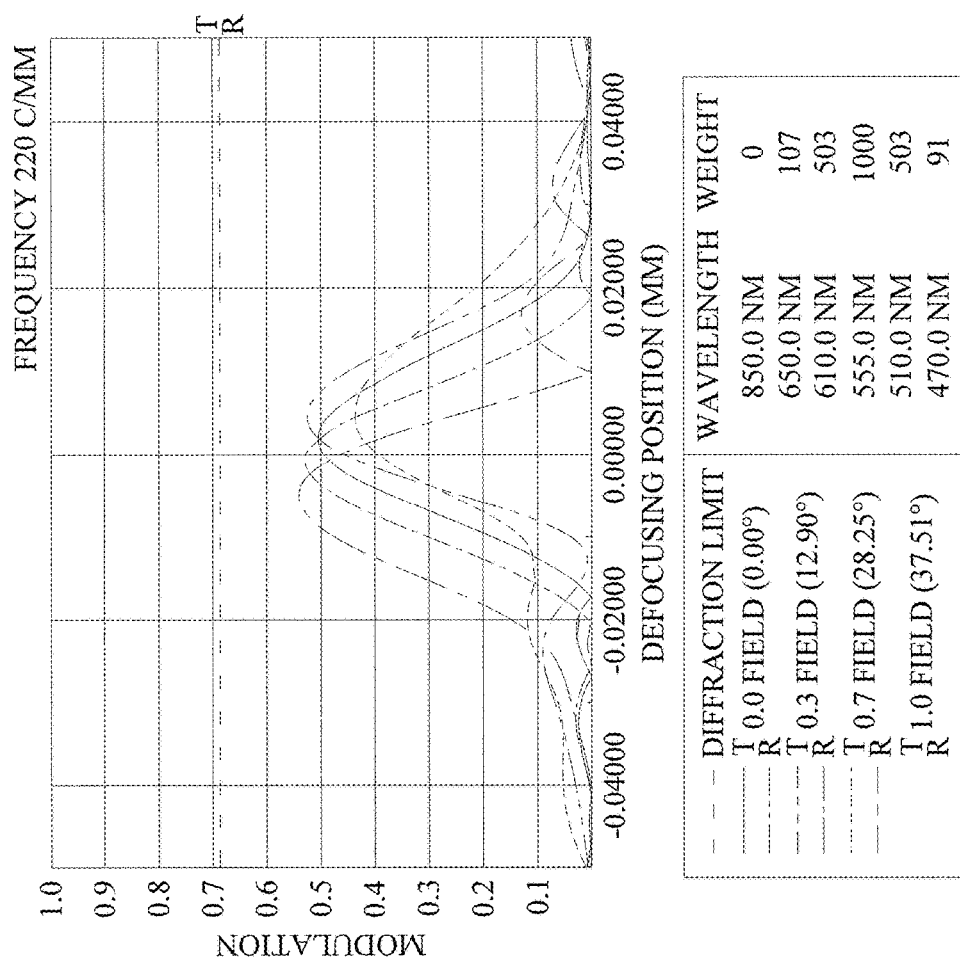
FIG. 6D is a diagram showing the through-focus MTF values of the visible light spectrum at the central field of view, 0.3 field of view, and 0.7 field of view of the sixth embodiment of the present invention.
Figure 6E:
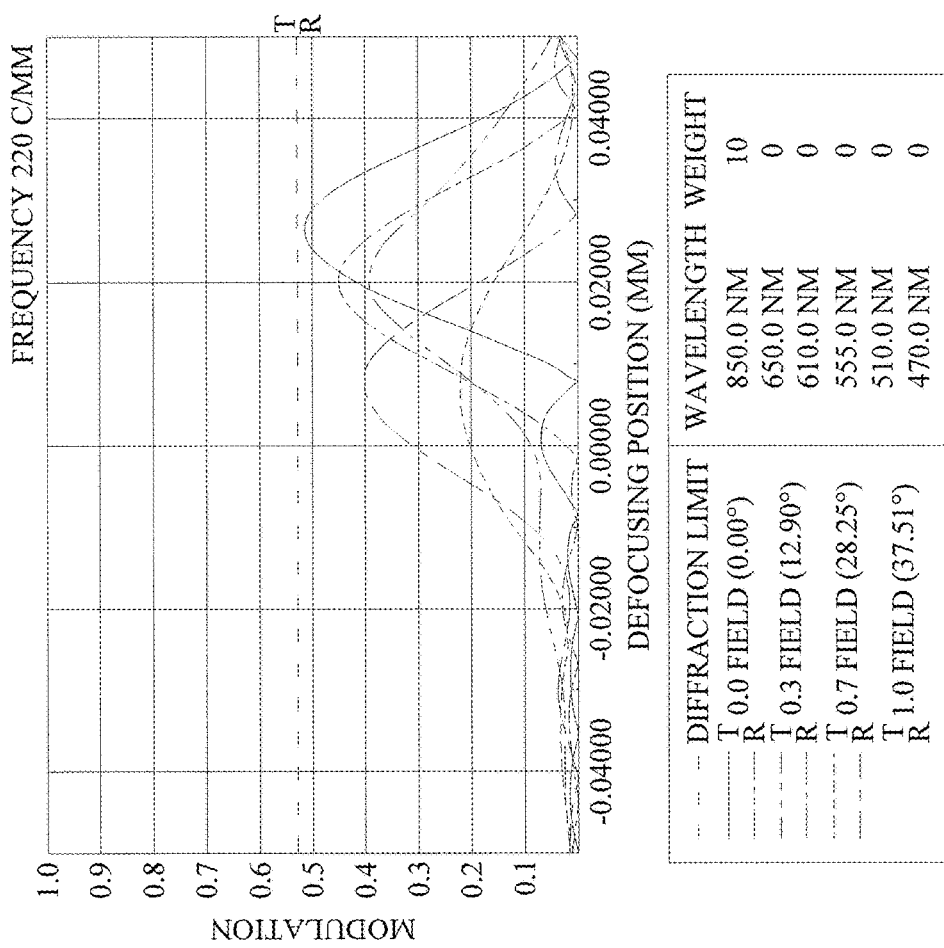
FIG. 6E is a diagram showing the through-focus MTF values of the infrared light spectrum at the central field of view, 0.3 field of view, and 0.7 field of view of the sixth embodiment of the present disclosure.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the optical image capturing system of the sixth embodiment. FIG. 6D is a diagram showing the through-focus MTF values of the visible light spectrum at the central field of view, 0.3 field of view, and 0.7 field of view of the sixth embodiment of the present invention. FIG. 6E is a diagram showing the through-focus MTF values of the infrared light spectrum at the central field of view, 0.3 field of view, and 0.7 field of view of the sixth embodiment of the present disclosure. As shown in FIG. 6A, in the order from an object side to an image side, the optical image capturing system includes a first lens element 610, an aperture stop 600, a second lens element 620, a third lens element 630, a fourth lens element 640, an IR-bandstop filter 670, an image plane 680, and an image sensing device 690.

The first lens element 610 has positive refractive power and is made of plastic material. The first lens element 610 has a convex object-side surface 612 and a concave image-side surface 614, and both object-side surface 612 and image-side surface 614 are aspheric. The object-side surface 612 thereof has an inflection point.

The second lens element 620 has positive refractive power and is made of plastic material. The second lens element 620 has a convex object-side surface 622 and a convex image-side surface 624, and both object-side surface 622 and image-side surface 624 are aspheric. The object-side surface 622 thereof has one inflection points.

The third lens element 630 has positive refractive power and is made of plastic material. The third lens element 630 has a concave object-side surface 632 and a convex image-side surface 634, and both object-side surface 632 and image-side surface 634 are aspheric. The object-side surface 632 thereof has one inflection points.

The fourth lens element 640 has negative refractive power and is made of plastic material. The fourth lens element 640 has a convex object-side surface 642 and a concave image-side surface 644. Both object-side surface 642 and image-side surface 644 are aspheric and have one inflection point.

The IR-bandstop filter 670 is made of glass material and is disposed between the fourth lens element 640 and the image plane 680, without affecting the focal length of the optical image capturing system.

In the optical image capturing system of the sixth embodiment, the first, second and third lens elements are positive lens, and their focal lengths are f1, f2 and f3, respectively. The sum of the focal lengths for all lens elements having positive refractive power is ΣPP, which satisfies the following condition: ΣPP=f1+f2+f3. Therefore, the positive refractive power of a single lens element may be distributed to other positive lens elements appropriately, so as to suppress noticeable aberrations generated when the incident light is propagating in the optical system.

In the optical image capturing system of the sixth embodiment, the sum of the focal lengths for all lens elements having negative refractive power is ΣNP, which satisfies the following condition: ΣNP=f4.

Table 11 and Table 12 below should be incorporated into the reference of the present embodiment.

TABLE 11

Lens Parameters for the Sixth Embodiment
f(focal length) = 1.3290 mm; f/HEP = 2.0;
HAF(half angle of view) = 37.5120 deg; tan(HAF) = 0.7677

| Surface No. | | Curvature Radius | Thickness (mm) | Material | Refractive Index | Abbe No. | Focal Length |
|---|---|---|---|---|---|---|---|
| 0 | Object | Plane | At infinity | | | | |
| 1 | Lens 1 | 0.852727177 | 0.175 | Plastic | 1.584 | 29.88 | 27.43 |
| 2 | | 0.831996164 | 0.091 | | | | |
| 3 | Aperture Stop | Plane | 0.054 | | | | |
| 4 | Lens 2 | 0.761891411 | 0.289 | Plastic | 1.545 | 55.96 | 1.19 |
| 5 | | −3.904738276 | 0.165 | | | | |
| 6 | Lens 3 | −0.361643479 | 0.175 | Plastic | 1.642 | 22.46 | 3.29 |
| 7 | | −0.367957202 | 0.050 | | | | |
| 8 | Lens 4 | 0.829526508 | 0.175 | Plastic | 1.642 | 22.46 | −3.09 |
| 9 | | 0.537691373 | 0.133 | | | | |
| 10 | IR-bandsop Filter | Plane | 0.210 | BK_7 | 1.517 | 64.13 | |
| 11 | | Plane | 0.403 | | | | |
| 12 | Image Plane | Plane | | | | | |

Reference Wavelength = 555 nm; Shield Position: The 1$^{st}$ surface with clear aperture of 0.410 mm and the 5$^{th}$ surface with clear aperture of 0.390 mm

TABLE 12

The Aspheric Coefficients of the Sixth Embodiment
Table 12: Aspheric Coefficients

| Surface No. | 1 | 2 | 4 | 5 | 6 | 7 |
|---|---|---|---|---|---|---|
| k = | −1.557647E+01 | −3.277776E+01 | −2.789439E−01 | −2.836680E+01 | −8.227774E−01 | −1.160439E+00 |
| $A_4$ = | 3.496099E+00 | 4.070620E+00 | −1.045470E+00 | −1.071473E+00 | −7.042761E−02 | −1.595838E+00 |
| $A_6$ = | −1.127991E+02 | −3.227539E+01 | −2.564283E+01 | −5.128397E+01 | 4.173408E+01 | 5.861257E+01 |

TABLE 12-continued

The Aspheric Coefficients of the Sixth Embodiment
Table 12: Aspheric Coefficients

| $A_8 =$ | 3.028273E+03 | −2.350251E+03 | 1.176839E+03 | 1.010546E+03 | −2.176985E+03 | −6.395381E+02 |
|---|---|---|---|---|---|---|
| $A_{10} =$ | −5.234801E+04 | 8.785110E+04 | −3.996886E+04 | −2.036338E+04 | 3.762443E+04 | −1.481922E+03 |
| $A_{12} =$ | 5.430169E+05 | −1.475501E+06 | 7.157242E+05 | 2.273671E+05 | −2.413331E+05 | 1.134396E+05 |
| $A_{14} =$ | −3.294190E+06 | 1.338238E+07 | −7.321641E+06 | −1.326611E+06 | 3.738232E+05 | −9.795245E+05 |
| $A_{16} =$ | 1.075724E+07 | −6.336433E+07 | 3.923895E+07 | 3.816418E+06 | 2.097561E+06 | 3.407940E+06 |
| $A_{18} =$ | −1.459442E+07 | 1.229646E+08 | −8.582584E+07 | −4.104192E+06 | −6.822180E+06 | −4.349295E+06 |
| $A_{20} =$ | 1.874288E+01 | 0.000000E+00 | 0.000000E+00 | 0.000000E+00 | 0.000000E+00 | 0.000000E+00 |

| Surface No. | 8 | 9 |
|---|---|---|
| $k =$ | −5.134444E+01 | −1.033455E+01 |
| $A_4 =$ | −4.577708E−01 | −2.412686E+00 |
| $A_6 =$ | −1.934862E+01 | 1.478557E+01 |
| $A_8 =$ | 1.955137E+02 | −1.211551E+02 |
| $A_{10} =$ | −1.529580E+03 | 7.099192E+02 |
| $A_{12} =$ | 1.081871E+04 | −2.582762E+03 |
| $A_{14} =$ | −5.450324E+04 | 5.449786E+03 |
| $A_{16} =$ | 1.527241E+05 | −6.031428E+03 |
| $A_{18} =$ | −1.771508E+05 | 2.609779E+03 |
| $A_{20} =$ | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| InRS41 | InRS42 | HVT41 | HVT42 | ODT % | TDT % |
| −0.04000 | −0.03700 | 0.28600 | 0.38800 | 1.30600 | 0.56600 |
| \|f/f1\| | \|f/f2\| | \|f/f3\| | \|f/f4\| | \|f1/f2\| | \|f2/f3\| |
| 0.04845 | 1.11400 | 0.40407 | 0.43038 | 22.99413 | 0.36272 |
| ΣPPR | ΣNPR | ΣPPR/\|ΣNPR\| | ΣPP | ΣNP | f1/ΣPP |
| 1.56652 | 0.43038 | 3.63989 | 31.91400 | −3.08800 | 0.85956 |
| f4/ΣNP | IN12/f | IN23/f | IN34/f | TP3/f | TP4/f |
| 1.00000 | 0.10910 | 0.12415 | 0.03762 | 0.13168 | 0.13168 |
| InTL | HOS | HOS/HOI | InS/HOS | InTL/HOS | ΣTP/InTL |
| 1.17400 | 1.92100 | 1.86868 | 0.86101 | 0.61114 | 0.69336 |
| (TP1 + IN12)/TP2 | (TP4 + IN34)/TP3 | TP1/TP2 | TP3/TP4 | IN23/(TP24 + IN23 + TP3) | |
| 1.10727 | 1.28571 | 0.60554 | 1.00000 | 0.26232 | |
| \|InRS41\|/TP4 | \|InRS42\|/TP4 | HVT42/HOI | HVT42/HOS | | |
| 0.2286 | 0.2114 | 0.3774 | 0.2020 | | |
| PSTA | PLTA | NSTA | NLTA | SSTA | SLTA |
| 0.001 mm | 0.00022 mm | −0.001 mm | −0.009 mm | 0.002 mm | 0.004 mm |
| VSFS0 | VSFS3 | VSFS7 | VTFS0 | VTFS3 | VTFS7 |
| 0.003 | −0.000 | −0.005 | 0.003 | 0.005 | 0.005 |
| VSMTF0 | VSMTF3 | VSMTF7 | VTMTF0 | VTMTF3 | VTMTF7 |
| 0.506 | 0.529 | 0.555 | 0.506 | 0.535 | 0.434 |
| ISFS0 | ISFS3 | ISFS7 | ITFS0 | ITFS3 | ITFS7 |
| 0.025 | 0.020 | 0.008 | 0.025 | 0.020 | 0.008 |
| ISMTF0 | ISMTF3 | ISMTF7 | ITMTF0 | ITMTF3 | ITMTF7 |
| 0.527 | 0.458 | 0.408 | 0.527 | 0.392 | 0.222 |
| FS | AIFS | AVFS | AFS | PhiA4/InTL | PhiA4/2HOI |
| 0.023 | 0.018 | 0.002 | 0.016 | 1.1499 | 0.6566 |
| PhiA4 | PhiB | PhiC | PhiD | PhiA4/HEP | |
| 1.35 mm | 1.75 mm | 2.15 mm | 2.45 mm | 2.0316 | |

The following values for the conditional expressions can be obtained from the data in Table 11 and Table 12:

| Values Related to Inflection Point of Sixth Embodiment (Primary Reference Wavelength = 555 nm) | | | | | | | |
|---|---|---|---|---|---|---|---|
| HIF111 | 0.3020 | HIF111/HOI | 0.2938 | SGI111 | 0.0470 | \|SGI111\|/(\|SGI111\| + TP1) | 0.2117 |
| HIF121 | 0.2210 | HIF121/HOI | 0.2150 | SGI121 | 0.0250 | \|SGI121\|/(\|SGI121\| + TP1) | 0.1250 |
| HIF211 | 0.2120 | HIF211/HOI | 0.2062 | SGI211 | 0.0270 | \|SGI211\|/(\|SGI211\| + TP2) | 0.0854 |

-continued

Values Related to Inflection Point of Sixth Embodiment
(Primary Reference Wavelength = 555 nm)

| | | | | | | | |
|---|---|---|---|---|---|---|---|
| HIF311 | 0.2670 | HIF311/HOI | 0.2597 | SGI311 | −0.1010 | \|SGI311\|/(\|SGI311\| + TP3) | 0.3659 |
| HIF321 | 0.2720 | HIF321/HOI | 0.2646 | SGI321 | −0.0960 | \|SGI321\|/(\|SGI321\| + TP3) | 0.3542 |
| HIF411 | 0.1460 | HIF411/HOI | 0.1420 | SGI411 | 0.0090 | \|SGI411\|/(\|SGI411\| + TP4) | 0.0489 |
| HIF421 | 0.1790 | HIF421/HOI | 0.1741 | SGI421 | 0.0230 | \|SGI421\|/(\|SGI421\| + TP4) | 0.1162 |

The values pertaining to the length of the outline curves are obtainable from the data in Table 11 and Table 12:

Sixth Embodiment (Primary Reference Wavelength = 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 0.332 | 0.338 | 0.00532 | 101.60% | 0.175 | 192.91% |
| 12 | 0.332 | 0.335 | 0.00270 | 100.81% | 0.175 | 191.41% |
| 21 | 0.322 | 0.325 | 0.00308 | 100.96% | 0.289 | 112.53% |
| 22 | 0.332 | 0.343 | 0.01059 | 103.19% | 0.289 | 118.54% |
| 31 | 0.332 | 0.368 | 0.03559 | 110.71% | 0.175 | 210.20% |
| 32 | 0.332 | 0.362 | 0.02988 | 108.99% | 0.175 | 206.94% |
| 41 | 0.332 | 0.333 | 0.00051 | 100.15% | 0.175 | 190.16% |
| 42 | 0.332 | 0.336 | 0.00328 | 100.99% | 0.175 | 191.74% |

| ARS | EHD | ARS value | ARS − EHD | (ARS/EHD) % | TP | ARS/TP (%) |
|---|---|---|---|---|---|---|
| 11 | 0.410 | 0.416 | 0.006 | 101.51% | 0.175 | 237.82% |
| 12 | 0.348 | 0.351 | 0.003 | 100.80% | 0.175 | 200.56% |
| 21 | 0.322 | 0.325 | 0.003 | 100.96% | 0.289 | 112.53% |
| 22 | 0.350 | 0.364 | 0.014 | 104.06% | 0.289 | 125.92% |
| 31 | 0.372 | 0.410 | 0.038 | 110.26% | 0.175 | 234.11% |
| 32 | 0.420 | 0.453 | 0.033 | 107.79% | 0.175 | 258.71% |
| 41 | 0.523 | 0.546 | 0.024 | 104.52% | 0.175 | 312.24% |
| 42 | 0.675 | 0.734 | 0.059 | 108.81% | 0.175 | 419.71% |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens element with refractive power;
   a second lens element with refractive power;
   a third lens element with refractive power;
   a fourth lens element with refractive power;
   a first image plane, which is an image plane specifically for visible light and perpendicular to an optical axis; a through-focus modulation transfer rate (value of MTF) at a first spatial frequency having a maximum value at central field of view of the first image plane; and
   a second image plane, which is an image plane specifically for infrared light and perpendicular to the optical axis; the through-focus modulation transfer rate (value of MTF) at the first spatial frequency having a maximum value at central field of view of the second image plane;
   wherein the optical image capturing system comprises four lens elements with refractive powers, at least one of the four lens elements has positive refractive power; focal lengths of the four lens elements are respectively f1, f2, f3 and f4; a focal length of the optical image capturing system is f, and an entrance pupil diameter of the optical image capturing system is HEP; a distance on the optical axis from an object-side surface of the first lens element to the first image plane is HOS, a distance on the optical axis from the object-side surface of the first lens element to an image-side surface of the fourth lens element is InTL, a maximum effective diameter of the image-side surface of the fourth lens element is denoted by PhiA4, half of a maximum viewable angle of the optical image capturing system is denoted by HAF; the optical image capturing system has a maximum image height HOI on the first image plane perpendicular to the optical axis; a distance on the optical axis between the first image plane and the second image plane is denoted by FS; conditions as follows are satisfied: 1≤f/HEP≤10, 0 deg<HAF≤150 deg, 0<PhiA4/InTL≤5, and |FS|≤30 μm.

2. The optical image capturing system of claim 1, wherein a wavelength of the infrared light ranges from 700 nm to 1300 nm, and the first spatial frequency is denoted by SP1, which satisfies the following condition: SP1≤440 cycles/mm.

3. The optical image capturing system of claim 1, wherein an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE, the following condition is satisfied: 0.9≤2(ARE/HEP)≤2.0.

4. The optical image capturing system of claim 1, wherein an image-side surface of the second lens element and an image-side surface of the third lens element on the optical axis are convex surfaces.

5. The optical image capturing system of claim 1, wherein half of a vertical maximum viewable angle of the optical image capturing system is denoted by VHAF, and the following conditions are satisfied: VHAF≥10 deg, 0<PhiA4/HEP≤4.0, and 0<PhiA4/2HOI≤2.0.

6. The optical image capturing system of claim 1, wherein the optical image capturing system satisfies the following condition: HOS/HOI≥1.2.

7. The optical image capturing system of claim 1, wherein an outline curve starting from an axial point on an object-side surface of the fourth lens element, tracing along an outline of the object-side surface, and ending at a coordinate point on the surface that has a vertical height of ½ entrance pupil diameter from the optical axis, has a length denoted by ARE41; an outline curve starting from an axial point on the image-side surface of the fourth lens element, tracing along an outline of the image-side surface, and ending at a coordinate point on the surface that has a vertical height of ½ entrance pupil diameter from the optical axis, has a length denoted by ARE42; a central thickness of the fourth lens element on the optical axis is TP4, which satisfies conditions as follows: 0.05≤ARE41/TP4≤25 and 0.05≤ARE42/TP4≤25.

8. The optical image capturing system of claim 1, wherein the first lens element has negative refractive power; TV distortion for image formation in the optical image capturing system is TDT; transverse aberration of a longest operation wavelength of a positive direction tangential fan of the optical image capturing system passing through an edge of an entrance pupil and incident at a position of 0.7 HOI on the first image plane is denoted by PLTA, and transverse aberration of a shortest operation wavelength of the positive direction tangential fan of the optical image capturing system passing through the edge of the entrance pupil and incident at the position of 0.7 HOI on the first image plane is denoted by PSTA; transverse aberration of the longest operation wavelength of a negative direction tangential fan of the optical image capturing system passing through the edge of the entrance pupil and incident at the position of 0.7 HOI on the first image plane is denoted by NLTA, and transverse aberration of the shortest operation wavelength of a negative direction tangential fan of the optical image capturing system passing through the edge of the entrance pupil and incident at the position of 0.7 HOI on the first image plane is denoted by NSTA; transverse aberration of the longest operation wavelength of a sagittal fan of the optical image capturing system passing through the edge of the entrance pupil and incident at the position of 0.7 HOI on the first image plane is denoted by SLTA, transverse aberration of the shortest operation wavelength of the sagittal fan of the optical image capturing system passing through the edge of the entrance pupil and incident at the position of 0.7 HOI on the first image plane is denoted by SSTA; conditions as follows are satisfied: PLTA≤100 μm, PSTA≤100 μm, NLTA≤100 μm, NSTA≤100 μm, SLTA≤100 μm, SSTA≤100 μm, and |TDT|<100%.

9. The optical image capturing system of claim 1, further comprising an aperture stop; wherein a distance from the aperture stop to the first image plane on the optical axis is InS, which satisfies condition as follows: 0.2≤InS/HOS≤1.1.

10. An optical image capturing system, from an object side to an image side, comprising:

a first lens element with positive refractive power;
a second lens element with refractive power, an image-side surface thereof on the optical axis being a convex surface;
a third lens element with refractive power, an image-side surface thereof on the optical axis being a convex surface;
a fourth lens element with refractive power;
a first image plane, which is an image plane specifically for visible light and perpendicular to an optical axis; a through-focus modulation transfer rate (value of MTF) at a first spatial frequency having a maximum value at central field of view of the first image plane, and the first spatial frequency being 220 cycles/mm;
a second image plane, which is an image plane specifically for infrared light and perpendicular to the optical axis; the through-focus modulation transfer rate (value of MTF) at the first spatial frequency having a maximum value at central field of view of the second image plane, and the first spatial frequency being 220 cycles/mm; and
a first lens positioning element comprising a lens base, wherein the lens base is hollow and opaque, and the lens base is disposed with a barrel portion and a base portion that are interconnected; the barrel portion is configured to accommodate the first to fourth lens elements, and the base portion is between the fourth lens element and the first image plane; an outer perimeter of the base portion is longer than an outer perimeter of the barrel portion; a shortest side length of the base portion, which is measured on a plane perpendicular to the optical axis, has a maximum value denoted by PhiD, the optical image capturing system comprises four lens elements with refractive powers; at least one of the second to fourth lens elements has positive refractive power; focal lengths of the four lens elements are respectively f1, f2, f3 and f4; a focal length of the optical image capturing system is f; an entrance pupil diameter of the optical image capturing system is HEP; a distance on an optical axis from an object-side surface of the first lens element to the first image plane is HOS, a distance on the optical axis from the object-side surface of the first lens element to an image-side surface of the fourth lens element is InTL, half of a maximum viewable angle of the optical image capturing system is denoted by HAF; the optical image capturing system has a maximum image height HOI on the first image plane perpendicular to the optical axis; a maximum effective diameter of the image-side surface of the fourth lens element is denoted by PhiA4; an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE; a distance on the optical axis between the first image plane and the second image plane is denoted by FS; conditions as follows are satisfied: 1≤f/HEP≤10, 0 deg<HAF≤150 deg, |FS|≤30 μm, 0 mm<PhiD≤10 mm, and 0.9≤2(ARE/HEP)≤2.0.

11. The optical image capturing system of claim 10, wherein a maximum effective half diameter of any surface of any one of the four lens elements is denoted by EHD; an outline curve starting from the axial point on any surface of any one of those lens elements, tracing along an outline of the surface, and ending at a point which defines the maximum effective half diameter, has a length denoted by ARS; conditions as follows are satisfied: 0.9≤ARS/EHD≤2.0.

12. The optical image capturing system of claim 10, wherein half of a vertical maximum viewable angle of the optical image capturing system is denoted by VHAF, and the following conditions are satisfied: VHAF≥20 deg and 0<PhiA4/InTL≤5.

13. The optical image capturing system of claim 10, wherein the optical image capturing system satisfies the following condition: HOS/HOI≥1.4.

14. The optical image capturing system of claim 10, wherein the third lens element has positive refractive power.

15. The optical image capturing system of claim 10, wherein the fourth lens element has negative refractive power; the image-side surface of the second lens element and the image-side surface of the third lens element on the optical axis are convex surfaces.

16. The optical image capturing system of claim 10, wherein a distance on the optical axis between the third lens element and the fourth lens element is IN34, which satisfies condition as follows: 0<IN34/f≤5.

17. The optical image capturing system of claim 10, wherein a distance on the optical axis between the first lens element and the second lens element is IN12, which satisfies condition as follows: 0<IN12/f≤60.

18. The optical image capturing system of claim 10, wherein a distance on the optical axis between the third lens element and the fourth lens element is IN34, central thicknesses of the third lens element and the fourth lens element on the optical axis are respectively TP3 and TP4, which satisfy condition as follows: 1≤(TP4+IN34)/TP3≤10.

19. The optical image capturing system of claim 10, satisfying the following conditions: 0<PhiA4/2HOI≤2.0 and 0 mm<PhiA4≤5 mm.

20. An optical image capturing system, from an object side to an image side, comprising:
  a first lens element with positive refractive power;
  a second lens element with refractive power, an image-side surface thereof on the optical axis being a convex surface;
  a third lens element with refractive power, an image-side surface thereof on the optical axis being a convex surface;
  a fourth lens element with refractive power;
  a first average image plane, which is an image plane specifically for visible light and perpendicular to an optical axis; the first average image plane being installed at the average position of the defocusing positions, where through-focus modulation transfer rates (values of MTF) of the visible light at central field of view, 0.3 field of view, and 0.7 field of view are at their respective maximum at a first spatial frequency; the first spatial frequency being 220 cycles/mm;
  a second average image plane, which is an image plane specifically for infrared light and perpendicular to the optical axis; the second average image plane being installed at the average position of the defocusing positions, where through-focus modulation transfer rates of the infrared light (values of MTF) at central field of view, 0.3 field of view, and 0.7 field of view are at their respective maximum at the first spatial frequency; the first spatial frequency being 220 cycles/mm; and
  a first lens positioning element comprising a lens base; and
  a second lens positioning element accommodated in the lens base,
wherein the lens base is hollow and opaque, and the lens base is disposed with a barrel portion and a base portion that are interconnected; the barrel portion is configured to accommodate the first to fourth lens elements, and the base portion is between the fourth lens element and the first average image plane; an outer perimeter of the base portion is longer than an outer perimeter of the barrel portion; a shortest side length of the base portion, which is measured on a plane perpendicular to the optical axis, has a maximum value denoted by PhiD; the second lens positioning element comprises a positioning portion and a connecting portion; the positioning portion is hollow and comes into direct contact with any lens elements to accommodate those lens elements, such that those lens elements are aligned along the optical axis; the connecting portion is disposed at an outer side of the positioning portion and comes into direct contact with an inner perimeter of the barrel portion; a maximum outer diameter of the connecting portion, which is measured on a plane perpendicular to the optical axis, is denoted by PhiC; the optical image capturing system comprises four lens elements with refractive power; at least one of the third to fourth lens elements has positive refractive power; focal lengths of the first lens element to the fourth lens elements are respectively f1, f2, f3 and f4; a focal length of the optical image capturing system is f; an entrance pupil diameter of the optical image capturing system is HEP; a distance on the optical axis from an object-side surface of the first lens element to the first average image plane is HOS; a distance on the optical axis from the object-side surface of the first lens element to an image-side surface of the fourth lens element is InTL, half of a maximum viewable angle of the optical image capturing system is denoted by HAF; the optical image capturing system has a maximum image height HOI on the first average image plane perpendicular to the optical axis; a maximum effective diameter of the image-side surface of the fourth lens element is denoted by PhiA4; an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE; a distance on the optical axis between the first average image plane and the second average image plane is denoted by AFS; half of a vertical maximum viewable angle of the optical image capturing system is denoted by VHAF, conditions as follows are satisfied: 1≤f/HEP10, 0 deg<HAF≤150 deg, |AFS|≤30 μm, VHAF≥20 deg, PhiC<PhiD, 0 mm<PhiD≤5 mm, and 0.9≤2(ARE/HEP)≤2.0.

21. The optical image capturing system of claim 20, wherein a maximum effective half diameter of any surface of any one of the four lens elements is denoted by EHD; an outline curve starting from the axial point on any surface of any one of those lens elements, tracing along an outline of the surface, and ending at a point which defines the maximum effective half diameter, has a length denoted by ARS; conditions as follows are satisfied: 0.9≤ARS/EHD≤2.0.

22. The optical image capturing system of claim 20, wherein the optical image capturing system satisfies the following condition: HOS/HOI≥1.6.

23. The optical image capturing system of claim 20, wherein a linear magnification of an image formed by the optical image capturing system on the second average image plane is LM, which satisfies the following condition: LM≥0.0003.

24. The optical image capturing system of claim 20, further comprising an aperture stop and an image sensing device; wherein the image sensing device is disposed on the first average image plane and comprises at least 100 thousand pixels, a distance on the optical axis from the aperture stop to the first average image plane is InS; condition as follows is satisfied: $0.2 \leq \text{InS/HOS} \leq 1.1$.

25. The optical image capturing system of claim 20, further comprising an aperture stop, an image sensing device, and a driving module, wherein the image sensing device is disposed on the first average image plane and comprises at least 100 thousand pixels, a distance from the aperture stop to the first average image plane is InS, and the driving module couples with the four lens elements and enables movements of those lens elements; conditions as follows are satisfied: $0.2 \leq \text{InS/HOS} \leq 1.1$.

* * * * *